United States Patent

Ito et al.

[11] Patent Number: 5,870,360
[45] Date of Patent: Feb. 9, 1999

[54] DISC RECORDING AND/OR REPRODUCING APPARATUS HAVING DISC EXCHANGE FUNCTION

[75] Inventors: Shinji Ito, Tokyo; Hiroyuki Sato, Chiba; Nobuaki Hisamatsu; Hiroyuki Kikkoji, both of Tokyo, all of Japan

[73] Assignee: Sony Corporation, Tokyo, Japan

[21] Appl. No.: 891,286

[22] Filed: Jul. 10, 1997

Related U.S. Application Data

[63] Continuation of Ser. No. 392,525, Feb. 23, 1995, abandoned.

[30] Foreign Application Priority Data

Feb. 26, 1994 [JP] Japan .................................. 6-053281
Jul. 12, 1994 [JP] Japan .................................. 6-159935

[51] Int. Cl.$^6$ .................................................. G11B 17/22
[52] U.S. Cl. ............................................................ 369/36
[58] Field of Search ................................ 369/34, 36, 38, 369/75.1, 77.2, 178, 192

[56] References Cited

U.S. PATENT DOCUMENTS

| | | | |
|---|---|---|---|
| 4,539,663 | 9/1985 | Ishibaski et al. | 369/34 |
| 5,177,722 | 1/1993 | Nakamichi | 369/536 |
| 5,241,529 | 8/1993 | Hara et al. | 369/75.2 |
| 5,508,994 | 4/1996 | Nakamichi et al. | 369/192 |

FOREIGN PATENT DOCUMENTS

| | | |
|---|---|---|
| 0138005 | 4/1985 | European Pat. Off. . |
| 0168107 | 1/1986 | European Pat. Off. . |
| 0541213 | 5/1993 | European Pat. Off. . |
| 2267384 | 5/1993 | United Kingdom . |

*Primary Examiner*—George J. Letscher
*Attorney, Agent, or Firm*—Jay H. Maioli

[57] ABSTRACT

A disc recording/reproducing apparatus for selectively taking out a disc housed within a housing unit for recording or reproducing information signals on or from the disc is disclosed. The apparatus includes a housing unit for housing a plurality of sub-trays each configured for setting a disc on it in a direction normal to the disc surface direction so that the discs lie parallel to one another, a disc recording/reproducing unit provided within a main member of the apparatus, a main tray for holding a selected sub-tray and for being horizontally shifted between a first position of being protruded from the main member of the apparatus and a second position within the main member of the apparatus, transfer mechanism for selectively taking one of the sub-trays out of the housing unit and/or housing the sub-tray thus taken out in the housing unit, lift mechanism for shifting the transfer mechanism and the main tray shifted to the second position between the disc recording/reproducing unit and the housing unit, detection mechanism for detecting the position of the lift means and control mechanism for controlling the lift means based on an output signal of the detection means. The apparatus also includes disc presence/absence detection mechanism for detecting whether or not there is a disc on the sub-tray pulled out by the transfer means from the housing unit. The control means controls the operation of the lift means based on an output of the disc presence/absence detection means.

22 Claims, 40 Drawing Sheets

DISC RECORDING AND/OR REPRODUCING APPARATUS HAVING DISC EXCHANGE FUNCTION

This is a continuation of application Ser. No. 08/392,525 filed Feb. 23, 1995 now abandoned.

BACKGROUND OF THE INVENTION

This invention relates to a disc recording and/or reproducing apparatus having the disc exchange function. More particularly, it relates to a disc recording and/or reproducing apparatus in which a plurality of discs housed by means of sub-trays in a housing unit within a main member of the apparatus are selectively taken out by a transfer mechanism along with the sub-trays and the disc set on the sub-tray thus taken out is loaded on the disc recording/reproducing unit for recording/reproducing information signals on or from the disc.

There has hitherto been proposed a disc recording and/or reproducing apparatus with a disc exchange function, having a housing unit for housing sub-trays for setting the optical discs thereon in a plurality of tiers in the main member of the apparatus, a transfer mechanism for pulling out the sub-tray housed within the housing unit along with the optical disc, a main tray for setting the sub-tray pulled out by the transfer mechanism, and a lift mechanism for uplifting or lowering the main tray in a direction normal to the disc surface of the optical disc housed within the housing unit for loading the disc on a recording/reproducing unit mounted within the main member of the apparatus.

With such disc recording/reproducing apparatus, the transfer mechanism for pulling out the sub-trays having the optical discs set thereon from the housing section and the lift mechanism for lifting the main tray having the sub-tray set thereon, are adapted to be driven using respective separate driving means, thus complicating the structure and increasing the size of the mechanism.

OBJECTS OF THE INVENTION

It is an object of the present invention to provide a disc recording and/or reproducing apparatus in which the transfer mechanism for taking out the disc from the disc housing unit and the lift mechanism for transporting the disc taken out by the transfer mechanism to the disc recording/reproducing unit may be simplified in structure for reducing the size of the apparatus.

It is another object of the present invention to provide a disc recording and/or reproducing apparatus in which the transfer mechanism for taking out the disc from the disc housing unit and the lift mechanism for transporting the disc taken out by the transfer mechanism to the disc recording/reproducing unit may be operatively linked to each other for realizing smooth operation and protection of the transfer mechanism and the lift mechanism.

It is a further object of the present invention to provide a disc recording and/or reproducing apparatus in which the driving source for driving the transfer mechanism for taking out the disc from the disc housing unit and the lift mechanism for transporting the disc taken out by the transfer mechanism to the disc recording/reproducing unit may be simplified for simplifying the disc exchange system.

It is a further object of the present invention to provide a disc recording and/or reproducing apparatus with a disc exchange function enabling a large number of discs to be housed without increasing the size of the apparatus.

It is a further object of the present invention to provide a disc recording and/or reproducing apparatus in which the discs housed within the housing unit can be exchanged easily.

It is a further object of the present invention to provide a disc recording and/or reproducing apparatus in which the disc can be pulled out safely and positively from the housing unit so as to be loaded on the disc recording/reproducing unit.

It is a further object of the present invention to provide a disc recording and/or reproducing apparatus in which the sub-tray may be lifted relative to the disc recording/reproducing unit only when the disc is set on the sub-tray pulled out from the housing unit by the transfer mechanism for positively loading the disc on the disc recording/reproducing unit.

It is a further object of the present invention to provide a disc recording and/or reproducing apparatus in which the sub-tray having the disc set thereon may be taken out and housed positively.

It is a further object of the present invention to provide a disc recording and/or reproducing apparatus in which the disc set on the sub-tray may be housed without the risk of descent.

Other objects and advantages of the present invention will become more apparent from the following description of the preferred embodiments of the invention.

SUMMARY OF THE INVENTION

In one aspect, the present invention provides a disc recording/reproducing apparatus having a housing unit provided within a main member of the apparatus for housing a plurality of sub-trays each configured for setting a disc thereon in a direction at right angles to the disc surface direction so that the discs lie parallel to one another, a disc recording/reproducing unit provided within the main member of the apparatus, transfer means for selectively taking one of the sub-trays out of the housing unit and/or housing the sub-tray thus taken out in the housing unit, a main tray for holding the sub-tray selected by the transfer means and adapted for being horizontally shifted between a first position of being protruded from the main member of the apparatus and a second position within the main member of the apparatus, and lift means for producing movement of one of sub-trays within the housing unit, transfer means and the main tray shifted to the second position relative to an other or others of the housing unit, transfer means and the main tray shifted to the second position.

The lift means shifts the transfer means and the main tray shifted to the second position together between the disc recording/reproducing unit and the housing unit.

This disc recording/reproducing unit is arranged at a lower portion of the main member of the apparatus on a straight line passing through the second position substantially normal to the disc surface direction. The housing section is arranged at an upper portion of the main member of the apparatus spaced apart from the substantially straight line passing through the second position. The transfer mean and the main tray are adapted for being uplifted and lowered by the lift means on a substantially straight line normal to the disc surface direction.

The driving means has a first driving unit engaged with a first rack of the main tray for shifting the main tray and a second driving unit engaged with a second rack of the transfer means for shifting the transfer means between the housing unit and the second position in a direction normal to the substantially straight line normal to the disc surface direction.

The transfer mechanism includes a slider mounted for movement relative to the main tray and having an engagement portion adapted for being engaged with a mating engagement portion provided on the sub-tray. The sub-tray is locked to the main tray by engagement of the engagement portion provided on the slider with the mating engagement portion provided on the sub-tray.

The main tray has a recess for holding the sub-tray taken out from the housing unit by the transfer means and a holding mechanism for holding the sub-tray housed within the recess. The sub-tray is held by the holding mechanism and held in the recess of the main tray so as to be prohibited from being detached from the main tray.

The transfer means is movable relative to the main tray and has a slider having an engagement portion engaged with a mating engagement portion provided on the sub-tray.

The disc recording/reproducing apparatus includes a lock mechanism for inhibiting movement of the main tray between the first and the second positions during transfer of the sub-tray by the transfer mechanism.

The lift means has supporting means for supporting the main tray between the first and second positions and lift driving means for uplifting and lowering the supporting means along a substantially straight line normal to the disc surface direction.

The lift driving means has a first cam member having a first cam portion engaged with the supporting means, a second cam member having a second cam portion engaged with the supporting means, and a driving mechanism for producing relative movement between the first cam member and the second cam member for uplifting and lowering the supporting means along the first and second cam portions.

In another aspect, the present invention provides a disc recording and/or reproducing apparatus having a housing unit for housing a plurality of sub-trays each configured for setting a disc thereon in a direction normal to the disc surface direction so that the discs lie parallel to one another, a disc recording/reproducing unit provided within a main member of the apparatus, a main tray for holding a selected sub-tray and for being horizontally shifted between a first position of being protruded from the main member of the apparatus and a second position within the main member of the apparatus, transfer means for selectively taking one of the sub-trays out of the housing unit and/or housing the sub-tray thus taken out in the housing unit, lift means for shifting the transfer means and the main tray shifted to the second position between the disc recording/reproducing unit and the housing unit, detection means for detecting the position of the lift means and control means for controlling the lift means based on an output signal of the detection means.

The disc recording and/or reproducing apparatus also includes disc presence/absence detection means for detecting whether there is a disc on the sub-tray pulled out by the transfer means from the housing unit. The control means controls the operation of the lift means based on an output of the disc presence/absence detection means.

The control means shifts the main tray to the first position when an output signal of the disc presence/absence detection means indicate the absence of the disc on the sub-tray pulled out by the transfer means. The control means drives the lift means for uplifting or lowering the main tray and the transfer means for loading the disc on the sub-tray on the disc recording/reproducing unit when an output signal of the disc presence/absence detection means indicates the presence of the disc on the sub-tray pulled out by the transfer means.

The disc recording and/or reproducing apparatus also includes lock means for inhibiting movement of the main tray between the first and second positions during the transfer movement of the sub-tray by the transfer means.

The disc recording and/or reproducing apparatus also includes first position detection means for detecting the position of the transfer means and second position detection means for detecting the lock state of the lock means. The control means drive-controls the lift means, based on an output signal of the second position detection means, when an output of the first position detection means indicates that the transfer means is at the second position.

In still another aspect, the present invention provides a disc housing device having a plurality of sub-trays each having a rectangular plan shape and having a recess for setting a disc therein and an engagement portion having an outwardly protruded engagement portion on its one side, a casing for holding the sub-trays parallel to one another and having an aperture on its one surface for introducing and taking out one of the sub-trays, a plurality of supporting portions protruded from an inner wall surface of the casing for supporting the sub-trays parallel to one another at a predetermined interval from each other, and a plurality of engagement recesses engaged by the engagement portions of the sub-trays supported by the supporting portions.

The supporting portions are formed on the inner wall surface of the casing at intervals wider than the thickness of the disc set on the sub-tray. A plurality of lugs are provided for prohibiting the discs set on the recesses of the sub-trays housed within the casing from being detached from the recesses.

DETAILED DESCRIPTION OF THE PREFERRED EMBODIMENTS

Figure 1:
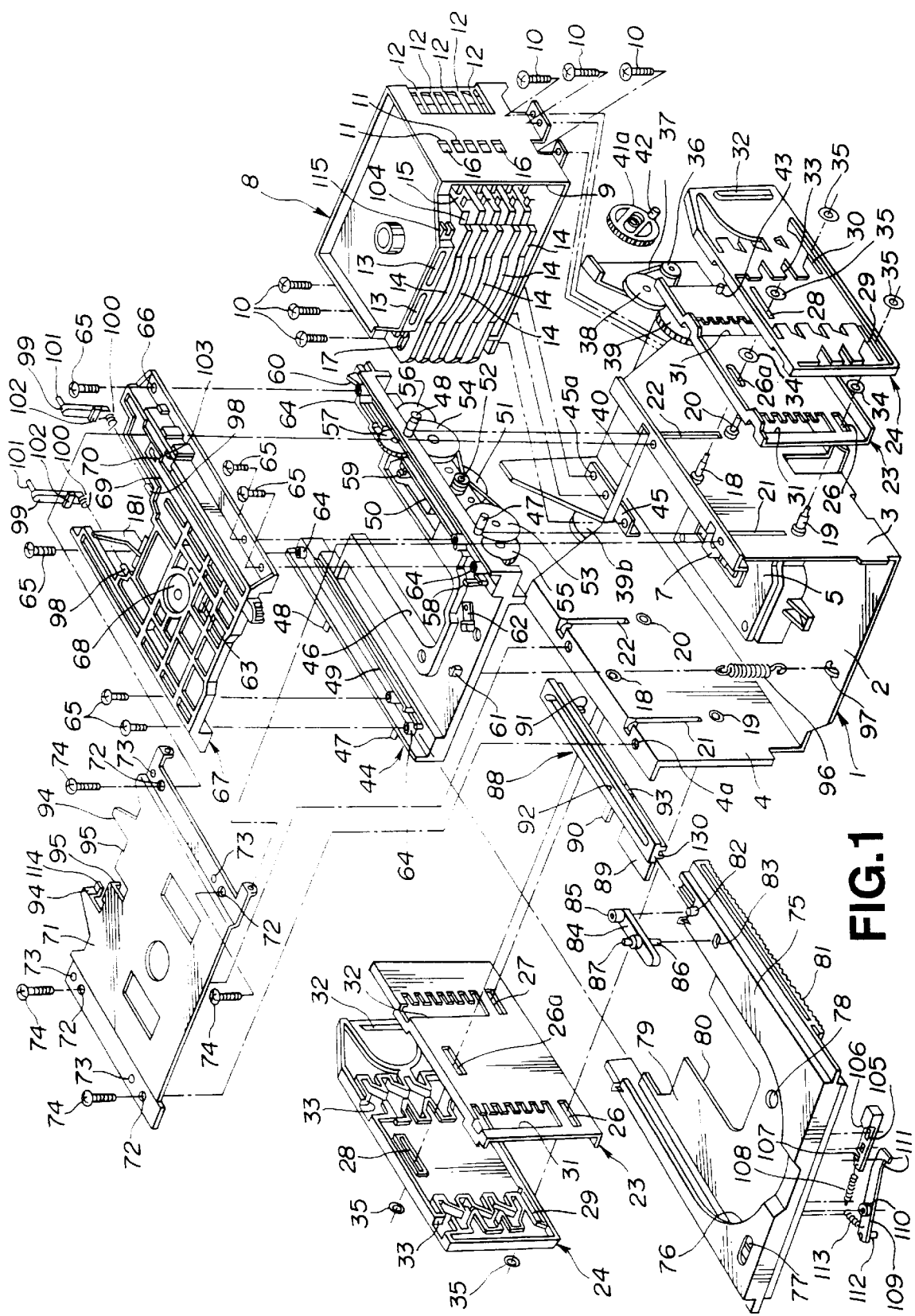
FIG. 1 is an exploded perspective view showing a disc recording and/or reproducing apparatus according to the present invention.

Referring to the drawings, preferred embodiments of a disc recording and/or reproducing apparatus and a disc housing device employed in the disc recording and/or reproducing apparatus will be explained in detail.

The present embodiment is directed to a disc recording/reproducing apparatus employing an optical disc as a recording medium. With the disc recording/reproducing apparatus, a plurality of discs housed within a housing unit within the main member of the apparatus by means of a sub-tray are selectively taken out by a transfer mechanism along with the sub-tray, and the disc set on the sub-tray thus taken out is loaded on the disc recording/reproducing unit provided within the main member of the apparatus, so that information signals will be recorded on or reproduced from the disc.

The recording medium employed in the present embodiment of the disc recording and/or reproducing apparatus is an optical disc having the diameter of 12 cm or 8 cm.

The disc recording and/or reproducing apparatus has a chassis 1 having a variety of mechanical components for making up a main member of the apparatus, as will be explained subsequently. The chassis 1 has a bottom plate 2 and a pair of upstanding sidewall sections 3 and 4 on opposite lateral sides thereof and is designed in a substantially U-shape in its entirety, as shown in FIG. 1. On the bottom surface 2 of the chassis 1, there is loaded an optical disc as a recording medium for the present disc recording and/or reproducing apparatus, while there is loaded a recording and/or reproducing unit 5 for recording/reproducing music signals or the like on the optical disc. On the back side of the recording/reproducing unit 5, arranged on the chassis 1, there is mounted a housing unit 8 in which are housed a plurality of optical discs so as to be parallel to one another in a direction extending at right angles to the disc surface direction. The optical discs are housed within the housing section 8 by means of sub-trays 14 as later explained.

On the chassis 1 is arranged a lift block 25 for overlying the recording/reproducing unit 5. The lift block 25 is made up of a lift base plate 44 and a cover plate 67 mounted for being abutted against the upper surface of the lift base plate 44. The lift block 25 is supported for vertical lift movement by a lift mechanism 27 as later explained, with respect to the sidewall sections 3 and 4 set upright on both opposite sides of the chassis 1. That is, the lift block 25 is movably supported in a direction towards and away from the recording/reproducing unit 5 mounted on the bottom plate 2 of the chassis 1.

On the lift block 25 is mounted a main tray 75 for movement in a horizontal direction at right angles to the lift direction of the lift block 25. The main tray 75 is mounted for movement between a first position in which it is protruded from the lift block 25 outwardly of the main member of the apparatus and a second position or a recording/reproducing position between the lift base plate 44 and the cover plate 67 of the lift block 25 enabling recording and/or reproduction of information signals on or from the optical disc housed within the main member of the apparatus. On the proximal end of the upper surface of the main tray 75 are formed a pair of extrication-proofing protrusions 131, 131. These extrication-proofing protrusions are caused to bear against the forward side of the lower surface of the cover plate 67 when the main tray 75 has been moved to the first position projected outwardly of the main member of the apparatus for preventing descent of the main tray 75 from the front side of the lift block.

One of the sub-trays 14 housed within the housing section 8 and having an optical disc set thereon is selectively taken out and held on the main tray 75. The sub-tray 14, held on the main tray 75, is moved between the housing position in which the sub-tray is housed within the housing section 8 and the recording/reproducing position in which the sub-tray is held on the main tray 75 to enable recording/reproduction of information signals on or from the optical disc, and is also moved to the first position in which it is held on the main tray 75 and protruded to outside of the main member of the apparatus along with the main tray 75.

Figure 32:
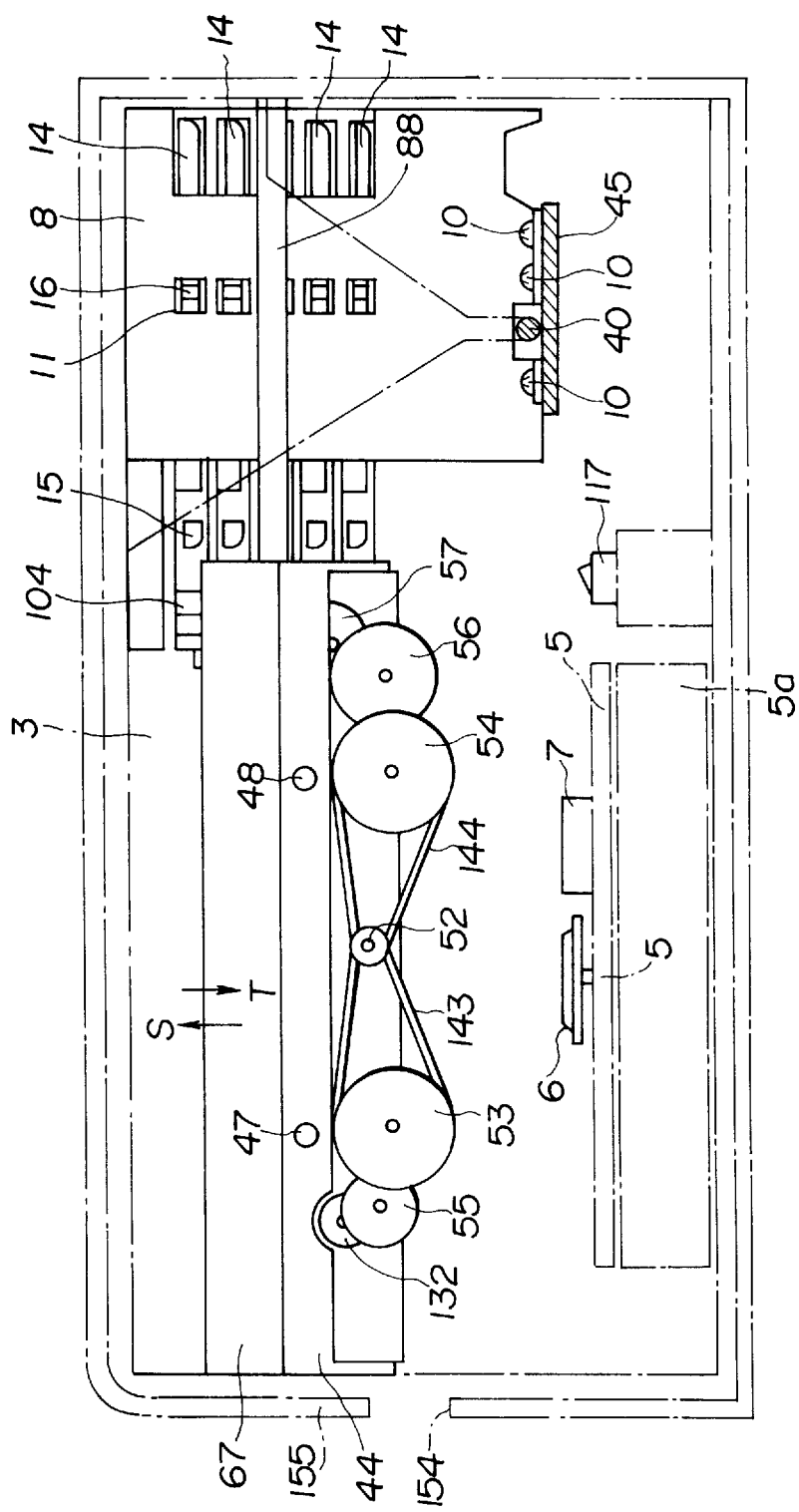
FIG. 32 is a side view showing the state in which the slider causes the sub-tray to be housed within the housing section.

On the lift block 25 is mounted a transfer mechanism which selectively takes out a desired one of a plurality of sub-trays 14 housed within the housing section 8 and holds it on the main tray 75 or which houses the sub-tray 14 held on the main tray 75 within the housing section 8 when the lift block 25 is moved to a position facing the sub-tray 14 housed within the housing section 8, as shown in FIG. 32.

Figure 33:
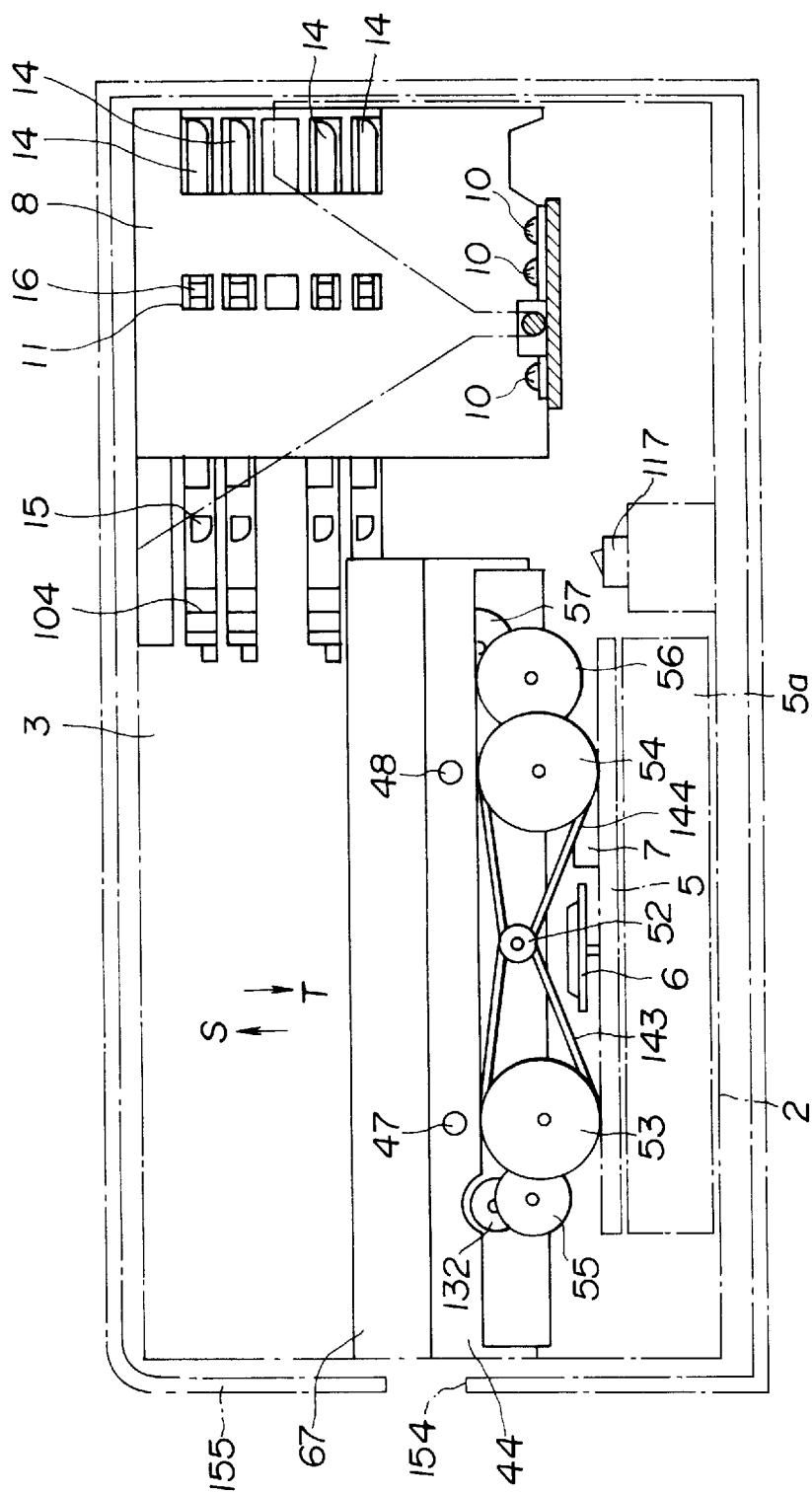
FIG. 33 is a side view showing the state in which the lift block with the sub-tray in the recording/reproducing position enables the main tray to be moved towards the outside of the main member of the apparatus.

When the lift block 25 is at a position not facing any of the sub-trays 14 housed within the housing section 8 but facing a disc insertion/ejection aperture 154 formed in the front surface of an outer casing 155 housing the chassis 1 of the main member of the apparatus as shown in FIG. 33, the transfer mechanism shifts the main tray 75 arranged on the lift block 25 to a first position which is an ejecting position in which the main tray 75 is protruded out of the main member of the apparatus by means of the disc insertion/ejection aperture 154. When the main tray 75 is moved to the first position protruded out of the main member of the apparatus, it becomes possible to take out the optical disc set on the sub-tray 14 held on the main tray 75. Thus, by moving the main tray 75 to the ejecting position outwardly of the main member of the apparatus, it becomes possible to exchange the optical disc set on the sub-tray 14.

Figure 34:
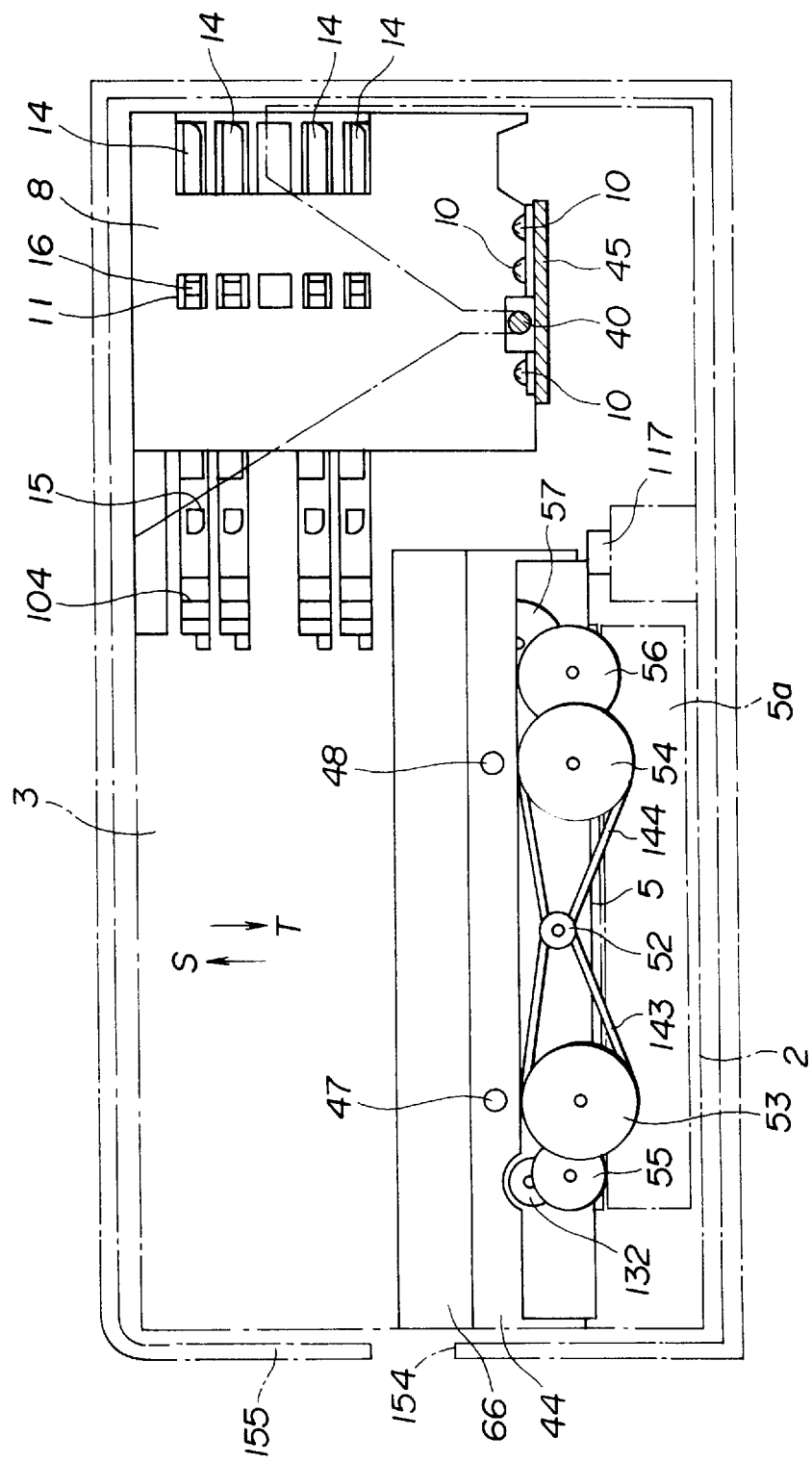

When the lift block 25 is moved in a direction indicated by arrow T in FIG. 34 as far as a loading position close to the recording/reproducing unit 5, the optical disc set on the main tray 75 is loaded on a disc table 6 of the recording/reproducing unit 5. The lift block 25 is uplifted from the recording/reproducing unit 5 in the direction shown by arrow S in FIG. 34 towards the housing unit 8 for setting the optical disc loaded on the disc table on the sub-tray 14. The sub-tray 14 is again held on the main tray 75, along with the optical disc, so as to be moved in the stacking direction of the sub-trays 14 housed in the housing unit 8. When the lift block 25 is moved to a position facing the housing unit 8 as shown in FIG. 32, the transfer mechanism is actuated for housing the sub-tray 14 held on the main tray 75 within the housing unit 8.

The recording/reproducing unit 5 is mounted by means of a frame 5a supported on the bottom plate 5a supported on the bottom plate 2 of the chassis 1 by means of a damper capable of absorbing vibrations or the like disturbances applied to the main member of the apparatus. The recording/reproducing unit 5 has a disc rotating mechanism for rotating the optical disc, and an optical pickup unit for facing the optical disc rotated by the disc rotating mechanism for radiating a light beam onto the disc surface of the optical disc for recording/reproducing information signals on or from the disc, as shown in FIGS. 1, 32, 33 and 34.

The disc rotating mechanism is made up of the disc table 6 for loading the optical disc thereon and a spindle motor for rotationally driving the disc table 6. The spindle motor has its driving shaft protruded on the upper surface of the bottom plate 2 and has the disc table 6 mounted on the distal end of the driving shaft. The disc table 6 is substantially disc-shaped and has a frusto-conical centering portion at a mid portion on the upper surface thereof. When the optical disc is set on the disc table 6, the centering portion is engaged in a centering aperture in the optical disc for centering the optical disc with respect to the disc table 6. The optical disc is loaded on the disc table 6 and rotated by a slide motor, not shown, in unison with the disc table 6.

The optical pickup unit 7 is supported in a slide guide shaft supported by a frame 5a and is moved along the radius of the optical disc loaded on the disc table 6 by a pickup feed mechanism by being guided by the slide guide shaft. The optical pickup unit 7 radiates a light beam from a light source, such as a semiconductor laser, housed within the optical block, while detecting the return light beam reflected from the optical disc by a photodetector arranged within the optical block for recording/reproducing information signals on or from the optical disc.

Figure 4:
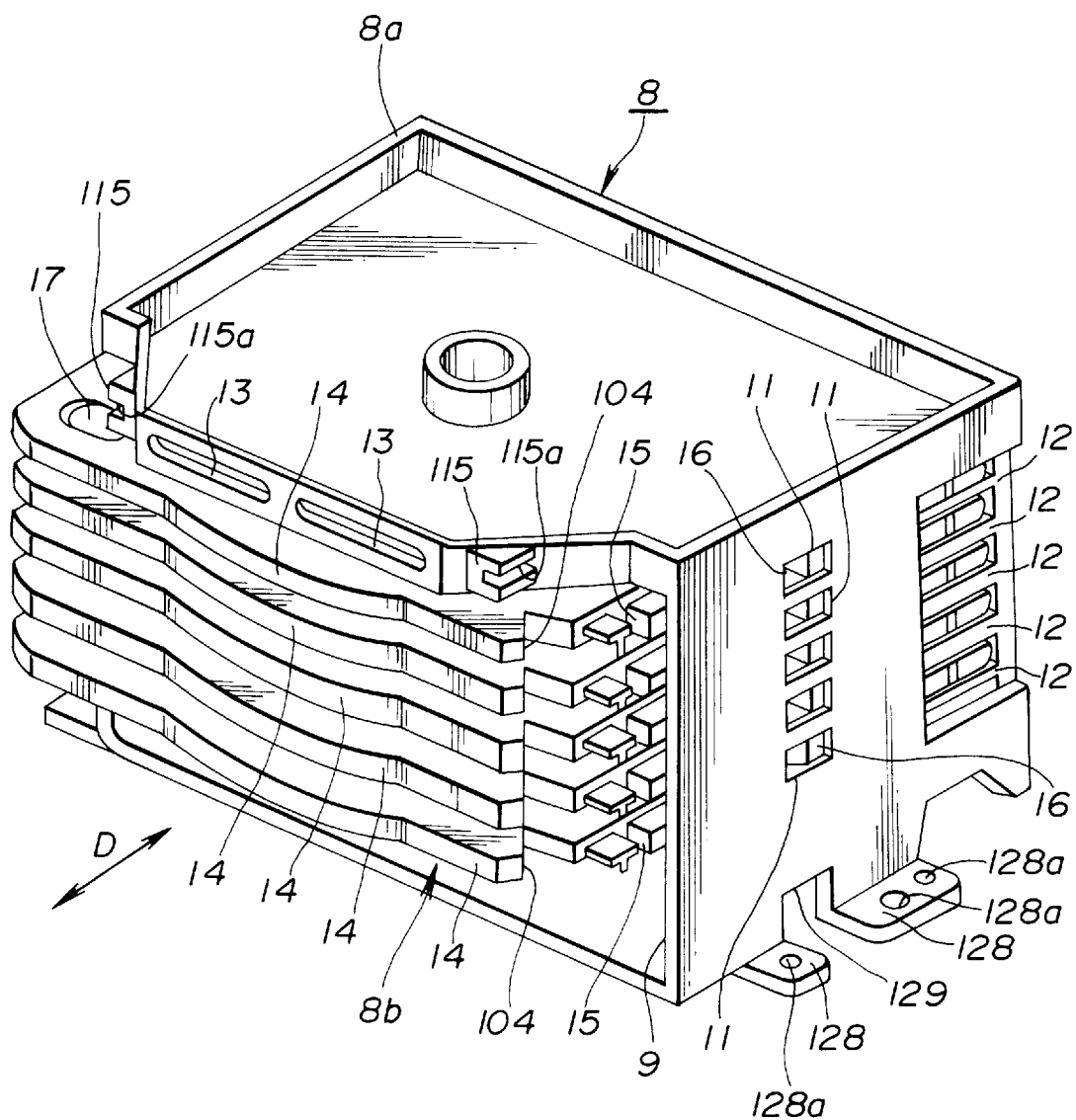
FIG. 4 is a perspective view showing a housing section housing a sub-tray having an optical disc set thereon.

The housing unit 8, arranged at the back of the recording/reproducing unit 5 arranged on the chassis 1, is adapted for housing a plurality of disc-setting sub-trays 14 in a stacked state parallel to one another in a direction at right angles to the disc surface direction. In the present embodiment, five sub-trays 14 are housed within the housing unit. This housing unit 8 has a rectangular-shaped casing 8a constituting a main member of the housing unit sized to accommodate five sub-trays 14 therein, as shown in FIG. 4. The front surface of the casing 8a facing the recording/reproducing unit 5 is opened to form an opening 8b by means of which the sub-tray 14 is taken out from or accommodated in the housing unit 8a. The sub-tray 14, having the optical disc set thereon, is inserted into and taken out from the housing unit 8 by means of the opening 8b.

Figure 6:
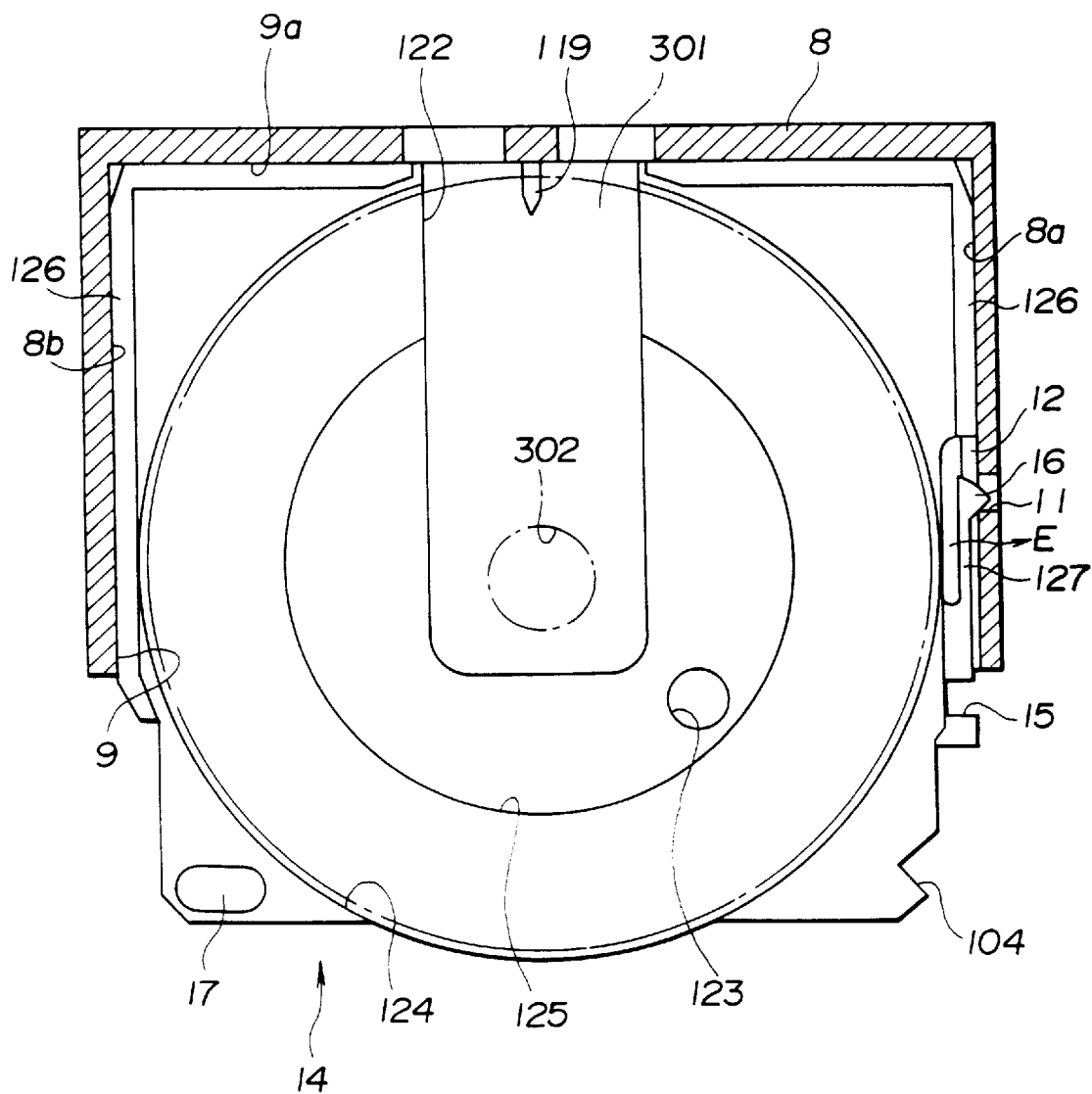
FIG. 6 is a plan view showing the state in which sub-tray is housed within the housing section, with a portion thereof being broken away.
Figure 7:
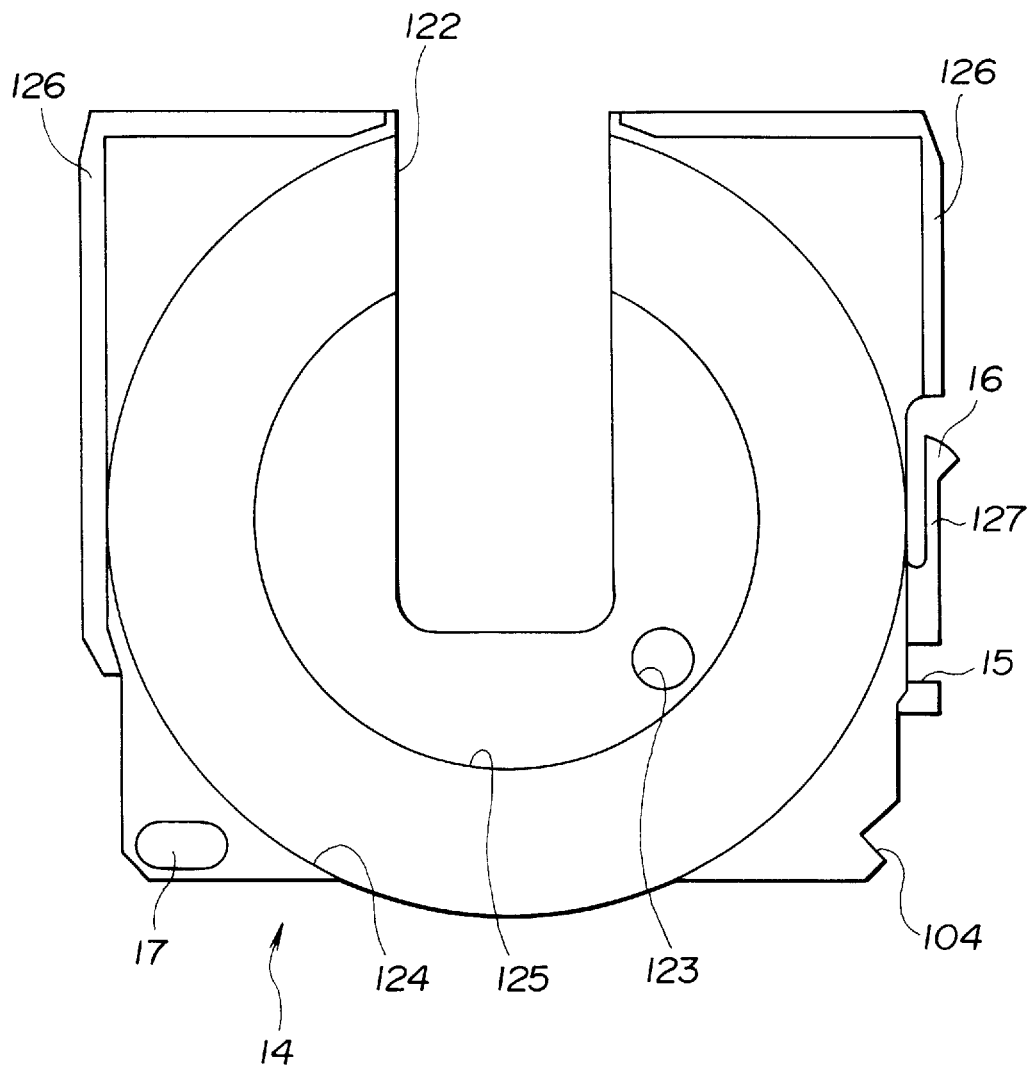
FIG. 7 is a plan view showing a sub-tray having an optical disc set thereon.

The sub-tray 14, housed within the housing unit 8, is substantially rectangular in shape and has a first recess 124 on its upper surface for setting an optical disc 301 therein, as shown in FIGS. 6 and 7. The first recess 124 is substantially circular in shape and sized to set the optical disc 301 having a diameter of 12 cm therein in position. A second recess 125 lesser in diameter than the first recess 124 is concentrically formed in the bottom surface of the first recess 124. The second recess 125 is circular in shape and sized to set an optical disc having the diameter of 8 cm therein in position. The sub-tray 14 has a cut-out 122 formed therein for extending towards the center from its rear edge which is disposed towards the inner side of the housing unit 8 when the sub-tray 14 is housed within the housing unit 8. The cut-out 122 exposes a center aperture 302 and the rim of the aperture 302 of the optical disc 301 set in the first recess 124 and a narrow region of the disc 301 extending across the inner and outer rims thereof to the lower surface of the sub-tray 14.

A flange 126 of a thinner thickness is provided for extending from both lateral sides towards the rear edge of the sub-tray 14. An elastic arm section 127 is formed on one side of the sub-tray 14 for extending from the forward end towards the rear of the sub-tray 14. The elastic arm section 127 is formed as one with the sub-tray 14 by forming a cut-out along the lateral side edge of the sub-tray 14. At the distal end of the elastic arm section 127 is formed an engagement lug 16 for extending outwardly of a lateral side of the sub-tray 14 for being engaged with an engagement opening 11 formed in the housing unit 8.

Figure 5:
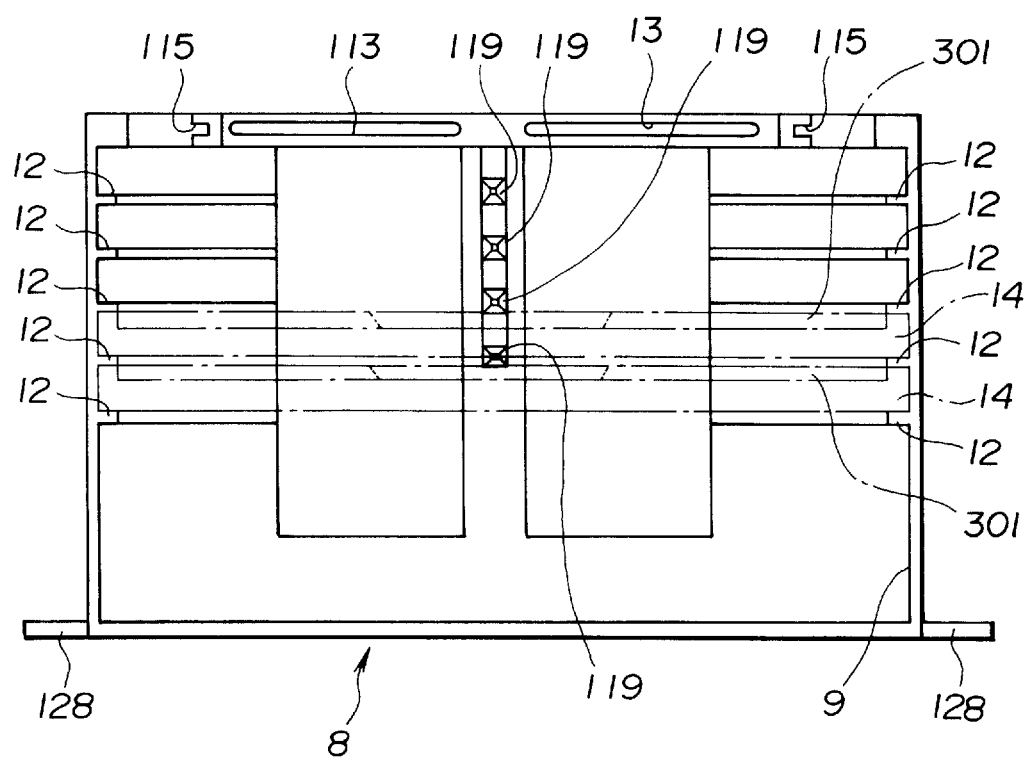
FIG. 5 is a front view showing the housing section.

On the inner wall surface 9 of the housing unit 8 are formed a plurality of tongue-like supporting pieces 12 in a plurality of tiers, as shown in FIG. 5. These supporting pieces 12, equal in number to the sub-trays 14 housed in the housing unit 8 for supporting the sub-trays 14, are protruded from lateral plates 9a, 9b lying at right angles to the opening 8b of the casing 8a and from the rear plate 9c for horizontally supporting the sub-trays 14 introduced into the housing unit 8. The sub-tray 14 is housed within the housing unit 8 by having its flange 126 formed for extending from both lateral sides to the rear side supported by the supporting piece 12. The supporting pieces 12 are formed at a spacing from one another such that a gap wider than the thickness of the optical disc 301 set on the sub-tray 14 is maintained between two vertically adjacent sub-trays 14.

One 9a of the side plates of the inner wall surface 9 of the housing unit 8 are formed engagement holes 11 engaged by the engagement lugs 16 of the sub-trays 14 supported on the supporting pieces 12. When the sub-tray 14 is progressively introduced into the housing unit 8 by means of the opening 8b as it is supported by the supporting piece 12, the engagement lug 16 is thrust against the inner wall surface 9 of the side plate 9a of the housing unit 8. With the engagement lug 16 thus thrust, the elastic arm section 127 is elastically deformed in a direction opposite to that shown by arrow E in FIG. 6. When the engagement lug 16 is introduced into the housing unit 8 to a housing position in which the engagement lug 16 is in registration with the engagement hole 11, the engagement lug 16 is no longer thrust by the inner wall surface 9, with the elastic arm section 127 being elastically reset in a direction indicated by arrow E in FIG. 6 for engaging the engagement lug 16 in the engagement hole 11. The sub-tray 14 is prohibited from being disengaged from the housing section 8 by the engagement lug 16 being engaged in the engagement hole 11. That is, when the sub-tray 14 is inserted into and detached from the housing unit 8 by means of the opening 8b in a direction shown by arrow D in FIG. 4, the elastic arm section 127 of the sub-tray 14 is flexibly deformed for engaging and disengaging the engagement lug 16 into and out of the engagement hole 11.

Towards the rear wall 9c of the housing unit 8, a plurality of disc retention lugs 119 are protruded towards the inner space of the housing unit 8 in association with the supporting pieces 12, as shown in FIGS. 5 and 6. These disc retention lugs 1190 face the upper surfaces of the sub-trays 14 supported by the supporting pieces 12. When the sub-tray 14 having the optical disc 301 set in the first recess 124 thereof is housed within the housing unit 8, the disc retention lugs 119 approach and face the upper surface of the optical disc 301 in order to prohibit the optical disc 301 from being detached from the first recess 124, as shown in FIGS. 4 and 5.

The bottom sides of the side plates 9a, 9b of the casing 8a of the housing unit 8 are formed with left and right mounting pieces 128, 128. The housing unit 8 is mounted on the chassis 1 by passing set screws 10 through screw holes 128a formed in the mounting pieces 128 into threaded engagement with tapped holes 45a formed in left and right supporting pieces 45, 45 mounted on opposite surfaces of sidewall sections 3, 4 of the chassis 1. Between the mounting pieces 128, 128 is formed a cut-out 129 by partially removing the bottom sides of the sidewall sections 9a, 9b. The cut-out 129 serves for preventing abutment by a supporting shaft 40 as later explained.

On the upper ends of the sidewall sections 3, 4 of the chassis 1 is mounted a substantially planar top plate 71, as a reinforcement member, by a plurality of set screws 74. Both sides of the top plate 71 are formed with screw holes 72, 72 and positioning holes 73, 73. The top plate 71 is mounted across the sidewall sections 3 and 4 by passing the set screws 74 through the screw holes 72, 72 and threading the set screws 74 in tapped holes 3a, 4a formed at the upper ends of the sidewall sections 3, 4. The top plate 71 is mounted on the sidewall sections 3 and 4 so as to be closer to the recording/reproducing unit 5 than the front surface formed with the opening 8a of the housing unit 8.

The rear side of the top plate 71 facing the housing section 8 is formed with positioning pieces 94, 94 for positioning the housing unit 8. These positioning pieces 94, 94 are protruded from the rear edge of the top plate 71 towards the housing unit 8 and are formed with hooked engagement end pieces 114. The positioning pieces 94, 94 are introduced into inserting grooves 115a of positioning members 115, 115 on the front side of the housing unit 8 for securing the housing unit 8 in position with respect to the top plate 71, as shown in FIG. 4.

The front side of each sub-tray 14 is formed with a vee groove 104 as a mating engagement portion, as shown in FIG. 6. The vee groove 104 plays the role of retaining the sub-tray 14 on the main tray 14 as will be explained subsequently. In the front side of the sub-tray 14 is formed an engagement recess 15 rearward of the vee groove 104. The engagement recess 15 is engaged by an engagement protrusion 90 of a slider 88 for moving the sub-tray 14 as later explained. The vee groove 104 and the engagement recess 15 are protruded forwardly from the sidewall sections 9a, 9b of the housing unit 8, when the sub-tray 14 is housed within the housing unit 8, as shown in FIGS. 4 and 6.

On a lateral side on the upper surface of each sub-tray 14 opposite to the vee groove 104 and the engagement recess 15 is formed a display section 17 having codes thereon for discriminating the sub-trays 14 from one another. In the bottom surface of the second recess 125 is formed a through-hole for disc detection 123 faced by a disc sensor 262 for sensing the presence or absence of the optical disc 301 on the sub-tray 14. The disc sensor 262 will be explained subsequently.

Figure 15:
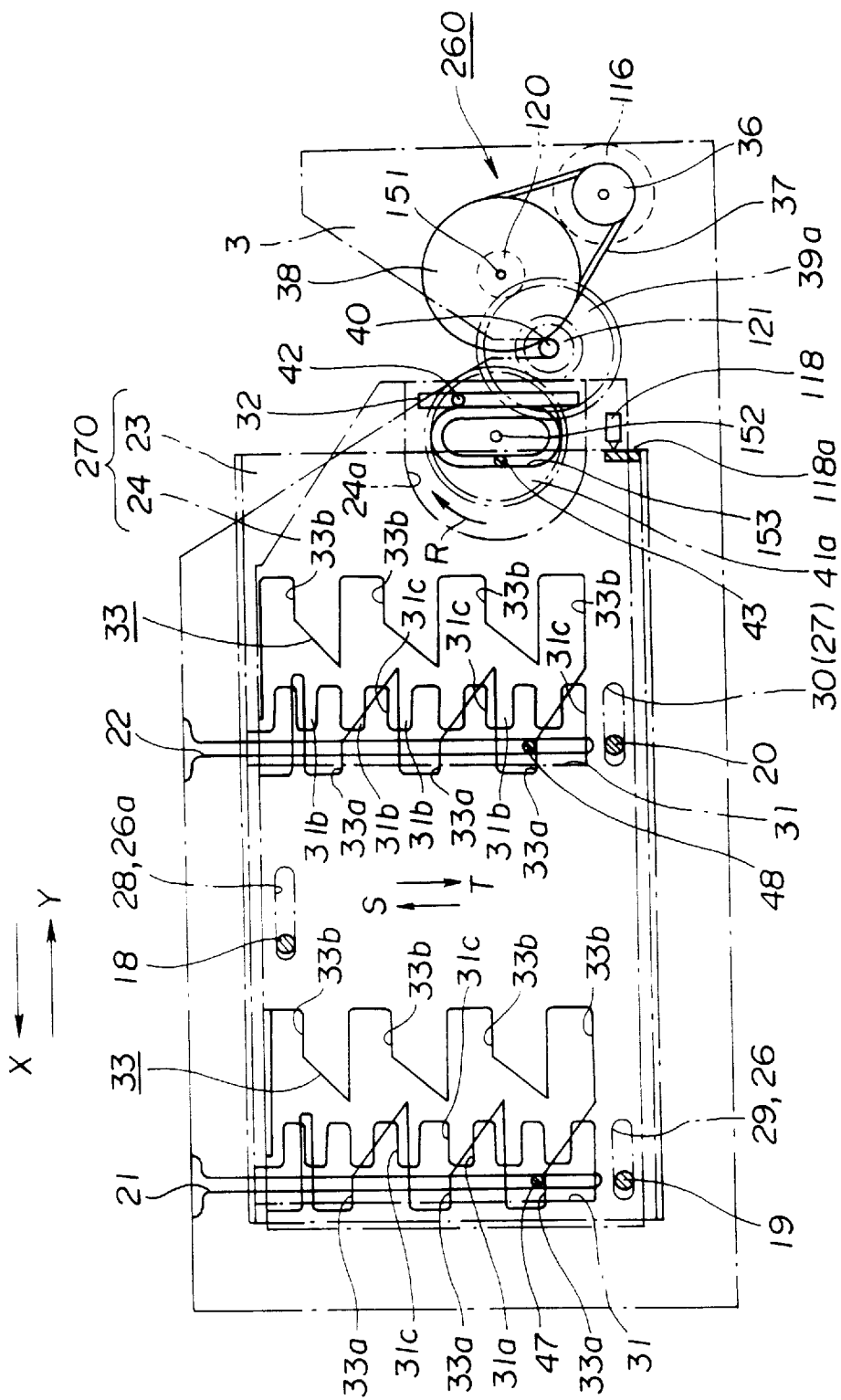
FIG. 15 is a side view showing a lift mechanism for lifting a lift block.

A lift base plate 44 for a lift block 25, carrying the main tray 75 and adapted for being uplifted and lowered by a lift mechanism 27 as later explained on a straight line with respect to the disc surface of the optical disc 301 housed within the housing unit 8 in directions shown by arrows S and T in FIG. 15, is mounted between the sidewall sections 3 and 4 formed upright on both lateral sides of the bottom plate 2 of the chassis 1, as shown in FIGS. 1, 8, 10 and 15. The lift base plate 44 is biased towards the bottom plate 2 of the chassis 1 by a tension coil spring 96 and torsion coil springs 100, 100 as will be explained subsequently.

On both lateral sides of the lift base plate 44 of the lift block 25 are formed supporting pins 47, 48, 47, 48, as shown in FIG. 1. The sidewall sections 3 and 4 of the chassis 1 are formed with vertically extending guide grooves 21, 22, 21, 22, as shown in FIGS. 1 and 15. The supporting pins 47, 48, 47, 48 provided in the lift base plate 44 are introduced into these lift guide grooves 21, 22, 21, 22. That is, the lift base plate 44 is uplifted and lowered by being guided by the lift guide grooves along a substantially vertically extending straight line relative to the surfaces of the optical discs 301 housed within the housing unit 8.

The upper ends of the lift guide grooves 21, 22, 21, 22 are opened, as shown in FIGS. 1 and 15, in order to permit the supporting pins 47, 48, 47, 48 of the lift base plate 44 to be engaged in and disengaged from the lift guide grooves.

On the outer lateral surfaces of the sidewall section 3, 4, left and right first and second cam plates 24, 23, 24, 23 making up the lift mechanism 27 for lifting the lift block 25 are mounted for movement in a fore-and-aft direction perpendicular to the lift guide grooves 21, 22, 21, 22. The first cam plate 24 is substantially planar and is formed with movement guide grooves 28, 29, 30 at an upper center portion and at both lower lateral sides, as shown in FIGS. 1 and 15. Supporting pins 18, 19, 20 are formed on the sidewall section 3 for extending towards the outside. These supporting pins 18 to 20 are passed through the movement guide grooves 28 to 30 for supporting the first cam plate 24 in the fore-and-aft direction within the range of the movement guide grooves 28 to 30. Another set of supporting pins 18 to 20 are formed on the opposite sidewall section 4, similarly to those of the sidewall section 3, for supporting the first cam plate 24 for movement in the fore-and-aft direction. The first cam plates 24, 24 are plane-symmetrically formed and arranged on the outer lateral surface of the sidewall sections 3 and 4.

The first cam plates 24 mounted on the sidewall sections 3 and 4 are formed with a pair of cam grooves 33, 33 extending parallel to the movement direction, as shown in FIG. 15. Within these cam grooves 33, 33 are formed a plurality of horizontal sections 33a, 33b in plurality of tiers, with inclined sections 33c, 33d being formed across the horizontal sections 33a, 33b. The horizontal sections 33a on the one side and the horizontal sections 33b on the opposite side are offset in height so as to be staggered relative to one another. The upper ends of the cam grooves 33, 33 are opened at the upper edge of the first cam plate 24 in order to permit the supporting pins 47, 48, 47, 48 of the lift base plate 44 to be engaged with and disengaged from the cam grooves 33, 33.

The horizontal sections 33a, 33b formed in the cam grooves 33, 33 are formed at a position of enabling the sub-trays 14 and the main trays 75 housed in tiers in the housing unit 8 to be protruded to the first position outside of the main body of the apparatus and at a position of loading the optical disc set on the sub-tray 14 on the recording/reproducing unit 5. The first cam plates 24, 24 mounted on the sidewall sections 3 and 4 are moved in directions shown by arrows X and Y in FIG. 15 between a rear position or initial position in which the horizontal sections 33a of the cam grooves 33, 33 formed towards the front side of an outer casing 155 constituting the main member of the apparatus are superposed on the lift guide grooves 21, 22, that is, an initial position in which the cam plates are moved towards the inner side of the main member of the apparatus, as indicated by arrow Y in FIG. 15, and a forward position in which the horizontal sections 33b facing the horizontal sections 33a of the rear side cam grooves 33, 33 are superposed on the lift guide grooves 21, 22, that is, an operating position in which the cam plates 24, 24 are moved towards the front side of the main member of the apparatus, as shown by arrows X and Y in FIG. 15.

The second cam plate 23 is planar and of substantially the same size as the first cam plate 24. The second cam plate has movement cam grooves 25, 26 and 27 at the upper center portion and at lower lateral portions. The supporting pins 18, 19 and 20, provided on the sidewall section 3, are intruded into these movement guide grooves 25, 26 and 27 for supporting the second cam plate 23 by the supporting pins 18 to 20 for movement within the extent of the movement guide grooves 25 to 27. On the opposite side sidewall section 4, similarly to the sidewall section 3, the second cam plate 23 is supported for movement in the fore-and-aft direction by supporting pins 18 to 20. These second cam plates 23, 23 are formed plane-symmetrically and mounted on the outer surfaces of the sidewall sections 3 and 4. That is, the second cam plate 23 is mounted on the sidewall sections 3 or 4 by the supporting pins 18 to 20 in common with the first cam plate 23 and is interposed between the first cam plate 24 and the sidewall section 3 or 4 so as to be superimposed on the first cam plate 24.

On the distal ends of the supporting pins 18 to 20 are mounted washers 35 for prohibiting descent of the first cam plate 24 and the second cam plate 23 supported by these supporting pins 18 to 20.

The second cam plate 23 is formed with a pair of rectangular apertures 31, 31 extending parallel to the movement direction, as shown in FIG. 15. A plurality of abutment supporting pieces 31a, 31b are formed in tiers parallel to one another from the rear side edges of these apertures 31, 31 lying towards the inside of the apparatus. The upper surfaces of these abutment supporting pieces 31a, 31b serve as abutment supporting surfaces 31c. The abutment supporting pieces 31a, 31b are coincident in height to the horizontal sections 33a, 33b formed within the cam grooves 33 formed in the second cam plate 24. The upper ends of the apertures 31, 31 are opened to permit insertion and removal of the supporting pins 47, 48, 47, 48 of the lift base plate 44.

These second cam plates 23, 23 are moved between the supporting position in which the abutment supporting pieces 31a, 31b have been moved towards the forward side of the main member of the apparatus and in which the supporting pins 47, 48, 47, 48 of the lift base plate 44 are supported on the respective abutment supporting pieces 31a, 31b and the non-supporting position in which the abutment supporting pieces 31a, 31b are receded from the lift guide grooves 21, 22 so that the supporting pins 47, 48, 47, 48 of the lift base plate 44 are no longer supported by the abutment supporting pieces 31a, 31b, with the lift base plate 44 being enabled to be uplifted and lowered with the supporting pins being guided by the lift guide grooves 21, 22.

At the rear end of the second cam plate 23, disposed in the inside of the main member of the apparatus, there is mounted an engagement pin 43 engaged in a cam groove 153 of first and second cam gears 41a, 41b which will be explained subsequently.

The supporting pins 47, 48, 47, 48 on both lateral sides of the lift base plate 44 are introduced into the lift guide grooves 21, 22, 21, 22, in the apertures 31, 31, 31, 31 of the second cam plates 23, 23 and into the cam grooves 33, 33, 33, 33 of the first cam plates 24, 24, as shown in FIGS. 1 and 15.

Figure 8:
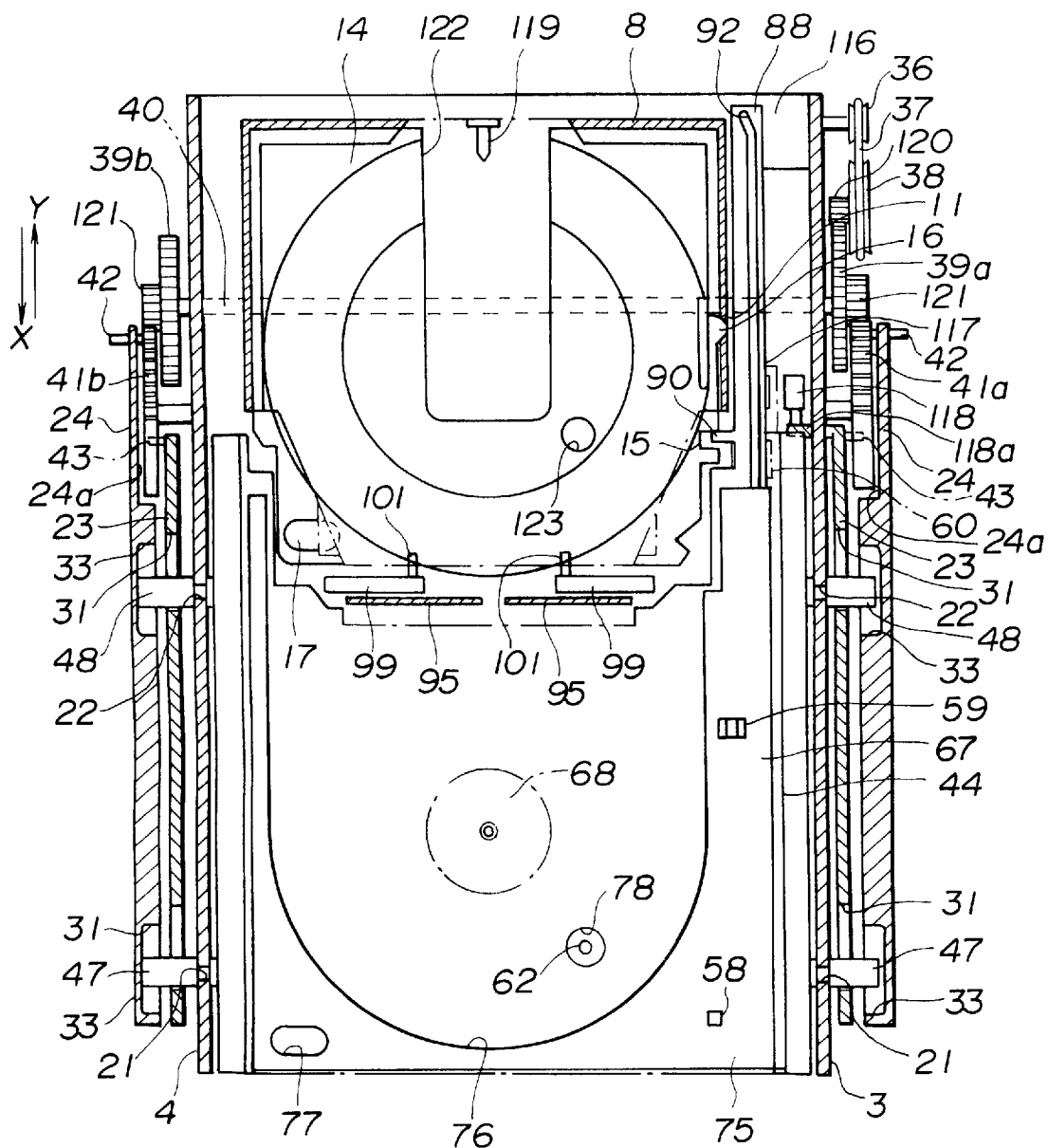
FIG. 8 is a plan view showing the state in which the sub-tray is housed within the housing section in the disc recording and/or reproducing apparatus according to the present invention.
Figure 9:
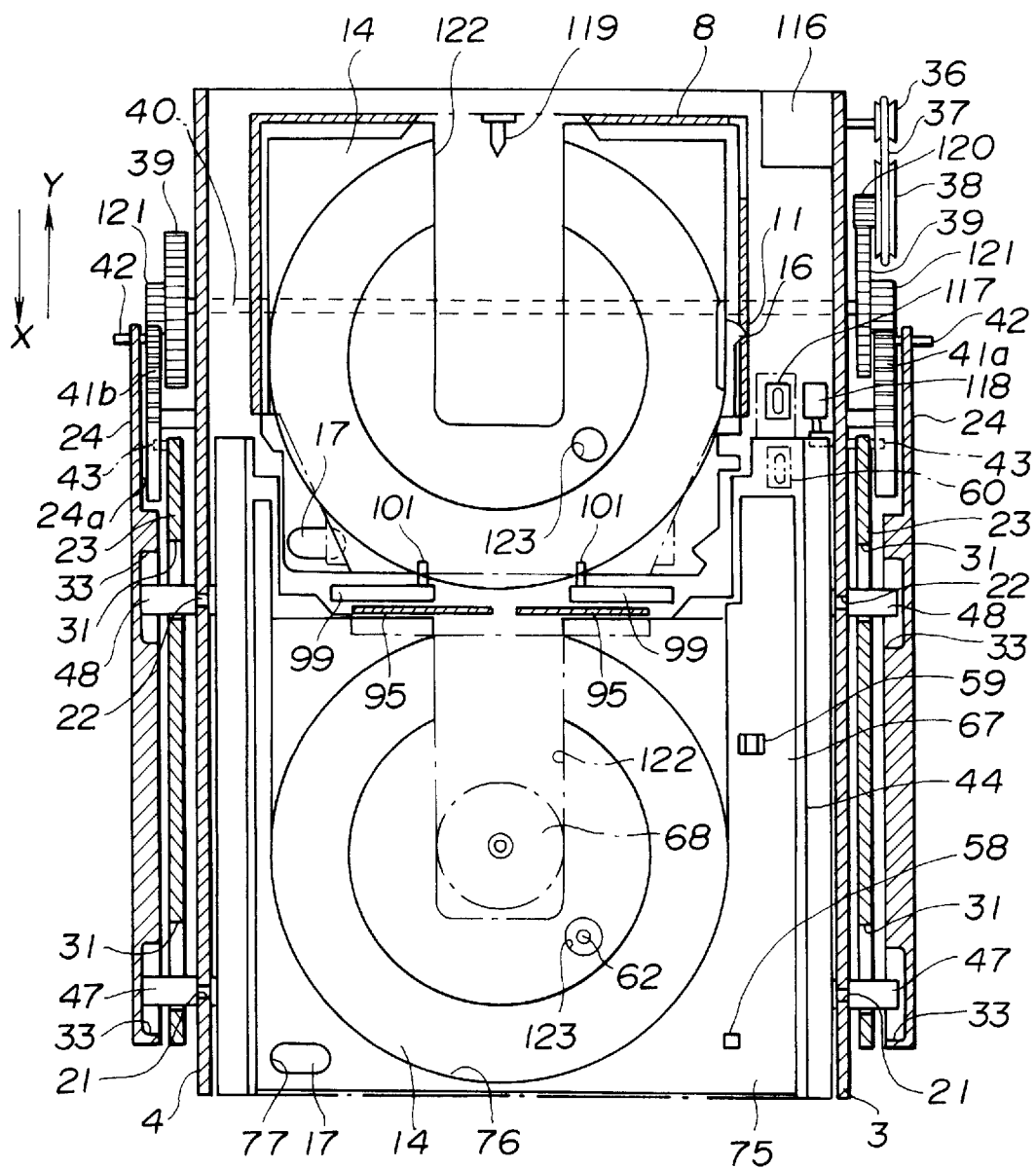
FIG. 9 is a plan view showing the state in which the sub-tray has been extracted out of the housing section and moved to the recording/reproducing position.
Figure 10:
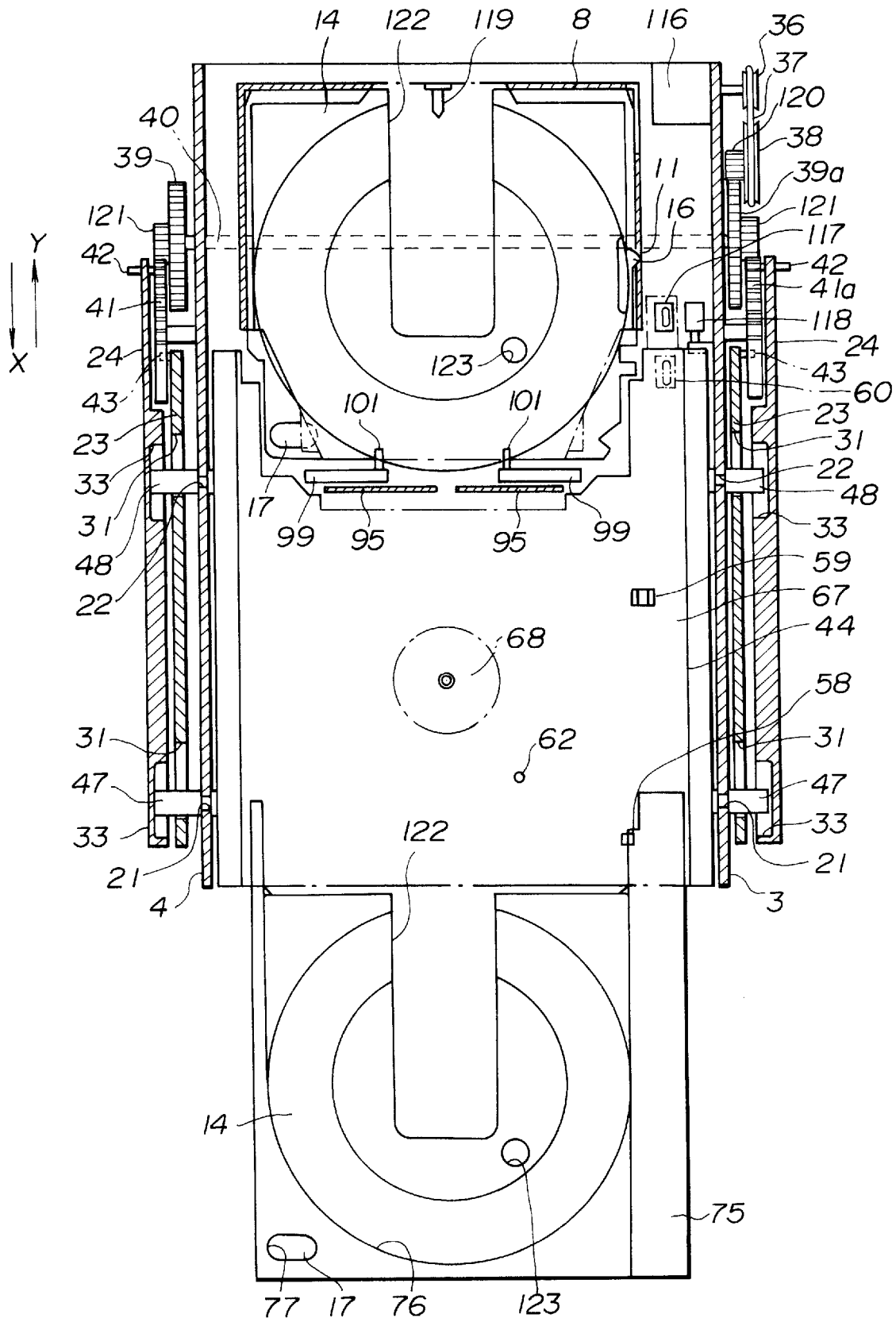
FIG. 10 is a plan view showing the state in which the sub-tray held on a main tray has been extracted out of the main member of the apparatus.

The lift mechanism 27, made up of a first cam plate 24 and a second cam plate 23 for uplifting and lowering the lift block 25 inclusive of the lift base plate 44, is driven by a lift driving motor 116 mounted on the sidewall section 3. The driving force of the lift driving motor 116 is transmitted by means of a driving pulley 36 mounted on a driving shaft of the lift driving motor 116 and a driving belt 37 placed around the driving pulley 36 to a follower pulley 38 carrying the driving belt 37, as shown in FIG. 15. The follower pulley 38 is rotatably mounted on the sidewall section 3 by means of a supporting shaft 151. The follower pulley 37 is integrally formed with a gear 120 meshing with a first drive transmitting gear 39a mounted on one end of a supporting shaft 40 supported for rotation across the opposing sidewall sections 3 and 4, as shown in FIGS. 8 to 10. The drive force transmitting gear 39 is integrally formed with a small-sized gear 121 meshing with a first driving cam gear 41a rotatably mounted by means of a supporting shaft 152 on the sidewall section 3.

On the opposite side of the supporting shaft 40 is mounted a second drive transmitting gear 39b, as shown in FIGS. 8 to 10. The second drive transmitting gear 39b is integrally formed with the small-sized gear 121 meshing with a second driving cam gear 41b rotatably mounted by means of supporting shaft 152 on the sidewall section 4. Thus the first and second driving cam gears 41a, 41b are run in rotation in the same direction by rotation of the lift driving motor 116.

The first and second driving cam gears 41a, 41b are mounted at the back of the first and second cam plates 23, 24, 23, 24 mounted on the sidewall sections 3, 4, and are partially intruded into a space between the cam plates 24, 23, 24, 23, as shown in FIGS. 8 to 10. On one of the major surfaces of the first and second driving cam gears 41a, 41b are set driving pins 42 intruded into elongated grooves 32 formed in the first cam plates 24 along the height-wise direction. When the first and second driving cam gears 41a, 41b complete one revolution, the first cam plates 24, 24 compete one reciprocating movement in the fore-and-aft direction indicated by arrows X and Y in FIG. 15 between an initial position in which the first cam plates are moved towards the inside of the main member of the apparatus to support the supporting pins 47, 48 mounted on the lift base plate 44 and an operative position in which the first cam plates are moved forward to discontinue the support by the supporting pins 47, 48 to enable the lifting of the lift base plate 44. The rear surface portions of the first cam plates 24, 24 facing the first and second driving cam gears 41a, 41b are formed with recesses 24a in which are intruded portions of the first and second driving cam gears 41a, 41b.

Figure 44:
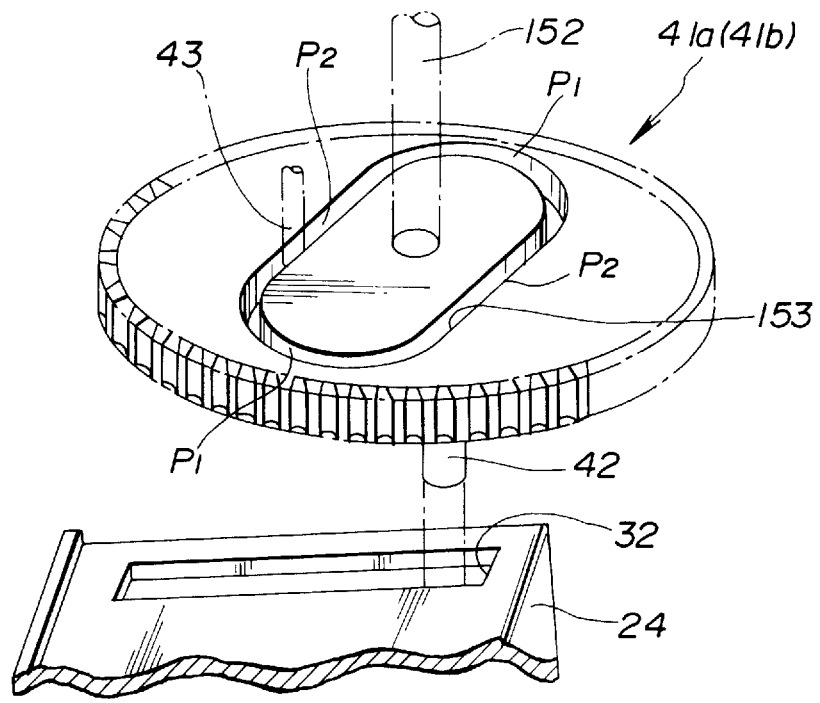
FIG. 44 is an enlarged perspective view showing a driving cam gear of a lift driving mechanism.

In the opposite major surface of each of the first and second driving cam gears 41a, 41b facing the second cam plates 23, 23 are formed elliptically-shaped cam grooves 153, 153, as shown in FIG. 44. Each of the cam grooves 153 has two distal points $P_1$, $P_1$ spaced apart 180° from each other and two mesial points $P_2$, $P_2$ spaced from the distal points by 90° and spaced apart from each other by 180°. This cam groove 153 is engaged by an engagement pin 43 mounted upright on the second cam plate 23. That is, when the first and second driving cam gears 41a and 41b complete one revolution, the second cam plates 23, 23, mounted on the sidewall sections 3 and 4, complete two reciprocating movements as indicated by arrows X and Y in FIG. 15 between the supported position in which the second cam plates have been moved to the forward side of the main member of the apparatus as indicated by arrow X so as to be supported by the supporting pins 47, 48 and the non-supported position in which the second cam plates have been moved into the inner side of the main member of the apparatus as indicated by arrow Y so as to be no longer supported by the supporting pins 47, 48.

Figure 30:
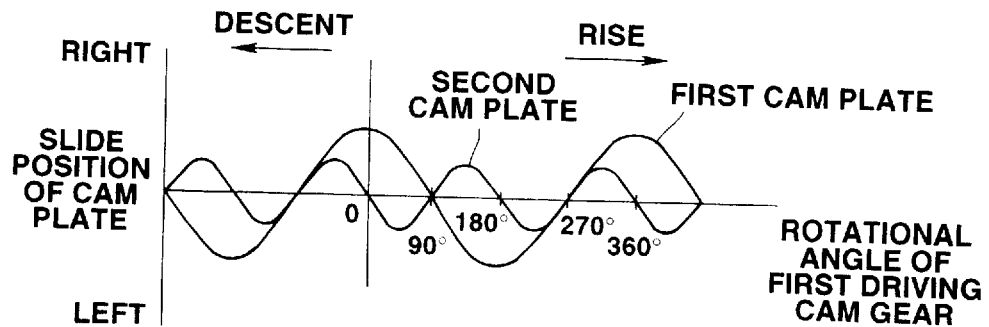
FIG. 30 is a graph showing the state of movement of the first and second cams lifting the lifting block.
Figure 31:
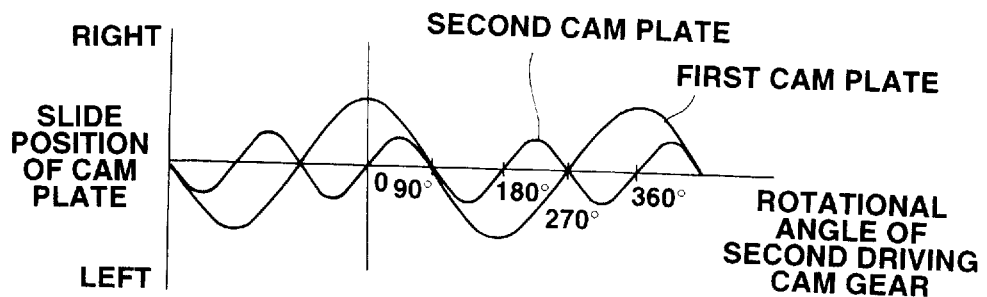
FIG. 31 is a graph showing the state of movement of the first and second cam plates, with the direction of the phase shift between the first and second cam plates being reversed.

The first and second cam plates 24, 23, 24, 23 are periodically reciprocated with a constant phase difference from each other as indicated by arrows X and Y in FIG. 15 by rotation of the first and second driving cam gears 41a, 41b. When the rotational direction of the first cam gear 41a is clockwise, as shown in FIG. 30, the first and second cam plates 23, 24, mounted on the sidewall section 3, undergo the phase lag of 45°, in terms of the rotational angle of the first driving cam gear 41a, between the maximum slide position of the first cam gear 24, that is, the initial position of maximum rightward movement indicated by arrow Y in FIG. 15, or the maximum leftward position indicated by arrow X in FIG. 15 associated with the lift movement of the lift block 25, and the maximum slide position of the second cam plate 23, that is, the maximum rightward movement indicated by arrow Y in FIG. 15 corresponding to the non-supporting position of the supporting pins 47, 48. On the other hand, when the rotational direction of the second cam gear 41b is counterclockwise, as shown in FIG. 31, the first and second cam plates 23, 24, mounted on the sidewall section 4, undergo the phase lead of 45°, in terms of the rotational angle of the first driving cam gear 41a, between the maximum slide position of the first cam gear 24, that is, the initial position in which the cam plates are supported by the supporting pins 47, 48 provided on the lift base plate 44 or the non-supporting position of enabling lift movement of the lift block 25, and the maximum slide position of the second cam plate 23, that is, the non-supporting position of the cam plates by the supporting pins 47, 48.

On the sidewall section 3 is mounted a second detection switch 118 for detecting that the second cam plate 23 is moved to the innermost position in the main member of the apparatus indicated by arrow Y in which it is not supported by the supporting pins 47, 48, as shown in FIGS. 8 to 10. When the second cam plate 23 is moved to the innermost non-supporting position as shown in FIG. 8. The second detection switch 118 is thrust by a switch thrusting piece 118a provided at the rear side of the second cam plate 23 for detecting that the second cam plate 23 is at the non-supporting position. That is, by counting the number of times the second detection switch 118 is thrust, it becomes possible to detect the number of times of reciprocating movement of the second cam plate 23, that is, the distance of vertical travel of the lift base plate 44.

On the bottom plate 2 of the chassis 1 is mounted a first detection switch 117 facing the rear end of the lift base plate 44 disposed in the inside of the main member of the apparatus. This first detection switch 117 is thrust by the lift base plate 44 when the lift base plate is at the loading position of loading the optical disc set on the sub-tray 14 held on the main tray 75 moved to the lowermost position towards the bottom plate 2 of the chassis 1. Thus the lift position of the lift block 25 inclusive of the lift base plate 44 can be detected by counting the number of times the second detection switch 118 is thrust by the second cam plate 23 after the first detection switch 117 is thrust by the second cam plate 23. That is, with the present embodiment, it is possible to detect the vertical position of the lift block 25 as measured from the lowermost loading position.

The lift mechanism, having the above-described first and second cam plates 24, 23, is able to uplift or lower the lift base plate 44 responsive to the forward or backward rotation of the lift driving motor 116 of the lift driving mechanism 26.

The operation of uplifting and lowering the lift base plate 44 will now be explained.

Figure 16:
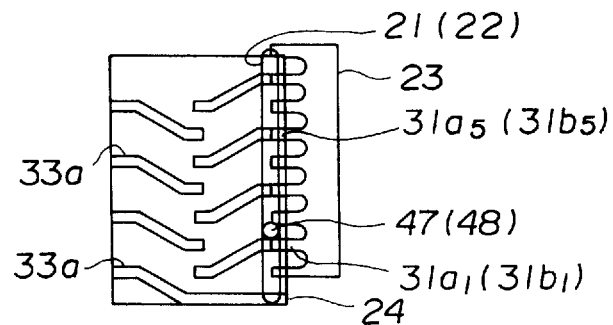
FIG. 16 is a side view showing the relative position of each cam plate in an initial state of first and second cam plates of the lift mechanism for lifting the lift block.
Figure 17:
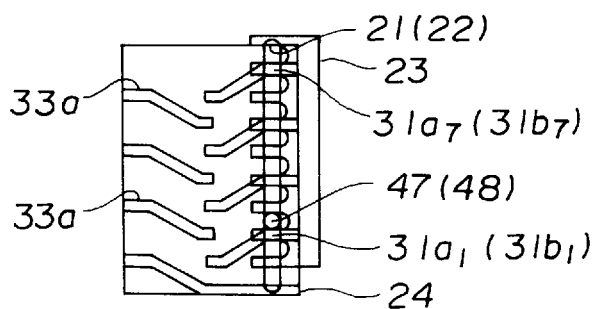
FIG. 17 is a side view showing the relative position of first and second cams when the driving cam gear has been rotated through 30°.
Figure 18:
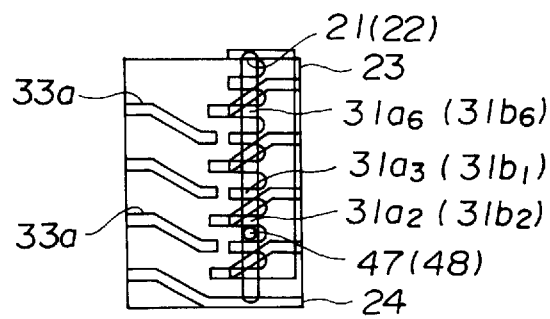
FIG. 18 is a side view showing the relative position of the first and second cams when the driving cam gear has been rotated through 60°.

The first and second driving cam gears 41a, 41b are at an initial rotational position shown in FIG. 15 in which the long side of the elliptically-shaped cam groove 153 is parallel to the lift direction of the lift base plate 44 indicated by arrows S and T in FIG. 15, while the first cam plate 24 is at the rear initial position in which it is moved to a rear position within the inside of the main member of the apparatus. The supporting pins 47, 48 provided on the lift base plate 44 are supported on one of a plurality horizontal sections 33a, 33b formed in tiers in the cam grooves 33 of the first cam plate 24. It is assumed that the supporting pins 47, 48 are positioned on the n'th lowermost horizontal section 33b disposed on the opposite side of the cam groove 33, as shown in FIG. 16. If the first driving cam gear 41a is rotated through 30° in the forward direction as indicated by arrow R towards right in FIG. 15, the supporting pins 47, 48 are supported on the abutment supporting surfaces 31c of the supporting pieces 31a, 31b of the second cam plate 23, as shown in FIG. 17. That is, the supporting pins 47, 48 of the lift base plate 44 are supported on the n'th lowermost supporting pieces 31a, 31b. When the first and second driving cam gears 41a, 41b are further rotated in the forward direction to a position rotated 60° from the initial position, the supporting pins 47, 48 are supported on the abutment supporting surfaces 31c of the supporting pieces 31a, 31b of the second cam plate 23 and positioned between the opposite side plurality of horizontal sections 33b of the cam groove 33 of the first cam plate 24, as shown in FIG. 18. The supporting pins 47, 48, positioned between the plurality of horizontal sections 33b of the cam groove 33, are supported on the abutment supporting surfaces 31c of the supporting pieces 31a, 31b of the second cam plate 23 and are thereby prohibited from making downward movement.

Figure 19:
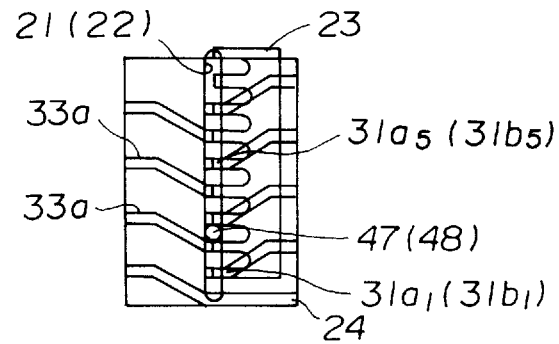
FIG. 19 is a side view showing the relative position of the first and second cams when the driving cam gear has been rotated through 90°.
Figure 20:
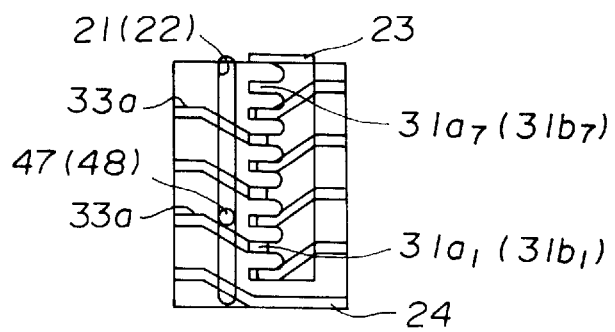
FIG. 20 is a side view showing the relative position of the first and second cams when the driving cam gear has been rotated through 120°.
Figure 21:
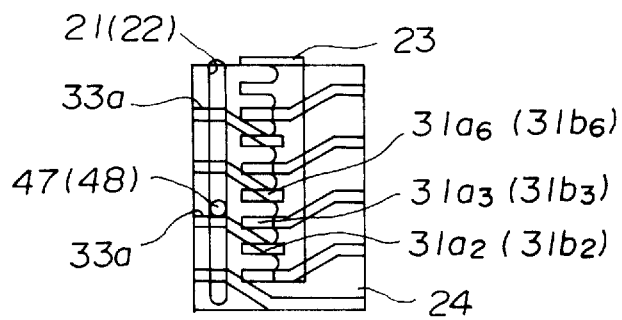
FIG. 21 is a side view showing the relative position of the first and second cams when the driving cam gear has been rotated through 150°.

When the first and second cam gears 41a, 41b are rotated in the forward direction to a position rotated 90° from the initial position, the second cam plate 23 is about to be moved in a direction away from the position in which the second cam plate 23 supports the supporting pins 47, 48 on the supporting pieces 31a, 31b, as shown in FIG. 19. However, the supporting pins 47, 48 are positioned towards the inclined surface section 33c contiguous to the horizontal section 33a formed on one side of the first cam groove 33. When the first and second driving cam gears 41a, 41b are rotated further in the forward direction and reach the position rotated 120° from the initial position, the supporting pins 47, 48 are disengaged from the supporting pieces 31a, 31b so as to be supported on the inclined surface section 33 contiguous to the horizontal section 33a formed on one side of the cam groove 33 of the first cam plate 24, as shown in FIG. 20. When the first and second driving cam gears 41a, 41b are rotated further in the forward direction and reach the position rotated 150° from the initial position, the supporting pins 47, 48. Reach the (n+1)'th horizontal section 33a, which is directly above the n'th lowermost horizontal section 33b corresponding to the initial state for the supporting pins 47, 48, as shown in FIG. 20.

Figure 22:
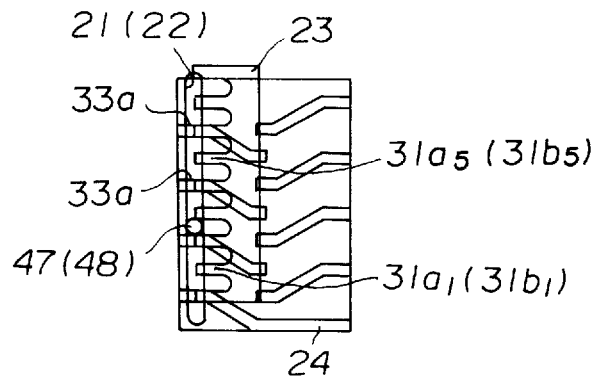
FIG. 22 is a side view showing the relative position of the first and second cams when the driving cam gear has been rotated through 180°.
Figure 23:
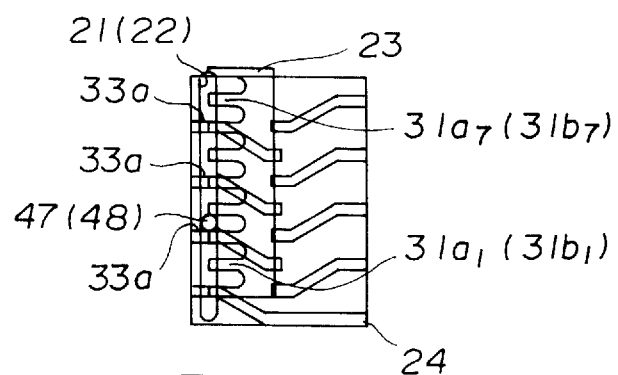
FIG. 23 is a side view showing the relative position of the first and second cams when the driving cam gear has been rotated through 180°.
Figure 24:
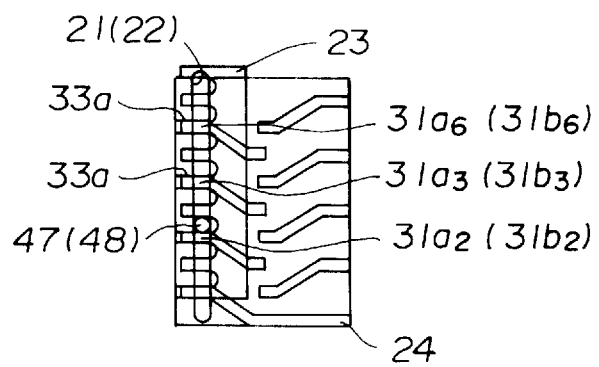
FIG. 24 is a side view showing the relative position of the first and second cams when the driving cam gear has been rotated through 210°.
Figure 25:
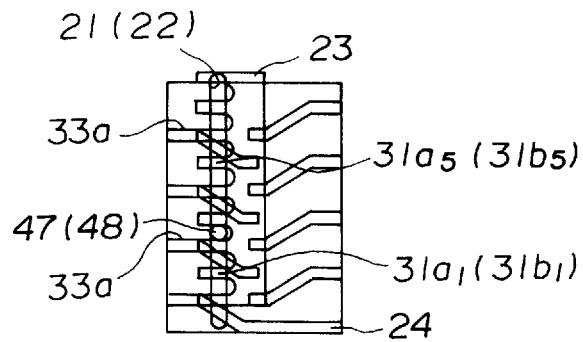
FIG. 25 is a side view showing the relative position of the first and second cams when the driving cam gear has been rotated through 240°.

When the first and second driving cam gears 41a, 41b are rotated further in the forward direction and reach the position rotated 180° from the initial position, the supporting pins 47, 48 are supported on the horizontal section 33a on one side of the first cam plate 24 in order to permit lifting of the lift base plate 44, as shown in FIGS. 22 and 23. When the first and second driving cam gears 41a, 41b are rotated further in the forward direction and reach the position rotated 210° from the initial position, the supporting pins 47, 48 are supported on the abutment support surfaces 31c of the support pieces 31a, 31b of the second cam plate 23, as shown in FIG. 24. When the first and second driving cam gears 41a, 41b are rotated further in the forward direction and reach the position rotated 240° from the initial position, the supporting pins 47, 48 are supported on the abutment support surfaces 31c of the support pieces 31a, 31b of the second cam plate 23, and are located between a plurality of horizontal sections 33a on one of the cam grooves 33 of the first cam plate 24, as shown in FIG. 24.

At this time, the supporting pins 47, 48 are positioned between a plurality of horizontal sections 33a of the first cam groove 33 of the first cam groove 24. However, the supporting pins 47, 48 are supported on the abutment supporting surfaces 31c of the supporting pieces 31a, 31b of the second cam plate 23 and hence are prohibited from making downward movement.

Figure 26:
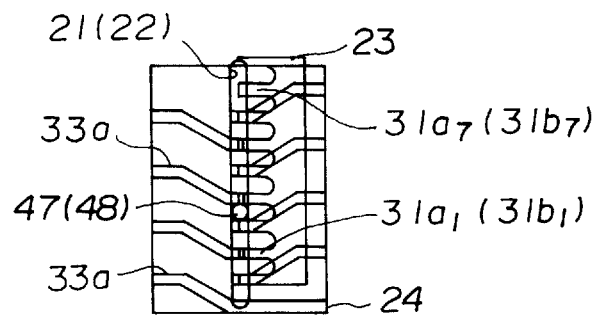
FIG. 26 is a side view showing the relative position of the first and second cams when the driving cam gear has been rotated through 270°.
Figure 27:
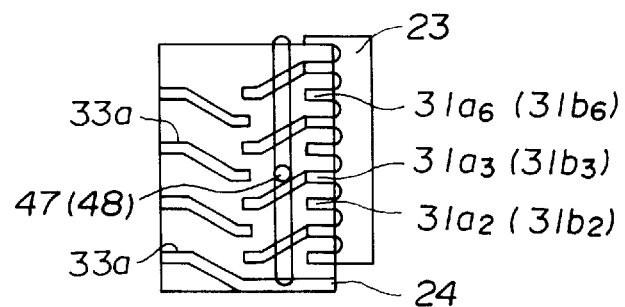
FIG. 27 is a side view showing the relative position of the first and second cams when the driving cam gear has been rotated through 300°.
Figure 28:
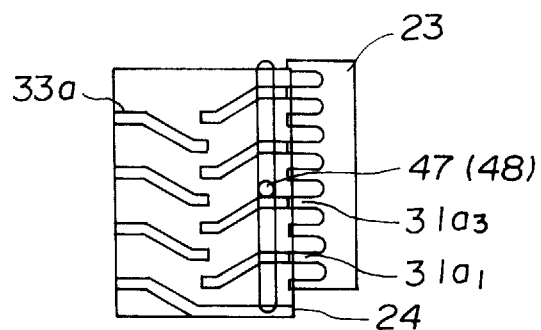
FIG. 28 is a side view showing the relative position of the first and second cams when the driving cam gear has been rotated through 330°.

When the first and second driving cam gears 41a, 41b are rotated further in the forward direction and reach the position rotated 270° from the initial position, the supporting pins 47, 48 are about to be moved in a direction away from the state in which the supporting pins 47, 48 are supported on the supporting pieces 31a, 31b of the second cam plate 23, as shown in FIG. 26. However, the supporting pins 47, 48 are positioned on the inclined surface section 33c contiguous to the horizontal section 33b provided on the opposite side in the cam groove 33 of the first cam plate 24. When the first and second driving cam gears 41a, 41b are rotated further in the forward direction and reach the position rotated 300° from the initial position, the supporting pins 47, 48 are disengaged from the supporting pieces 31a, 31b of the second cam plate 23 so as to be supported on the horizontal section 33b provided on the opposite side in the cam groove 33 of the first cam plate 24. When the first and second driving cam gears 41a, 41b are rotated further in the forward direction and reach the position rotated 330° from the initial position, the supporting pins 47, 48 are positioned in the vicinity of the horizontal section 33b on the opposite side in the cam groove 33 of the first cam plate 24. When the first and second driving cam gears 41a, 41b are rotated further in the forward direction and reach the position rotated 360° from the initial position, that is, restored to the initial position, the supporting pins 47, 48 reach the (n+2)'th lowermost horizontal section 33a two tiers above the n'th lowermost horizontal section 33b on which the supporting pins were supported at the initial state.

That is, when the first and second driving cam gears 41a, 41b are rotated through 180° in the forward direction indicated by arrow R in FIG. 15, the supporting pins 47, 48 of the lift base plate 44 are moved from the (n+1)'th lowermost horizontal section 33b on one side in the cam groove 33 which is directly above the n'th horizontal section 33b on the opposite side in the cam groove 33 of the first cam plate 24. When the first and second driving cam gears 41a, 41b are rotated through 360° in the forward direction indicated by arrow R in FIG. 15, the supporting pins 47, 48 of the lift base plate 44 are moved to the (n+2)'th lowermost horizontal section 33b two tiers above the n'th lowermost horizontal section 33b on the opposite side in the cam groove 33 of the first cam plate 24. By continued forward rotation of the first and second driving cam gears 41a, 41b, the lift base plate 44 is sequentially uplifted tier by tier over the supporting lugs 31a, 31b of the second cam plate 23 in the uplifting direction shown by arrow S in FIG. 15.

Figure 29:
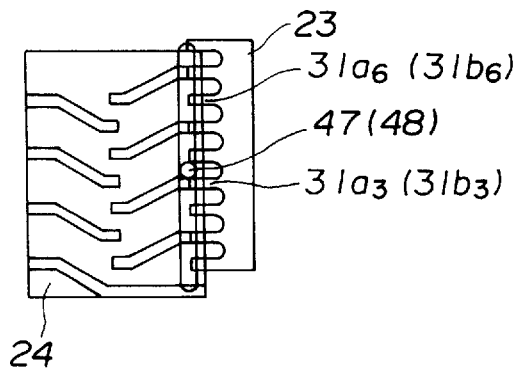
FIG. 29 is a side view showing the relative position of the first and second cams when the driving cam gear has been rotated through 360°.

When the first and second driving cam gears 41a, 41b are rotated in reverse in a direction opposite to that shown by arrow R in FIG. 15, the process reverse to that indicated in FIGS. 16 to 29 is carried out, that is, the state in which the supporting pins 47, 48 are supported on the n'th lowermost horizontal section 33a as shown in FIG. 16 is reached beginning from the state in which the supporting pins 47, 48 are supported on the (n+2)'th lowermost horizontal section 33a shown in FIG. 29. That is, the lift base plate 44 is moved downwards as indicated by arrow T in FIG. 15. Thus the lift base plate 44 is sequentially moved downwards by continued reverse rotation of the first and second driving cam gears 41a, 41b in a direction opposite to that shown by arrow R in FIG. 15.

Since the lift base plate 44 of the lift block 25 is perpetually biased towards the bottom plate 2 by a coil spring 96 having its one end retained by a spring retainer 97 formed in the lift base plate 97 provided on the bottom plate 2 of the chassis 1, the lift block 25 is positively lifted under the driving power of a lift driving motor 116 although the main member of the apparatus has been levelled down.

The lift block 25, inclusive of the lift base plate 44, lifted by the above-mentioned lift mechanism, is placed facing the upper surface of the recording/reproducing unit 5 which is the loading surface for the optical disc, as shown in FIGS. 1 and 32. The lift block 25 also constitutes a disc holding mechanism since it is provided with a main tray 75 which holds the sub-tray 14 extracted from the housing unit 8 and which is lifted along with the lift block 25. The lift base plate 44 of the lift block plays the role of a base member for movably supporting the main tray 75 holding the sub-tray 14 extracted from the housing unit 8. As explained above, the lift base plate 44 is supported for lifting movement by the supporting pins 47, 48, 47, 48 on its both sides for vertical movement between the opposing sidewall sections 47, 48, 47, 48 of the chassis 1, and is uplifted and lowered by the lift mechanism in directions indicated by arrows S and T in FIG. 32.

Figure 3:
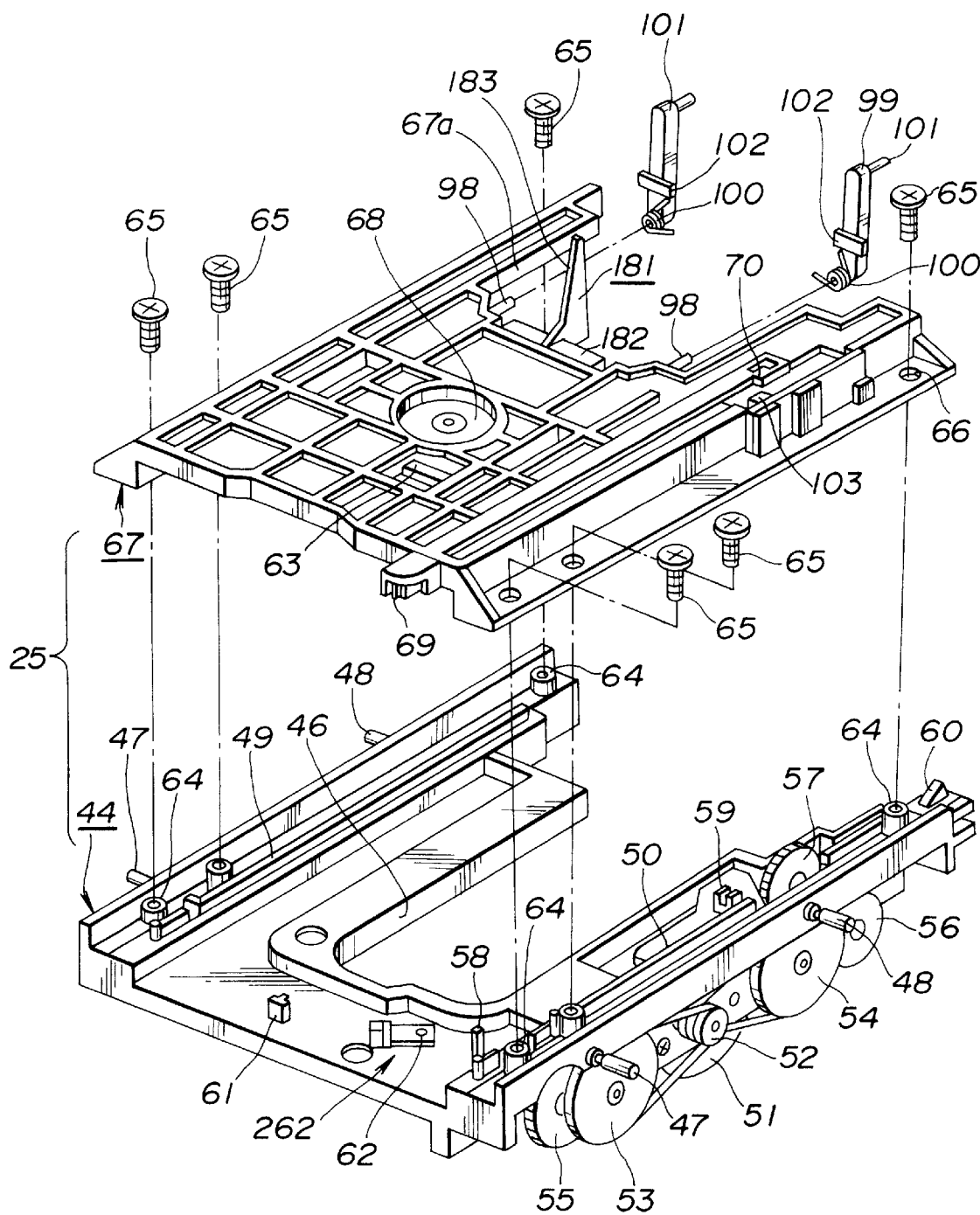
FIG. 3 is an exploded perspective view showing a lift block of the disc recording and/or reproducing apparatus according to the present invention.

The lift base plate 44 is in the form of a substantially flat plate, slightly larger in size than the sub-tray 14 housed within the housing unit 8 adapted for setting the optical disc 301 thereon, and has a U-shaped cut-out 46 extending from its proximal side disposed in the inner side of the apparatus towards the center, as shown in FIG. 1. The cover plate 67 is mounted on the upper surface of the lift base plate 44 for constituting the lift block, as shown in FIG. 3. The cover plate 67 is in the form of a substantially flat plate having a U-shaped cut-out 67a extending from its rear side disposed in the inner side of the apparatus towards the center, and is attached to the lift base plate 44 by set screws 65 on its opposite sides. That is, the cover plate 67 is attached to the lift base plate 44 by having the set screws 65 inserted into a plurality of screw inserting holes 66 formed on both sides of the cover plate 67 in threaded engagement with a plurality of tapped bosses 64 on both sides of the lift base plate 44.

At a mid portion of the base plate 67 is rotatably mounted a chuck plate 68 which is in the form of a disc of substantially the same size as the disc table 6 of the recording/reproducing unit 6 and which is disposed directly above the disc table 6. The chuck plate 68 faces downwards by means of the cut-out 46 in the lift base plate 44 for facing the disc table 6.

Figure 12:
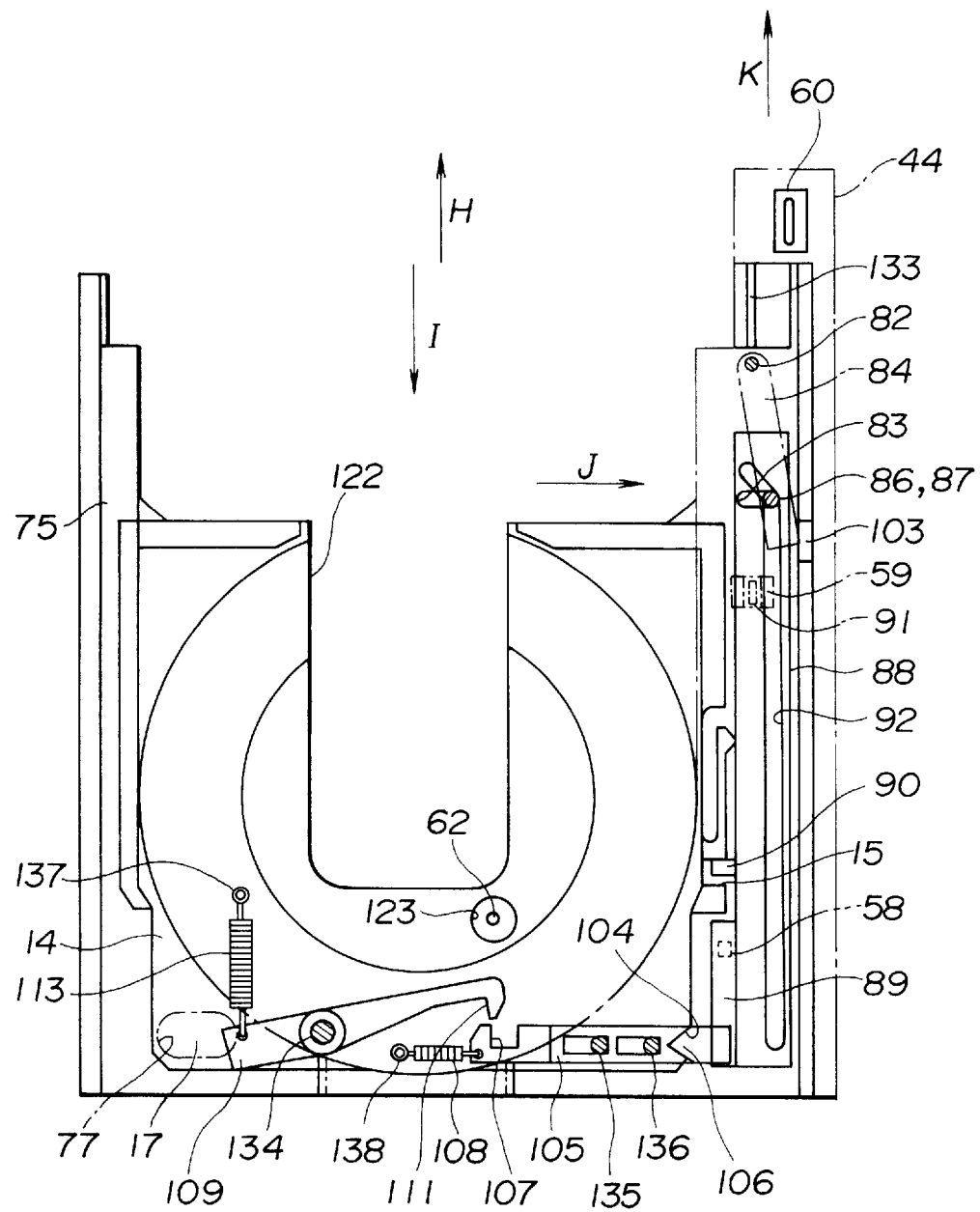
FIG. 12 is a plan view showing the lift block, main tray and the sub-tray with the sub-tray being moved to the recording/reproducing position.

The lift base plate 44 and the cover plate 67 are tightened only on both lateral sides thereof for defining a spacing therebetween for accommodating the main tray 75. The spacing for the main tray 75 is opened at the front and rear sides of the lift block. The main tray 75 arranged in the spacing of the lift block is in the form of a saucer opened on the upper side and at a mid portion on the lower side, so that the sub-tray 14 is introduced from its rear side. The sub-tray 14, thus held on the main tray 75, has its first recess 124 exposed to the upper outer side by means of the cut-out 76 on the upper surface of the main tray 75, as shown in FIGS. 9 and 12.

Figure 37:
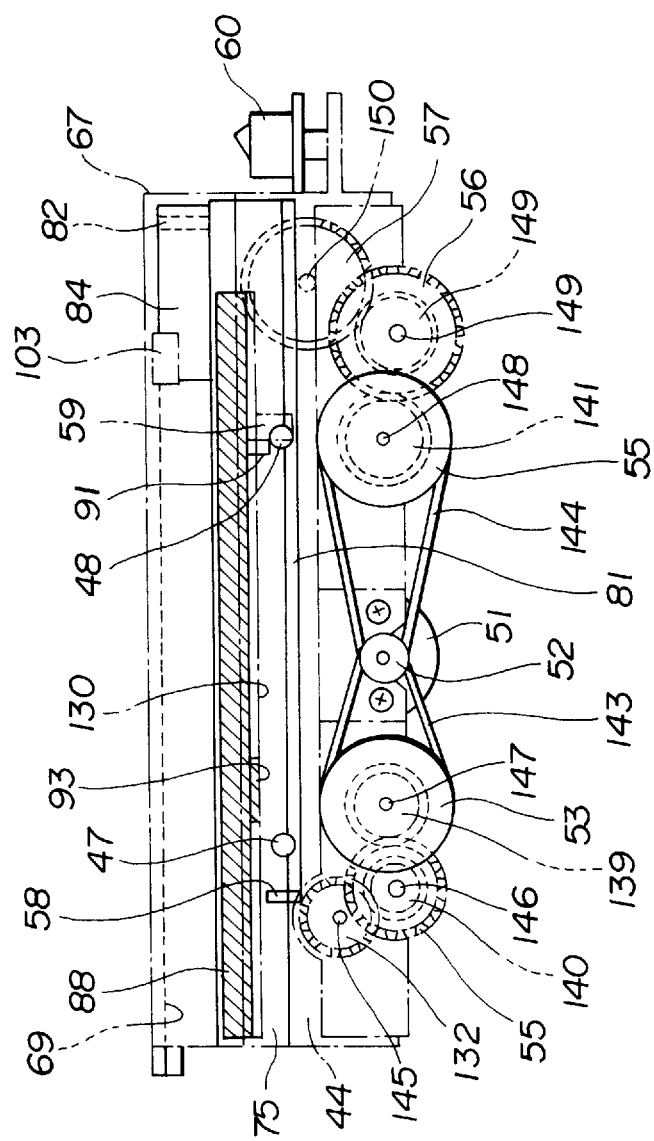
FIG. 37 is a side view showing the lift block, main tray and the sub-tray with the sub-tray having been moved to the recording/reproducing position and with the slider being moved to the outside of the apparatus.
Figure 38:
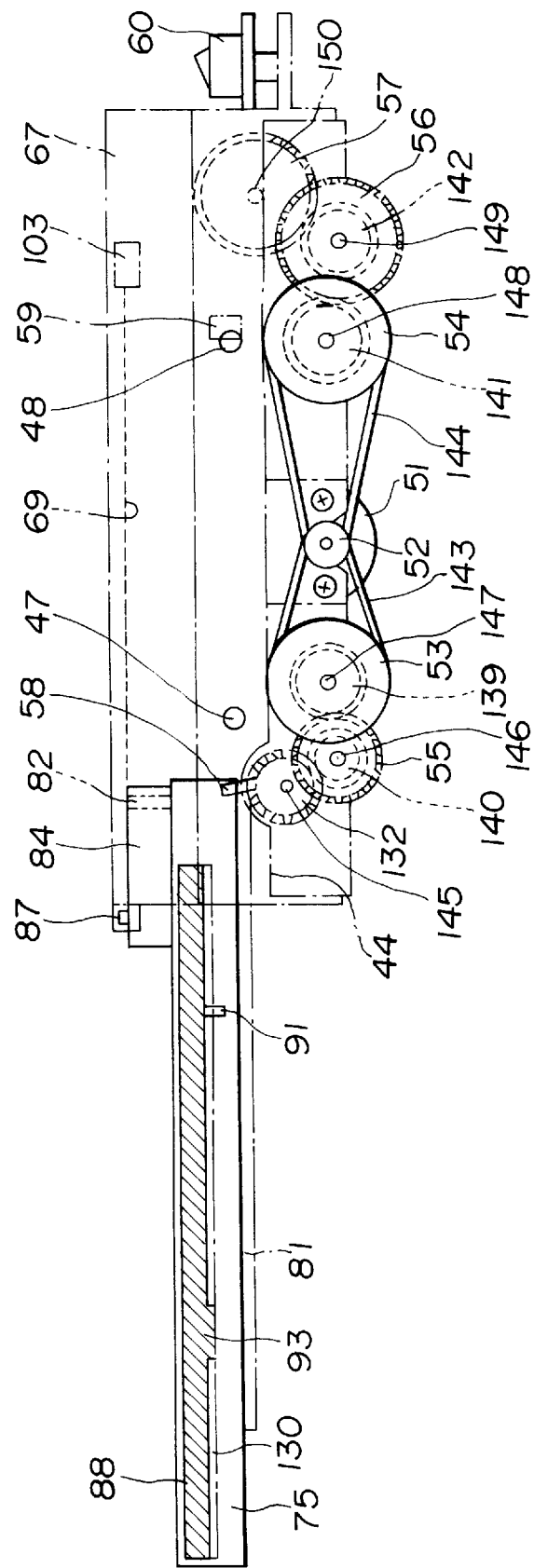
FIG. 38 is a side view showing the lift block main tray and the sub-tray with the sub-tray having been protruded out of the main member of the apparatus to an ejecting position.
Figure 39:
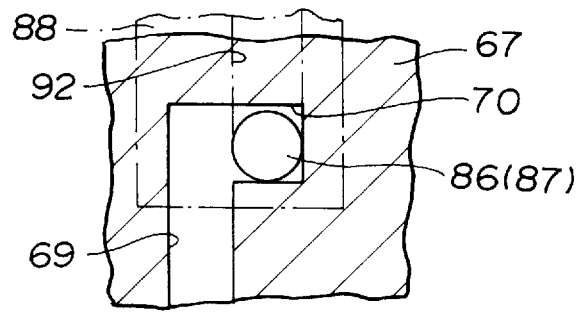
FIG. 39 is a schematic enlarged plan view showing the relative position of the first and second cams when the slider has caused the sub-tray to be housed within the housing section.
Figure 40:
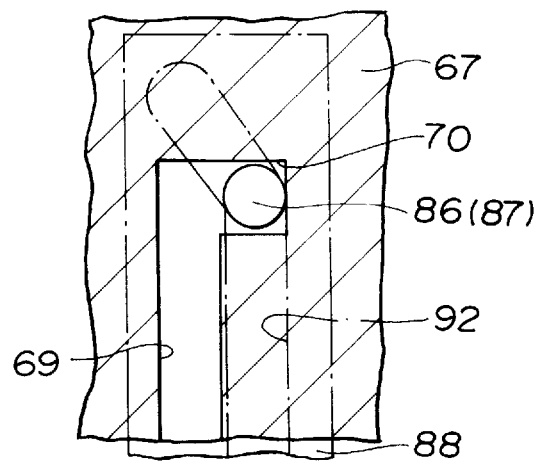
FIG. 40 is a schematic enlarged plan view showing the relative position of the first and second cams when the slider has moved the sub-tray to the recording/reproducing position.

The main tray 75 is movable in the fore-and-aft direction by having its lower lateral surface portions supported on a pair of guide rails 49, 50 formed on both lateral side sections of the lift base plate 44 for extending in the fore-and-aft direction. That is, the main tray 75 is supported for movement by means of a pair of guide rails 49, 50 between a second position or a recording/reproducing position facing the recording/reproducing unit 5 on the bottom plate 2 of the chassis 1 accommodated in the space between the lift base plate 44 and the cover plate 67 as shown in FIG. 9 and 37 and a first position or an ejecting position in which the main tray is protruded towards the front side of the outer casing 155 of the main member of the apparatus from the space between the lift base plate 44 and the cover plate 67, as shown in FIGS. 10 and 38. That is, since the lift block 25 is perpetually at the recording/reproducing position facing the recording/reproducing unit 5, the main tray 75 is moved relative to the lift block 75 between the second position or the recording/reproducing position within the main member of the apparatus and the first position protruded outwardly of the main member of the apparatus.

Figure 2:
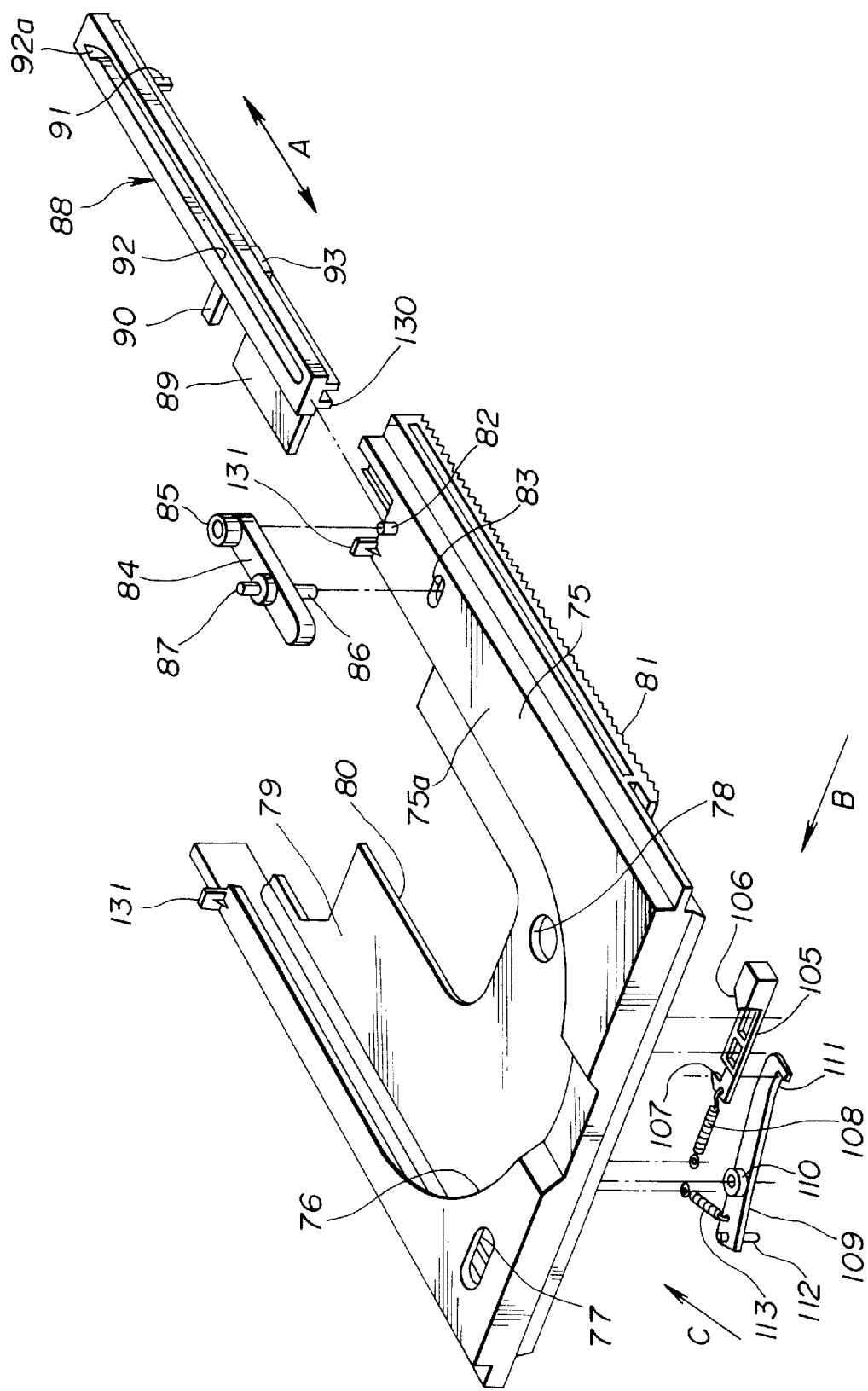
FIG. 2 is an exploded perspective view showing an arrangement of a main tray and a slider constituting the disc recording and/or reproducing apparatus according to the present invention.
Figure 11:
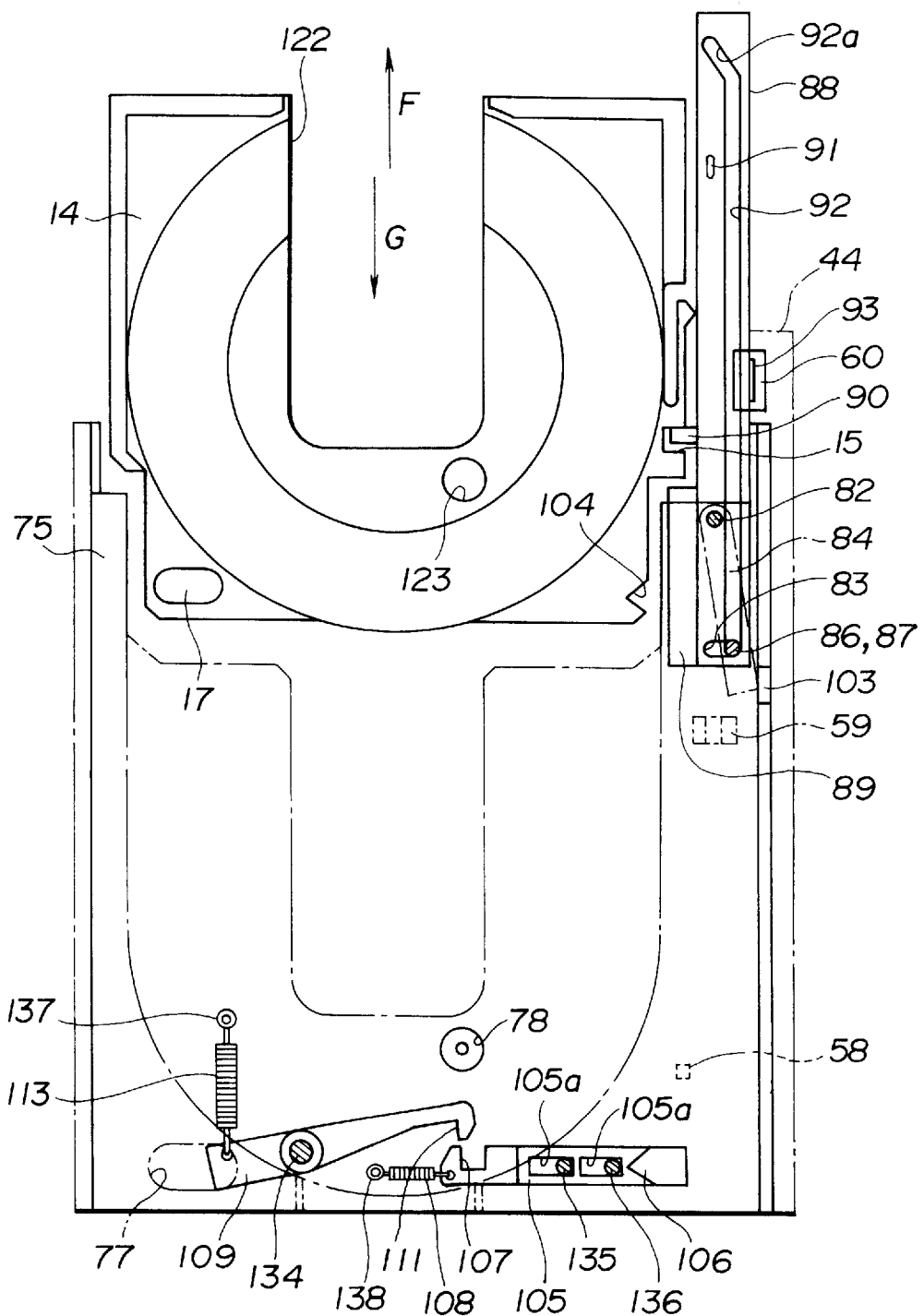
FIG. 11 is a plan view showing a lift block, main tray and the sub-tray with the sub-tray being housed within the housing section.
Figure 13:
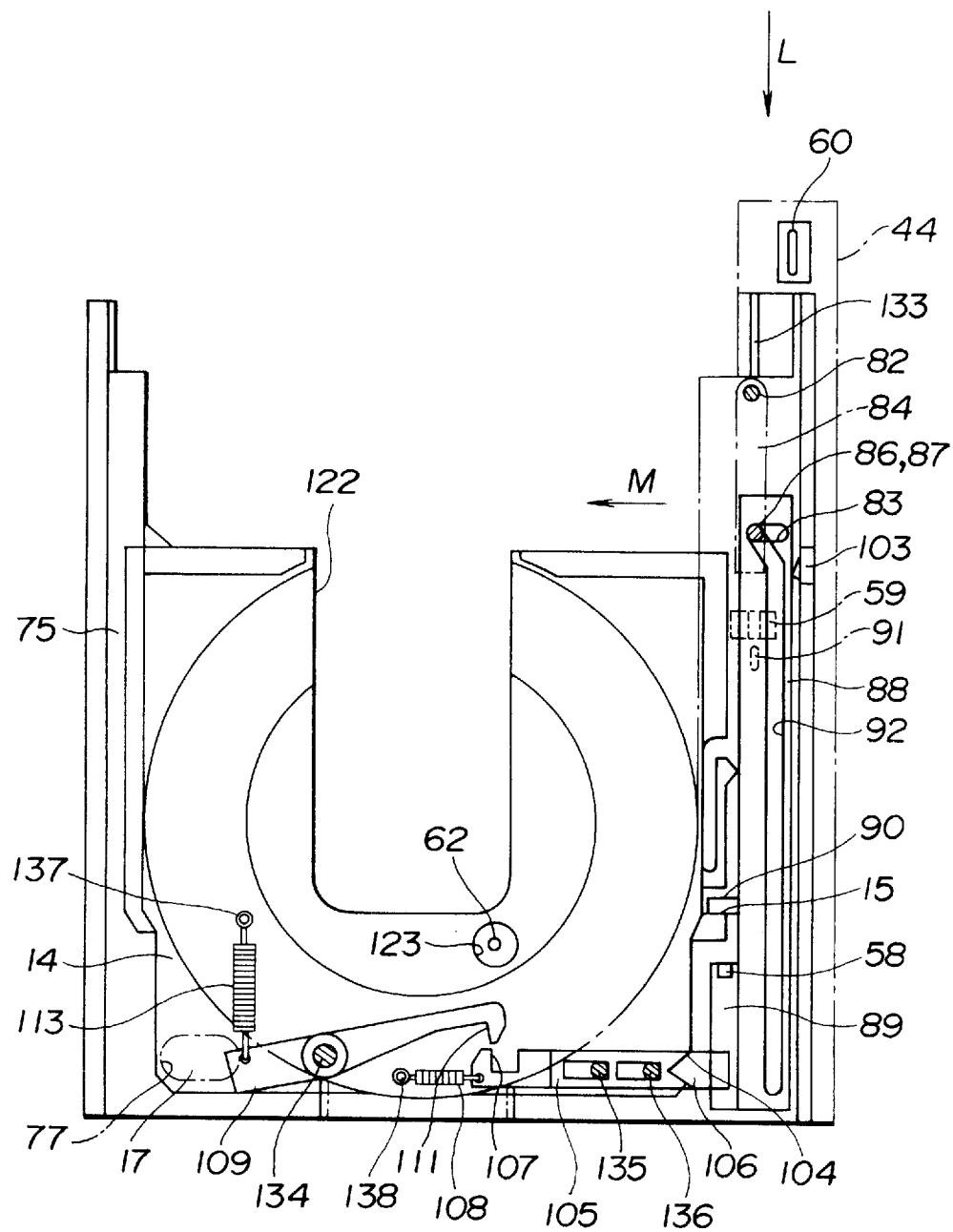
FIG. 13 is a plan view showing the lift block, main tray and the sub-tray with the sub-tray being slightly moved from the recording/reproducing position to outside the apparatus.
Figure 35:
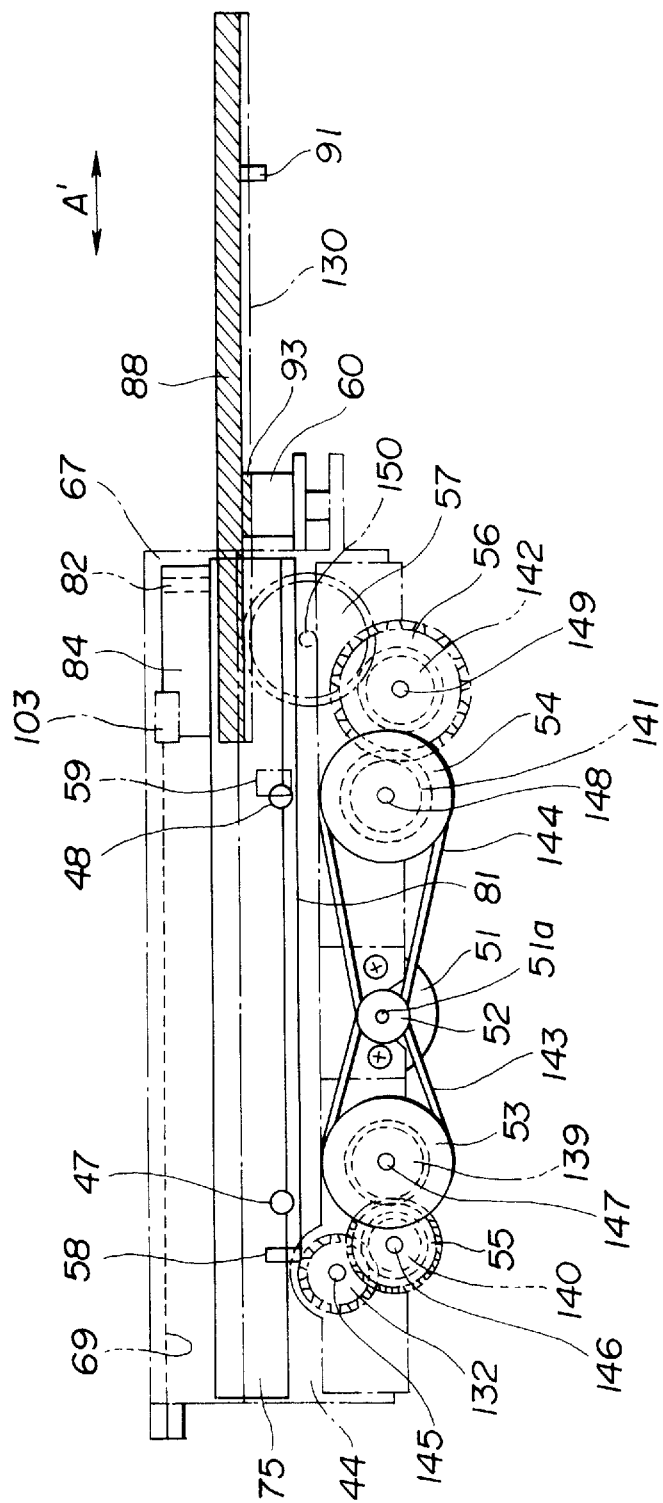
FIG. 35 is a side view showing the lift block, main tray and the sub-tray with the sub-tray housed within the housing section.
Figure 36:
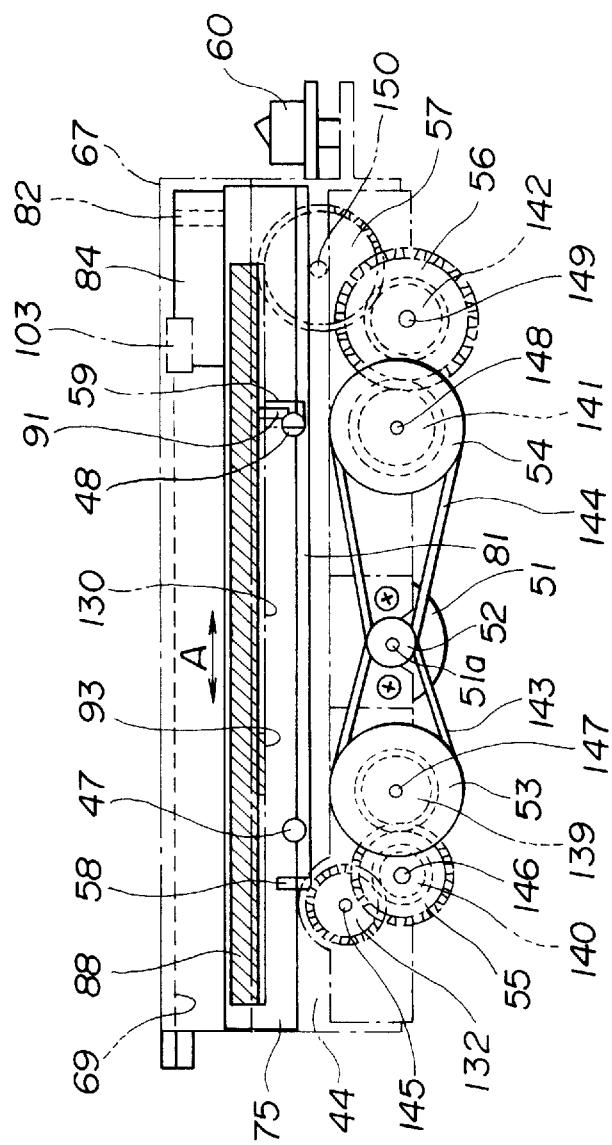
FIG. 36 is a side view showing the lift block, main tray and the sub-tray with the sub-tray having been moved to the recording/reproducing position.
Figure 45:
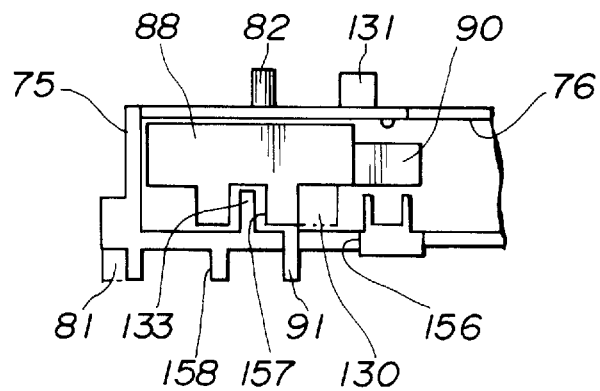
FIG. 45 is a schematic enlarged back view showing the mounting state of the main tray and the slider.
Figure 46:
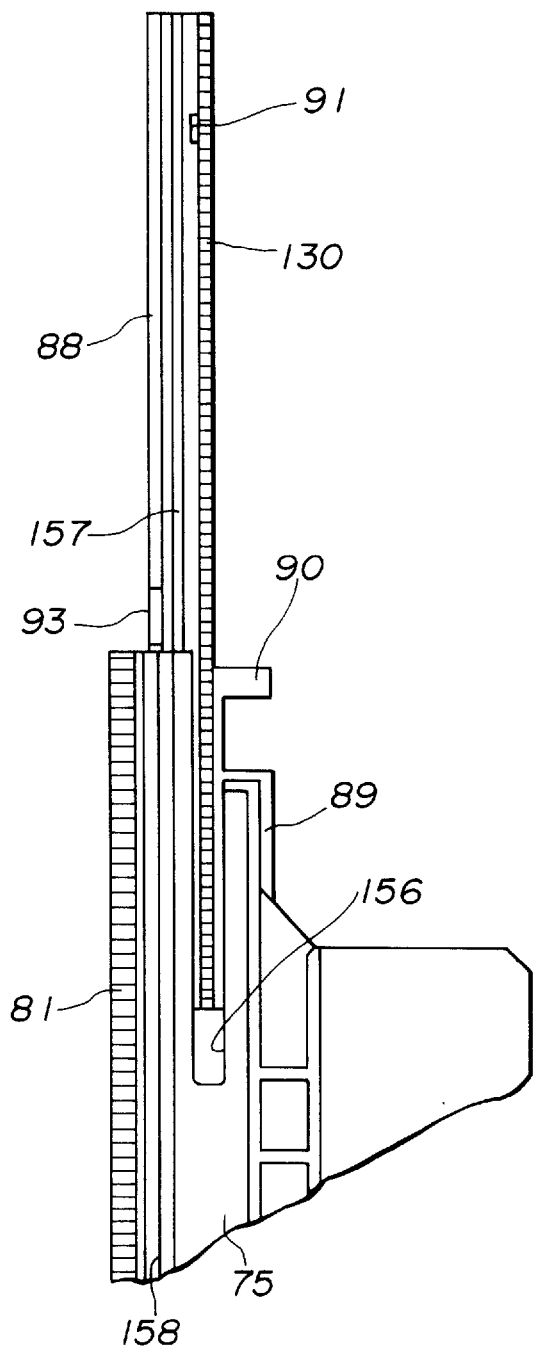
FIG. 46 is a schematic enlarged bottom view showing the mounting state of the main tray and the slider.

On one side within the interior of the main tray 75 is arranged a slider 88 as shown in FIGS. 2, 35 and 36. The slider 88 constitutes a transfer mechanism for moving the main tray 75 and also moving the sub-tray 14 held on the main tray 75 between a position in which the sub-tray is set on the main tray 75 and a position in which the sub-tray is housed within the housing unit 8, and is arranged for being moved in the fore-and-aft direction as indicated by arrow A in FIG. 2. The slider 88 is arranged within the spacing delimited between a bottom plate 79 and an upper plate 75a of the main tray 75, as shown in FIG. 2, and has a length substantially corresponding to the length of a side edge of the sub-tray 14 held on the main tray 75. The slider is arranged on the main tray 75 with its longitudinal direction as the fore-and-aft direction. The slider 88 is movable as indicated by arrow K in FIG. 12 and by arrow L in FIG. 13 between the position in which it is housed within the main tray 75 as shown in FIGS. 12 and 13 and the position in which it is protruded rearward of the main tray 75, as indicated in FIG. 11. The slider 88 has a longitudinal guide groove 157 on its lower surface, as shown in FIGS. 45 and 46, and is movably supported in the fore-and-aft direction by having a guide rail 133 formed on the bottom surface of the main tray 75 engaged in the guide groove 157.

The slider 88 has an engagement lug 90 on its inner lateral side. The engagement lug 90, engaged with the engagement recess 15 in the sub-tray 14, is positioned for facing the engagement recess 15 of the sub-tray 14 housed in the housing unit 8 when the slider 88 is moved to a position at the back of the main tray 75 which is at the recording/reproducing position, as shown in FIGS. 8 and 11. When in the recording/reproducing position within the lift block 25, the main tray is uplifted and lowered by the lift mechanism 27, in unison with the lift block 25, between the disc take-out position in which the optical disc 301 housed within the housing unit 8 is taken out along with the sub-tray 14 or the optical disc 301 thus taken out is housed within the housing unit 8 along with the sub-tray 14 and a position in which the optical disc 301 on the sub-tray 14 is loaded on the recording/reproducing unit 5, as shown in FIGS. 8 and 11.

When the lift block 24 faces the housing unit 8 for selectively taking out the optical disc 301 from the housing unit 8, with the main tray 75 being at the recording/reproducing position, the slider 88, protruded rearward from the main tray 75, is moved to the forward side as indicated by arrow G in FIG. 11, so as to be housed within the main tray 75. Since the slider 88 is moved with the engagement lug 90 remaining engaged in the engagement recess 15, the sub-tray 14 is moved as indicated by arrow G in FIG. 11 and by arrow I in FIG. 12, so that the sub-tray 14 is taken out of the housing unit 9 and held within the main tray 75, as shown in FIG. 12.

Figure 14:
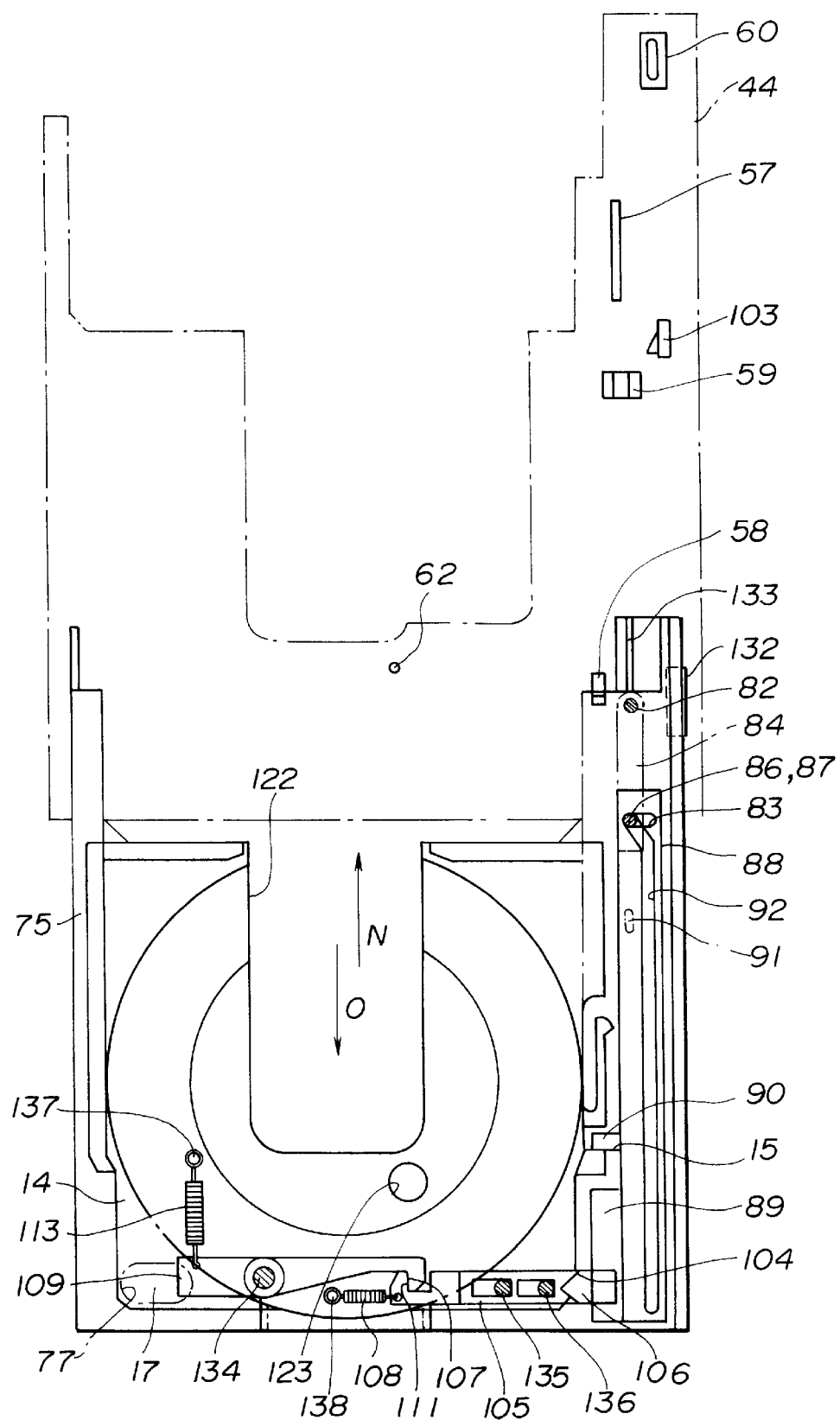
FIG. 14 is a plan view showing the lift block, main tray and the sub-tray with the sub-tray being extracted along with the main tray to outside the apparatus.

When housed within the main tray 75, the slider 88 is moved so as to follow the main tray 75, with the sub-tray 14 being held on the main tray 75, as discussed above. When the lift block 26 is at a position of enabling the main tray 75 to be pulled out of the main member of the apparatus as indicated in FIG. 33, the slider 88 causes the sub-tray 14 to be moved along with the main tray 75 between the recording/reproducing position shown in FIG. 13 and the position protruded out of the main member of the apparatus as shown in FIG. 14. That is, the slider 88 moves the sub-tray 14 and the main tray 75 at the recording/reproducing position shown in FIG. 13 in a direction shown by arrow O in FIG. 14 so as to be protruded out of the main member of the apparatus, as shown in FIG. 14, while moving the sub-tray 14 and the main tray 75, protruded out of the main member of the apparatus, in a direction shown by arrow N in FIG. 14, for moving the trays to the recording/reproducing position shown in FIG. 13.

On the other hand, if, with the sub-tray 14 in the recording/reproducing position as shown in FIG. 13, the lift block is lowered as indicated by arrow T in FIG. 33 to a loading position of loading the optical disc 301 on the recording/reproducing unit 5, the optical disc 301, so far set on the sub-tray 14, is spaced apart from the disc table 6, at the same time that it is clamped between the disc table 6 and the chuck plate 68 so as to be rotated by the spindle motor in unison with the disc table 6 and the chuck plate 68, as shown in FIG. 34. The disc table 6 and the optical pickup unit 7 are intruded at this time into the main tray 75 by means of a cut-out 80 formed at a mid portion of the lower surface of the main tray 75.

With the main tray 75 in the recording/reproducing position shown in FIG. 13, the slider 88 is moved towards the rear as shown by arrow K in FIG. 12 for further moving the sub-tray 14 from the direction shown by arrow H in FIG. 12 to the direction shown by arrow F in FIG. 11 for housing the sub-tray in the housing unit 8. The relative position between the height-wise position of the lift block 25 and the position of the sub-tray 14 or the slider 88 is shown in Table 1.

TABLE 1

|  | Sub-tray (Slider) Position | | |
| --- | --- | --- | --- |
| Lifting/ Lowering Block Height Position | Apparatus Main Body Outer Position | Recording/ Reproducing Position | Housing Position |
| Disc Selecting Position | x | ○ Disc Ejection Complete | ○ Selecting Disc (Disc Return Complete) |
| Unloading Position | ○ Ejecting Disc | ○ | Δ Correcting Slider Position (Sub-tray absent) |
| Loading Position | x | ○ Disc Recording/ Reproduction | x |

The relationship between the position of selection of various operating positions by the lift block 25 in the disc recording/reproducing apparatus of the present embodiment and the lift mechanism 27 for uplifting and lowering the lift block 25 is hereinafter explained.

When in the loading position of loading the optical disc 301 set on the sub-tray 14 held by the main tray 75 on the recording/reproducing unit 5, the lift block 25 is at the lowermost tier position towards the bottom plate 2 of the chassis 1. At this time, the supporting pins 47, 48 provided upright on the lift base plate 44 are supported on the lowermost abutment supporting pieces $31a_1$ and $31b_1$ of the abutment supporting pieces $31a$ and $31b$ provided on the second cam plate 24 constituting the lift mechanism 27.

When the lift block 25 is at such a position as to enable the sub-tray 14 and the main tray 75 to be moved to the first position or the ejecting position by means of a disc insertion/ejection opening 154, the supporting pins 47, 48 formed on the lift base plate 44 are supported on the third lowermost abutment supporting pieces $31a_3$, $31b_3$ of the abutment supporting pieces $31a$, $31b$ provided on the second cam plate 24.

The second abutment supporting pieces $31a_2$, $31b_2$, positioned between the first abutment supporting pieces $31a_1$, and $31b_1$ and the third abutment supporting pieces $31a_3$, $31b_3$, play the part of transiently supporting the lift base plate 44 for registration in order to assure positive loading of the optical disc 301 on the disc table 6 during chucking the optical disc 301 on the sub-tray 14 on the disc table 6 of the recording/reproducing unit 5.

When the lift block 25 faces the housing unit 8 in order to enable insertion and detachment into and out of the housing unit 8, the supporting pins 47, 48 provided on the lift base plate 44 are supported on the abutment supporting pieces $31a$, $31b$ positioned above the third abutment supporting pieces $31a_3$, $31b_3$ provided on the second cam plate 24, inclusive of the abutment supporting pieces $31a_3$, $31b_3$.

When the lift block 25 is at such a position in which the supporting pins 47, 48 set on the lift base plate 44 are supported on the abutment supporting pieces $31a_3$, $31b_3$, the lift block 25 enables the sub-tray 14 to be inserted into and detached from the housing unit 8, while enabling the main tray 75 holding the sub-tray 14 thereon to be moved to the ejecting position protruded outwardly of the main member of the apparatus.

The lift base plate 44 constituting the lift block 25 is provided with a driving mechanism for moving the main tray 75 and the slider 88. The driving mechanism includes a driving motor 51 mounted on the lower surface of the lift base plate 44, as shown in FIGS. 35 to 38. The driving motor 51 is mounted on the lower surface of the lift base plate 44, with the driving shaft 51a protruded towards one side of the lift base plate 44. The driving shaft 51a carries a driving pulley 52 having two belting grooves. A first driving belt 143 constituting the first motion transmitting mechanism is placed around one of the belting grooves, while a second driving belt 144 constituting the second motion transmitting mechanism is placed around the other of the belting grooves.

The first driving belt 143 placed around the driving pulley 52 is also placed around a first follower pulley 53 rotatably mounted on a supporting shaft 147 set upright on one lateral surface of the lift base plate 44, as shown in FIGS. 35 to 38. The first follower pulley 53 is integrally formed with a gear part 139 meshing with a coupling gear 55 rotatably mounted on a supporting shaft 146 set upright on a lateral surface of the lift base plate 44. The coupling gear 55 is integrally formed with a small-sized gear 140 which meshes with a first pinion gear 132 rotatably mounted on a supporting shaft 145 set upright on a lateral surface of the lift base plate 44. The first pinion gear 132 meshes with a first rack gear 81 formed on the lower surface of the main tray 75 by means of a through-hole bored in the bottom surface of the lift base plate 44.

The second driving belt 144, placed around the driving pulley 52, is placed around a second follower pulley 54, rotatably mounted on a lateral surface of the lift base plate 44, as shown in FIGS. 35 to 38. The second follower pulley 54 is integrally formed with a gear part 141 meshing with a coupling gear 56 rotatably mounted on a supporting shaft 149 set upright on a lateral surface of the lift base plate 44. The coupling gear 56 is integrally formed with a small-sized gear 142 meshing with a second pinion gear 57 rotatably mounted on a supporting shaft 150 set upright on a lateral surface of the lift base plate 44. The first pinion gear 57 meshes with a second rack gear 130 formed on the lower surface of the slider 88 by means of a through-hole bored in the bottom surface of the lift base plate 44.

A first rack gear 81, constituting the first drive force transmitting mechanism, is formed on one lateral side on the lower surface of the main tray 75 for extending from the front side towards the rear side of the main tray 75, as shown in FIGS. 2 and 46. A second rack gear 130 constituting the second drive force transmitting mechanism, is formed on the lower surface of the slider 88 for extending from the front side towards the rear side along the length of the slider 88, and faces the lower surface of the main tray 75 by means of a cut-out 156 formed at the rear end in the bottom surface of the main tray 75, as shown in FIGS. 2 and 46.

When the main tray 75 is intermediate between the first position protruded outwardly of the main member of the apparatus and the vicinity of the second position towards the recording/reproducing apparatus, the first rack gear 81 meshes with the first pinion gear 132 for transmitting the driving force of the driving motor 51, as shown in FIG. 38. When the main tray 75 is at the second position or the recording/reproducing position within the inside of the main member of the apparatus, the first rack gear 81 is disengaged from the first pinion gear 132 to interrupt transmission of the driving power of the driving motor 51, as shown in FIGS. 35 to 37.

When the sub-tray 14 is intermediate between the recording/reproducing position facing the recording/reproducing unit 5 and the position of being housed within the housing unit 8, the second rack gear 130 meshes with the second pinion gear 57, so that the driving power of the driving motor 51 is transmitted to the slider, as shown in FIGS. 35 to 37. When the sub-tray 14 is moved from the second position or the recording/reproducing position along with the main tray 75 to the first position or the ejecting position outside of the main member of the apparatus, the second pinion gear 57 is disengaged from the second rack gear 130, as shown in FIG. 38, so that transmission of the driving motor 51 is interrupted, as shown in FIG. 38.

The first pinion gear 132 or the second pinion gear 57 is perpetually engaged with the first rack gear 81 or the second rack gear 130. That is, the driving power of the driving motor may perpetually be transmitted by means of the first pinion gears 132 or 57 to the first or second rack gears 81 or 130. When the main tray 75 is at a position capable of selecting and taking out the sub-tray 14 housed within the housing unit 8, the second drive transmitting mechanism shifts the sub-tray 14 relative to the main tray 75 by means of the slider 88 for housing the sub-tray 14 in the housing unit 8 or taking out the sub-tray 14 out of the housing unit 8.

The lower surface of the cover plate 67 mounted on the lift base plate 44 of the lift base block 25 is formed with a first cam groove 69 facing the slider 88 for extending along the length of the slider 88 from the front side to the rear side of the cover plate 67, as shown in FIGS. 11 to 14 and FIGS. 39 to 43. The rear end of the first cam groove 69 facing the housing unit 8 is formed with a first lock portion 70 bent at a right angle.

The upper surface of the slider 88 is formed with a second cam groove 92 for extending parallel to the first cam 69 along the direction of longitudinal movement of the slider 88. The rear end of the second cam groove 92 facing the housing section 8 is formed with a second lock portion 92a bent at an angle of 45° to 60°.

The second cam groove 92 is formed for register with the first lock portion 70 bent at right angles to the direction of extension of the first cam groove 69, while the first cam groove 69 is formed for register with the second lock portion 92a bent at 45° or 60° relative to the direction of extension of the second cam groove 92.

At the rear end on the upper surface of the main tray 75 is rotatably mounted a lock lever 84 with partial overlap on the slider 88. The lock lever 88 has a tubular shaft inserting portion 85 at its proximal portion, as shown in FIG. 2. The lock lever is mounted on the main tray 75 by having a supporting shaft 82 set upright on the upper surface of the main tray 75 inserted through the shaft-inserting portion 85 for rotation about the supporting shaft 82 as the center of rotation, with the distal end of the lock lever 88 being directed to the front side of the main tray 75. The distal end of the lock lever 84 carries a first lock pin 87 and a second lock pin 86 directed upwards and downwards, respectively. The first and second lock pins 87, 86 are coaxially protruded in a direction at right angles to the lock lever 84. The first lock lever 87 is engaged with the first cam groove 69 formed in the main tray 75, while the second lock pin 86 is engaged with the second cam groove 92 formed in the slider 88 by means of a through-hole 83 formed in the upper plate 75a of the main tray 75.

When the slider 88 is intermediate between the recording/reproducing position and the position housed within the housing unit, the lock lever 84 is rotated as indicated by arrow J in FIG. 12, about the supporting shaft 82 as the center of rotation. The lock lever 84 has its distal end engaged in the first lock portion 70 formed in the cam groove 69 for limiting the movement of the lift block 25 of the main tray 75 relative to the cover plate 67, as shown in FIGS. 69 and 70. At this time, the slider 88 is movable relative to the main tray 75 for shifting the sub-tray 14 from the position within the housing unit 8 to the recording/reproducing position facing the recording/reproducing unit 5, with the second lock pin 86 being guided by the second cam groove 92.

The slider 88 shifts the sub-tray 14 as indicated by arrow I in FIG. 12. When the sub-tray 14 has been moved to the recording/reproducing position shown in FIG. 12, it is further moved slightly as indicated by arrow I in FIG. 12, that is, towards the front side of the man tray 75, until it reaches the position shown in FIG. 13. The movement stroke of the slider 88 corresponds to the distance of allowance between the engagement lug 90 of the slider 88 and the engagement recess 15 in the sub-tray 14. That is, the width of the engagement lug 90 is slightly lesser than the width of the engagement recess 15.

Figure 41:
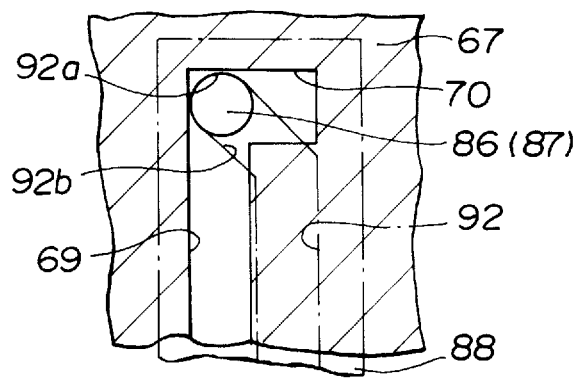
FIG. 41 is a schematic enlarged plan view showing the relative position of the first and second cams when the slider has moved the sub-tray from the recording/reproducing position towards the ejecting position.

If, after shifting the sub-tray 14 to the recording/reproducing position, the slider 88 is moved slightly towards the front side of the main tray 75 as indicated by arrow L in FIG. 13, the second lock pin 86 is thrust by an inclined surface 92b of the second lock portion 92a and thereby moved towards the inner side of the second lock portion 92a as shown in FIG. 41, as indicated by arrow M in FIG. 13. At this time, the lock lever 84 is rotated as indicated by arrow M in FIG. 13 and the first lock pin 87 is disengaged from the first lock portion 70 provided in the first cam groove 69 so as to be positioned at the rear end of the straight portion of the first cam groove 69. In such state, the main tray 75 may be moved towards the front side with respect to the cover plate 67 of the lift block 25, that is, towards the first position protruded out of the main member of the apparatus as indicated by arrow O in FIG. 14.

Figure 42:
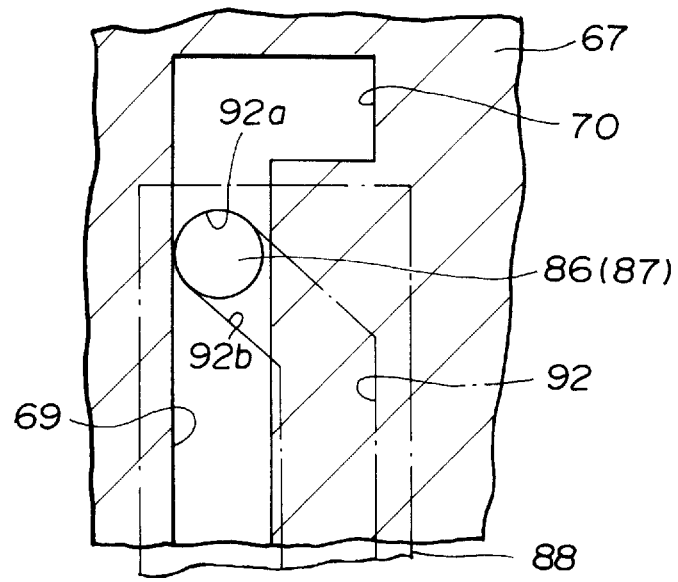
FIG. 42 is a schematic enlarged plan view showing the relative position of the first and second cams when the slider has moved the sub-tray between the recording/reproducing position and the ejecting position.
Figure 43:
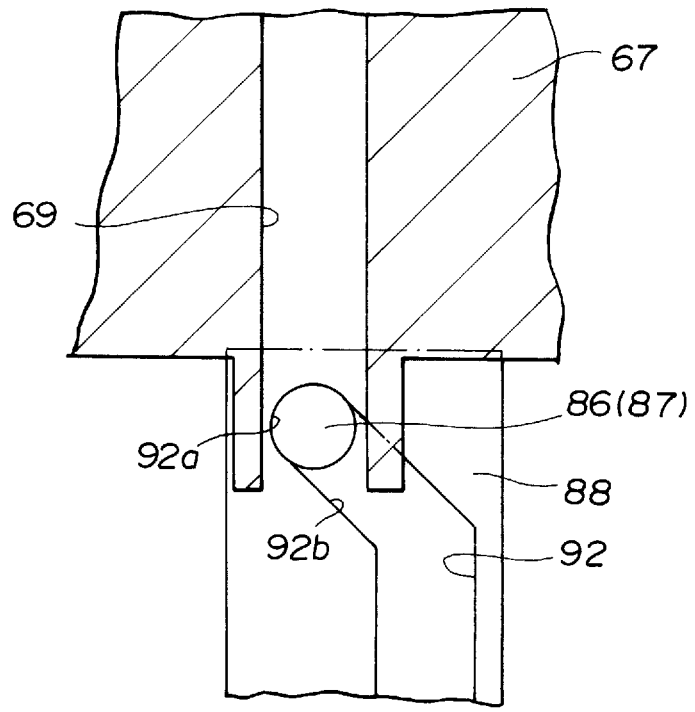
FIG. 43 is a schematic enlarged plan view showing the relative position of the first and second cams when the slider has moved the sub-tray to the ejecting position.

When the main tray 75 is intermediate between the vicinity of the recording/reproducing position shown in FIG. 13 and the first position protruded out of the main member of the apparatus, as shown in FIG. 14, the lock lever 82 has the lock lever 86 engaged in the second lock portion 92a formed in the second cam groove 92, as shown in FIGS. 42 and 43, for limiting the movement of the slider 88 relative to the main tray 75. That is, when the second lock pin 86 is engaged with the second lock portion 92a, the sub-tray 14 is prohibited from being detached towards the rear side of the main tray 75. On the other hand, the main tray 75 is movable towards the first position protruded out of the main member of the apparatus, with the first lock pin 87 being guided by the straight portion of the first cam groove 69.

On a lateral side of the lift block 25 along which slides the slider 88 on the lift plate 44 is mounted a first sensor 59 as shown in FIGS. 1 and 11 to 14. The first sensor 59 is a photointerruptor for detecting a detection lug 91 formed on the lower surface of the slider 88. The first sensor 59 is turned on (shown at the upper side of FIG. 52) when the slider 88 has caused the sub-tray 14 to be moved to the recording/reproducing position and the slider 88 is movable a distance equal to the play relative to the sub-tray 14, as shown in FIG. 12. The first sensor 59 is turned off (shown at the lower side of FIG. 52) when the slider 88 is not positioned for setting the sub-tray 14 to the recording/reproducing position.

Figure 52:
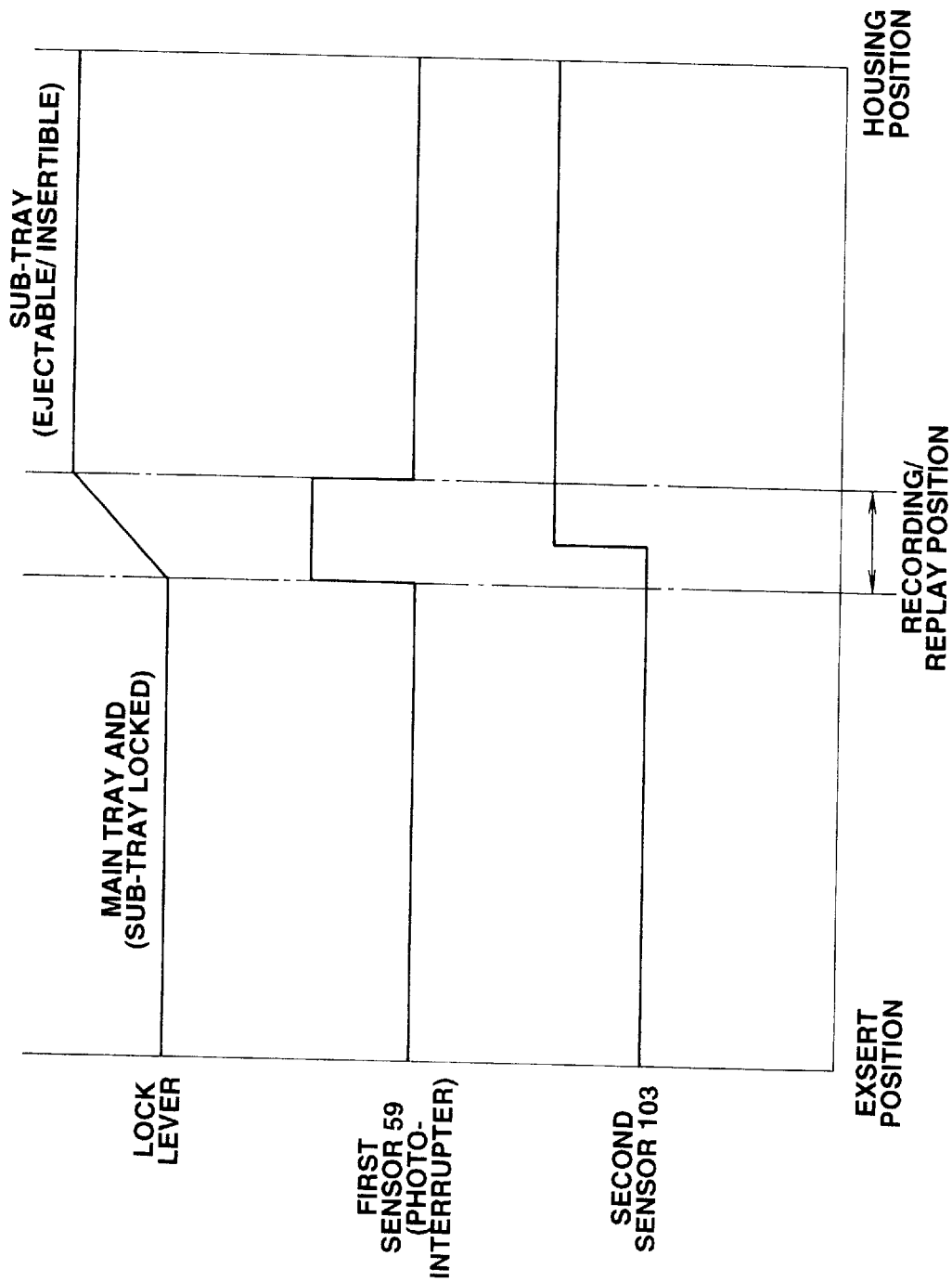
FIG. 52 is a graph showing the detection timing of each sensor detecting the state of movement of the lift block.

A second sensor 103 is provided on the cover plate 67 of the lift block 25. The second sensor 103 is a thrusting switch for detecting the rotational position of the lock lever 84. The second sensor 103 is positioned on the lateral side towards the distal end of the lock lever 82 when the main tray 75 is at the recording/reproducing position. The second sensor 103 is turned on as shown in FIG. 52 during the time the slider 88 causes the sub-tray 14 moved in a direction as indicated by arrow N in FIG. 14 to be shifted from the first position shown in FIG. 14 in which the sub-tray is protruded out of the main member of the apparatus to the recording/reproducing position shown in FIG. 13, as shown in FIGS. 11 and 12. The second sensor 103 is turned off as shown in FIG. 52 when the lock lever 84 is rotated as shown by arrow M in FIG. 13 during the time that, after the sub-tray 14 has been shifted by the slider 88 to the recording/reproducing position shown in FIG. 13, the slider is moved forwards a distance corresponding to the play relative to the sub-tray 14.

The on-state of the second sensor 103 indicates that the slider 88 is intermediate between the recording/reproducing position shown in FIG. 13 and the position in which the sub-tray 14 is housed within the housing unit 8 as shown in FIG. 11. The off-state of the second sensor 103 indicates that the slider 88 is intermediate between the recording/reproducing position shown in FIG. 13 and the position in which the sub-tray 14 is protruded out of the main member of the apparatus as shown in FIG. 14.

The lift base plate 44 is also provided with a housing position detection switch 60 as detection means for detecting that the slider 88 is at the position of housing the sub-tray 14 in the housing unit 8. The housing position detection switch 60 is provided at a rear lateral side on the upper surface of the lift base plate 44, that is, at the back of the slider 88 mounted on the main tray 75. When the slider 88 is moved as indicated by arrow K in FIG. 12 so as to be protruded on the rear side of the main tray 75 for shifting the sub-tray 14 as indicated by arrow H in FIG. 12 for housing the sub-tray 14 in the housing unit 8 as indicated by arrow H in FIG. 12, the housing position detection switch 60 is thrust by a thrusting lug 93 formed on the lower surface of the slider 88, as shown in FIG. 11. When the housing position detection switch 60 is turned on, rotation of the driving motor 51 for further moving the slider 88 towards the inner side of the housing unit 8 as indicated by arrow F in FIG. 11 is halted by a control circuit constituting control means of the apparatus.

On the lift base plate 44 of the lift block 44 is mounted an ejection detection switch 48 for detecting that the main tray 75 has been protruded out of the main member of the apparatus to a first position shown in FIG. 14. The ejection detection switch 58 is provided on a front lateral side on the upper surface of the lift base plate 44. When the main tray 75 is moved forwardly of the lift base plate 44 to outside the main member of the apparatus to a first position in which the sub-tray 14 has been protruded out of the main member of the apparatus, the ejection detection switch 58 is thrust by the rear end of the main tray 75 and thereby turned on, as shown in FIG. 14. When the ejection detection switch 58 is turned on, rotation of the driving motor 51 for further shifting the main tray 75 forward as indicated by arrow O in FIG. 14 is halted by the control circuit.

On the lift block 25 is mounted a disc presence/absence sensor 262 for detecting the presence or absence of the optical disc 301 as set on the sub-tray 14. That is, at a forward mid portion on the upper surface of the lift base plate 44 of the lift block 25 is mounted a light emitting element 62, as shown in FIG. 3. On the lower surface of the cover plate 67 is mounted a light receiving element 63 for facing the light emitting element 62. The main tray 75 and the sub-tray 14 are respectively formed with disc detection through-holes 78, 123 facing the light emitting element 62 and the light receiving element 63 when the main tray 75 and the sub-tray 14 are at the recording/reproducing positions, as shown in FIGS. 8 to 14. The possible presence of the optical disc 301 on the sub-tray 14 is detected depending on whether the light radiated by the light emitting element is received by the light receiving element when the main tray 75 and the sub-tray 14 are at the recording/reproducing position.

The present embodiment of the disc recording/reproducing apparatus has a control circuit for controlling the overall operation of the apparatus, inclusive of the driving of the driving motor 51. When the power source is turned on, the control circuit controls the driving direction of the driving motor 51 for controlling the movement of the slider 88 in such a manner that, when the first sensor 59 has detected that the slider 88 has shifted the sub-tray 14 to the recording/reproducing position, the driving motor 51 is not run in rotation, and that, when the first sensor 58 has detected that the slider 88 has not shifted the sub-tray 14 to the recording/reproducing position, the sub-tray 14 is shifted to the recording/reproducing position or the position of being housed in the housing unit 8, depending on the results of detection of the second sensor 103. That is, with the present embodiment of the disc recording/reproducing apparatus, the sub-tray 14 is brought to the position of being housed within the housing unit 8 or to the recording/reproducing position when the power source is turned on.

With the present embodiment of the disc recording/reproducing apparatus, the prerequisite condition for recording/reproducing information signals on or from the optical disc 301 is that the presence or absence of the optical disc 301 on the sub-tray 14 has been detected by the light receiving element 63 of the disc presence/absence sensor 262 and the first sensor 59 is turned on thus indicating that the sub-tray 14 is at the recording/reproducing position. The driving of the driving motor 51 is halted when the main tray 75 holding the sub-tray 14 has been moved from the first position in which the main tray is protruded out of the main member of the apparatus to the second or recording/reproducing position of being housed within the housing unit 8 and when the sub-tray 14 has been moved from the first position of being housed within the main member of the apparatus to the recording/reproducing position, with the first sensor 59 being then turned on. Since the slider has certain play with respect to the sub-tray 14, and the sub-tray 14 has its position relative to the main tray 75 controlled by the lock mechanism for the sub-tray 14 as later explained, the sub-tray 14 may be accurately maintained at a predetermined position of the main tray 75 despite some error in halting timing of the driving motor 51.

Since it is prerequisite for recording/reproduction of information signals on or from the optical disc 301 that the light receiving element 63 of the disc presence/absence sensor detects the setting of the optical disc 301 on the sub-tray 14 and that both the first sensor 59 and the second sensor 103 are turned on, both the first sensor 59 and the second sensor 103 are turned on when the main tray 75 holding the sub-tray 14 is moved from the first position outside of the main member of the apparatus to the recording/reproducing position in the main member of the apparatus, and operation of the driving motor 51 ceases, so that the main tray 75 may be positioned more accurately.

The main tray 75 is provided with a lock mechanism for positioning and locking the sub-tray 14 held on the main tray 75 on the main tray 75. The lock mechanism has an engagement member 105 movably mounted on the front portion of the lower surface of the main tray 75. The engagement member 105 has a pair of engagement slits 105a, 105a, and is supported for movement in the widthwise direction at right angles to the direction of movement of the main tray 75 by engaging a pair of supporting pins 135, 136 mounted upright on the main tray 75 in these engagement slits 105a, 105a, as shown in FIG. 11. The engagement member 105 is biased in a direction indicated by arrow B in FIG. 2 or in a direction towards the center of the main tray 75 by a first tension spring 108 mounted between the one end of the engagement member 105 and a spring retention pin 138 mounted on the lower surface of the main tray 75. The engagement member 105 has an engagement pawl 107 at its one end retaining one end of the first tension spring 108 for being protruded towards the inside of the main tray 75, while having an engagement lug 106 at its other end. The engagement lug 106 is protruded into the inside of the main tray 75 by means of a through-hole formed in the bottom plate 79 in the main tray 75.

When the sub-tray 14 is held by the main tray 75, the engagement member 105 has the engagement lug 106 engaged in a vee groove 104 formed in the sub-tray 14 for retaining the sub-tray 14 in the state of being held on the main tray 75. For inserting and detaching the sub-tray 14 into and from the main tray 75, the engagement member 105 has the engagement lug 106 slidingly contacted with the edge of the vee groove 104 or with the lateral side of the forward end of the sub-tray 14 so as to be moved against the bias of the first tension spring 108 for engaging or disengaging the engagement lug 106 in or from the vee groove 104.

On the lower surface of the main tray 75 is rotatably mounted a lock member 109 by means of a supporting shaft 134, as shown in FIGS. 2 and 11 to 14. The lock member 109 constitutes the lock mechanism of the sub-tray 14 along with the engagement member 105. The lock member 109 has a lock pawl 111 on its one end engaged with the engagement pawl 107 of the engagement member 105. The lock member 109 is rotatable between a first rotational position of engaging the lock pawl 111 with the engagement pawl 107 of the engagement member 105 and a second rotational position of rotating the lock pawl 111 towards the inner side of the main tray 75 for spacing the lock pawl 111 from the engagement pawl 107 of the engagement member 105. The lock member 109 is mounted on the lower surface of the main tray for rotation between the first and second positions by having a mid pivot portion 110 by the supporting shaft 134. The lock member 109 is rotated to the first rotational position for engaging the lock pawl 111 with the engagement pawl 107 of the engagement member 105 for inhibiting movement of the engagement member 105 against the bias of the first tension spring 108, while being rotated to the second rotational position for enabling movement of the lock pawl 111 away from the engagement pawl 107 against the bias of the first tension spring 1087 on the engagement member 105.

The lock member 109 is rotated in unison with the movement of the main tray 75. The lock member 109 is rotationally biased towards a first rotational position of engaging the lock pawl 111 in the engagement pawl 107 as indicated by arrow C in FIG. 2 by a second tension spring 113 mounted between the opposite side to the lock pawl 111 and a retention pin 137 formed on the lower surface of the main tray 75. On the front side on the upper surface of the lift base plate 44 of the lift block 25 is mounted an abutment piece 61 abutted against a mating abutment pin 112 mounted for depending from the opposite end of the lock member 109. When the main tray 75 is at the recording/reproducing position, the abutment piece 61 is abutted against the mating abutment pin 112 for rotating the lock member 109 towards the second rotational position of disengaging the lock pawl 111 from the engagement pawl 107 against the bias of the second tension spring 113. That is, the lock member 109 is rotated to the second rotational position when the main tray 75 is at the recording/reproducing position for enabling movement of the engagement member 105. When the main tray 75 is movable to a position outwardly of the main member of the apparatus away from the recording/reproducing position, the lock member 109 is rotated to the first rotational position for inhibiting movement of the engagement member 105.

Thus, when the main tray 75 is at the second position or the recording/reproducing position receded into the inside of the main member of the apparatus, it enables movement of the sub-tray 14. On the other hand, when the main tray 75 is at the first position protruded more outwardly than the second position, it restricts movement of the sub-tray 14 and disengagement from the main tray 75.

On the forward side of an upper surface plate 75a of the main tray 75 opposite to the side carrying the slider 88 is formed a confirmation window 77, as shown in FIG. 2. This confirmation window 77, a through-hole communicating with the inside of the main tray 75, causes a display 17 provided on the sub-tray 14 held on the main tray 75 to be exposed to the outside. The display 17 provided on the sub-tray 14 is constituted by symbols for discriminating the discs housed within the housing unit 8, and comprises numerical figures, alphabetical letters and other symbols, or colors.

Thus, when the main tray 75 is protruded to outside the apparatus, it can be visually checked in which position within the housing unit 8 a sub-tray 14 housed therein is located.

On the rear end face of the cover plate 67 of the lift block 25 facing the housing section 8 are mounted left and right supporting shafts 98, 98, as shown in FIGS. 47 to 51. These supporting shafts 98, 98 carry rotary levers 99, 99. Each rotary lever 99 has its supporting shaft 98 pivotally mounted in a shaft inserting through-hole 161 and is mounted on the cover plate 67 for rotation about the supporting shaft 98 as the center of rotation.

Figure 49:
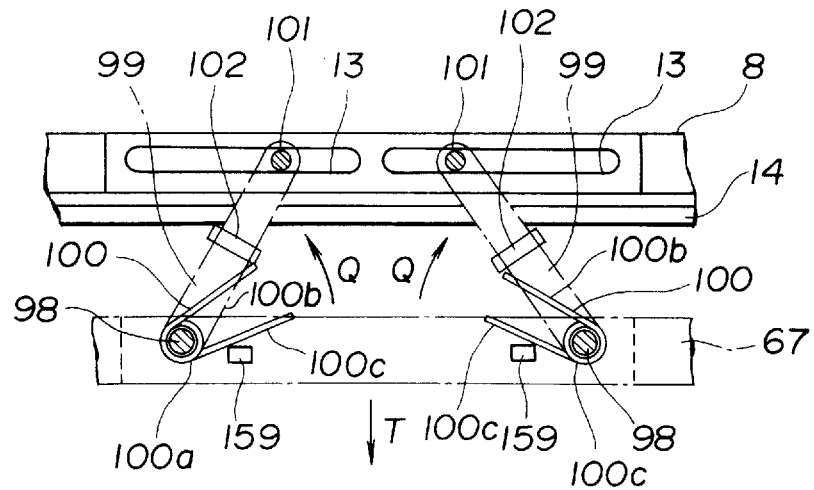
FIG. 49 is a front view showing the state of the rotary lever when the lift block has been lowered.
Figure 50:
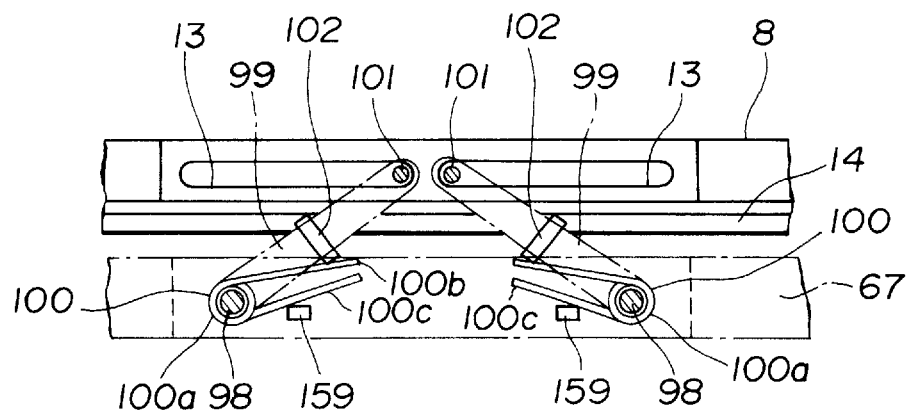
FIG. 50 is a front view showing the state of the rotary lever when the lift block has been uplifted.

The rotary levers 99, 99 are rotationally biased by torsion coil springs 100, 100 mounted on the supporting shafts 98, 98 in a direction in which the distal ends thereof as indicated by arrow Q in FIG. 49 are directed to the outside by means of the upper side of the cover plate 67. Each torsion coil spring 100 is mounted in position by having its coil part 100a passed through the supporting shaft 98 between the rotary lever 99 and the cover plate 67, by having its arm section 100b retained by a retainer 102 of the rotary lever 99 and by having its other arm section 100c retained by a retainer 159 formed in the cover plate 67, as shown in FIG. 49.

The distal ends of the rotary levers 99, 99 carry slide pins 101, 101 extending rearwards or towards the housing unit 8. These slide pins 101, 101 are engaged in aligned left and right elongated holes 13, 13 formed at the upper positions of the front side of the housing unit 8. These elongated holes 13, 13 are symmetrical with respect to the center of the housing unit 8 and have their longitudinal direction coincident with the width of the housing unit 8, as shown in FIGS. 4 and 5. When the lift block 25 performs its vertical movement relative to the housing unit 8, the slide pins 101, 101 are slid horizontally with the elongated holes 13, 13.

Each rotary lever 99 has its distal end limited in movement away from the housing unit 8 by a pair of supporting pieces 95, 95 bent from the ear edge of the top plate 71 mounted on the chassis 1, and hence is prohibited from being detached from the elongated holes 13, 13 of the slide pins 101, 101, as shown in FIGS. 8 to 10.

Figure 47:
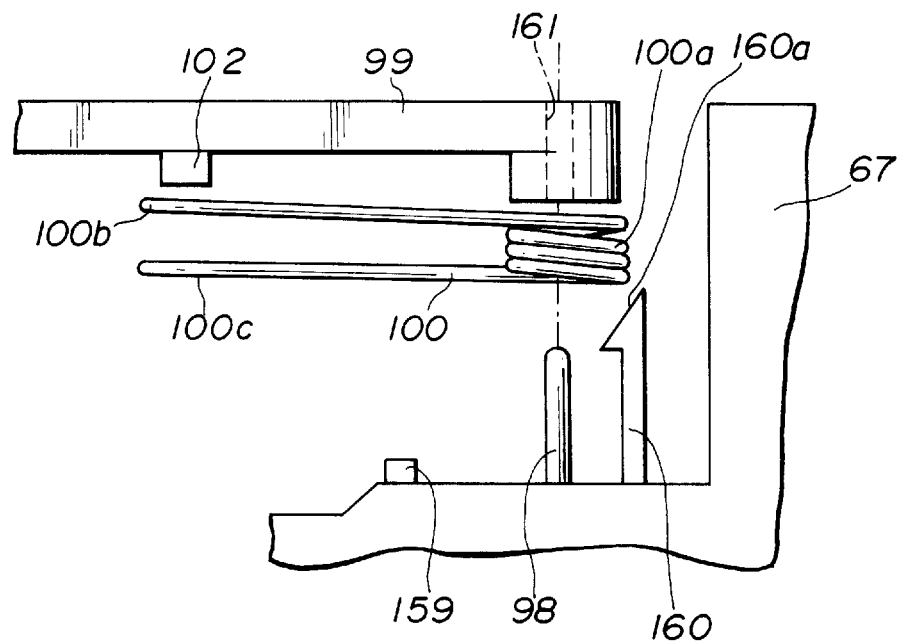
FIG. 47 is a schematic enlarged plan view showing the state of mounting a rotary lever on a cover plate of the lift block.
Figure 48:
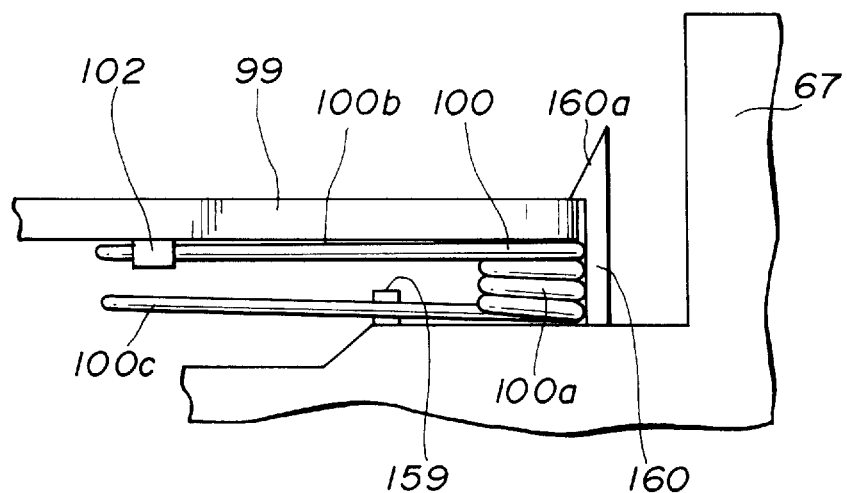
FIG. 48 is a schematic enlarged plan view showing the state of mounting a rotary lever on a cover plate of the lift block.

A pair of holding pawls 160, 160 are provided on the cover plate 67 in proximity to the supporting pins 98, 98, as shown in FIGS. 47 and 48. These holding pawls 160, 160 support the proximal ends of the rotary levers 99, 99 by distal side pawls 160a for prohibiting the rotary levers 99, 99 from being disengaged from the supporting shafts 98, 98. When mounted on the supporting shafts 98, 98 of the rotary levers 99, 99, the holding pawls 160, 160 are thrust by the rotary levers 99, 99 to permit the rotary levers 99, 99 to be mounted on the supporting shafts 98, 98.

The rotary levers 99, 99 are rotated in unison with the lifting movement of the lift block 25 to symmetrical positions in the left-and-right direction to assure smooth movement of the lift block 25 by biasing of the lift block 25 downwards as indicated by arrow T in FIGS. 15, 32 and 49. These rotary levers 99, 99 are positioned facing the front side of the housing unit 8 for prohibiting detachment of the sub-tray 14 from the housing 8 by means of the front side opening 8b.

On the rear end face of the cover plate 67 of the lift block 25 is mounted a sub-tray supporting member 181 for preventing protrusion from the housing unit 8 of the sub-tray 14 housed within the housing unit 8. The sub-tray supporting member 181 has an attachment portion 182 to the rear end face of the cover plate 67 on its proximal end, and a sub-tray supporting portion 183 is mounted upright on the attachment portion 182, as shown in FIGS. 1 and 3. The sub-tray supporting portion 181 is mounted by securing the attachment portion 182 to the rear end face of the cover plate 67 with the sub-tray supporting portion 183 facing the mid portion of the front surface of the housing unit 8. The sub-tray supporting portion 183 is of such height that, when the lift block 25 has been moved to the lowermost position, the sub-tray 14 at the uppermost tier in the housing unit 8 can be supported thereon.

Figure 51:
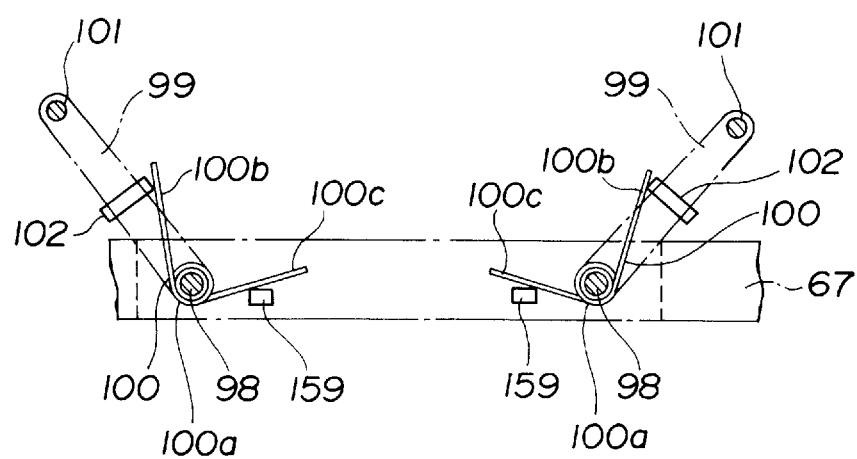
FIG. 51 is a front view showing the state of the rotary lever with the cover plate of the lifting block removed.

When the rotary levers 99, 99 are attached to the supporting shafts 98, 98, and the lift block 25 is as yet not attached to the chassis 1, the rotary levers 99, 99 have been rotated under the bias of the torsion coil springs 100, 100 to the outermost position within the possible rotational stroke thereof, as shown in FIG. 51. Thus the rotary levers 99, 99 are prohibited from being rotated under the effect of vibrations or gravity, thus facilitating the handling of the lift block 25. In addition, since the coil parts 100a, 100a of the torsion coil springs 100, 100 are interposed between the rotary levers 99, 99 and the cover plate 67 of the lift block 25, the rotary levers can readily be moved in a direction of being tilted relative to the supporting shafts 98, 98, thus assuring facilitated insertion of the slide pins 101, 101 into the elongated holes 13, 13 of the housing unit 8.

Figure 55:
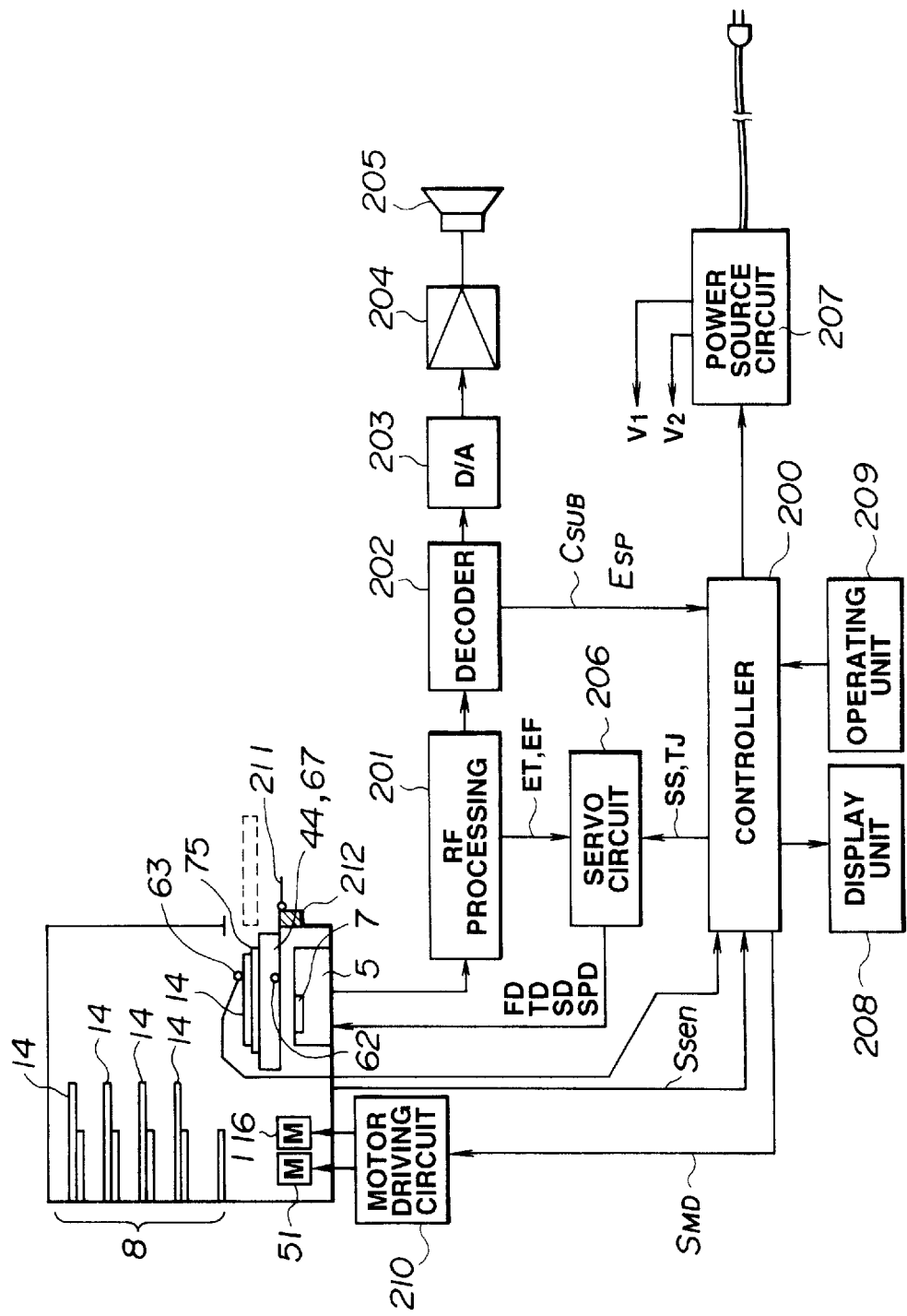
FIG. 55 is a block circuit diagram showing a circuit arrangement of a disc recording and/or reproducing apparatus according to the present invention.

The above-described disc recording/reproducing apparatus includes a controller 200, as shown in FIG. 55. The controller 200 is fed with various detection signals Ssen from detection means of various component parts of the disc recording/reproducing apparatus. The controller 200 is also fed with detection signals from the light receiving element 63 of the disc presence/absence detection sensor 162.

The controller 200 is responsive to the detection signals Dsen from the detection means of the various component parts and operating signals entered by means of an operating part 209 to drive the lift driving motor 116 and the driving motor 51 by means of a motor driving circuit 210. That is, the motor driving circuit 210 is fed with a control signal $S_{MD}$ from the controller 200 and transmits the driving current corresponding to the control signal $S_{MD}$ to the driving motors 116, 51.

Figure 53:
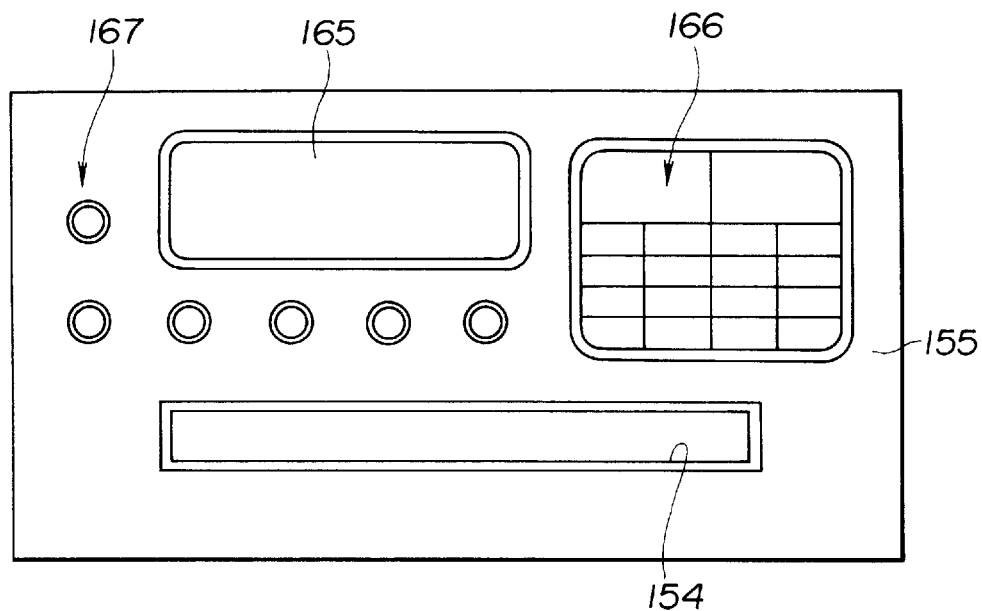
FIG. 53 is a front view showing an example of the appearance of the disc recording and/or reproducing apparatus according to the present invention.
Figure 54:
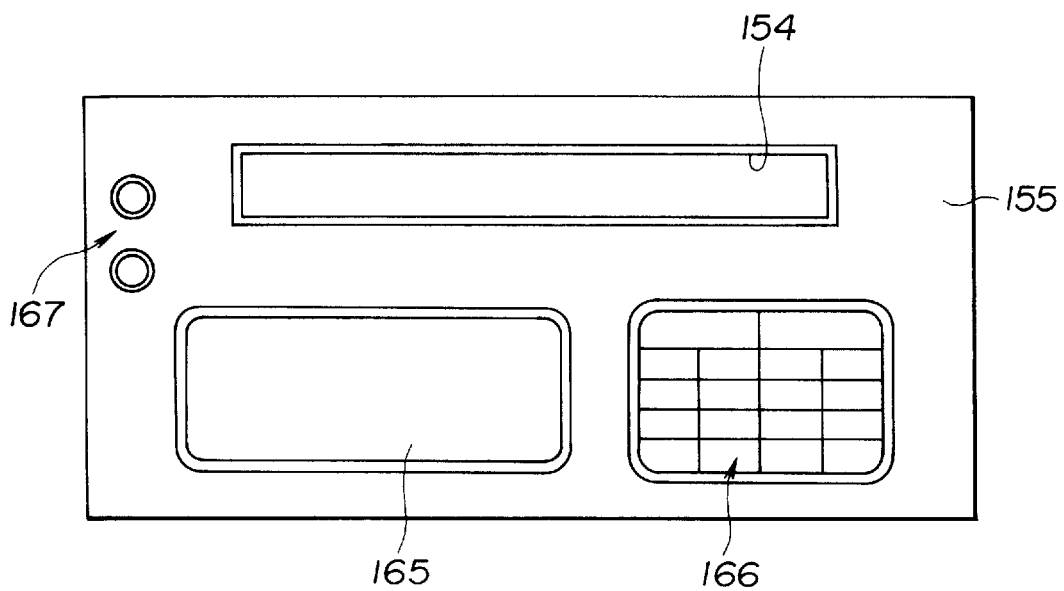
FIG. 54 is a front view showing another example of the appearance of the disc recording and/or reproducing apparatus according to the present invention.

The controller 200 causes various information data to be displayed on a display unit 165 on the front surface of the outer casing 155 of the disc recording/reproducing apparatus by means of a display control unit 208, as shown in FIGS. 53 and 54

The controller 200 controls a power source circuit 207 supplied with the commercial ac source in order to cause driving power sources $V_1$, $V_2$ to be supplied to various parts of the disc recording/reproducing apparatus inclusive of the controller 200.

The controller 200 controls the spindle motor rotating the disc table 6 of the recording/reproducing unit 5 and the optical pickup unit 7 by means of a servo circuit 206. The servo circuit 206 is fed with tracking error signal ET and a focusing error signal EF generated in an RF processing circuit 201 based on a detection signal output from the optical pickup unit 7. The servo circuit 201 generates a focusing control signal FOR, a tracking control signal TD, a thread driving current SD of the optical pickup unit and a spindle driving current SPD, based on control by the error signals ET, FT and under control by the controller 200, and transmits the generated currents to the recording/reproducing unit 5.

The RF processing circuit 206 is fed with an output signal of the optical pickup unit 7 and generates the error signals ET, FT and the RF signals. The RF signals are fed to a decoder 202 as information signals read out from the optical disc. The decoder 202 performs signal processing, such as EFM decoding or CIR error correction, on the RF signals supplied thereto, and routes the resulting signals to a D/A converter.

The D/A converter 203 converts the signals supplied thereto into analog audio signals which are transmitted by means of an amplifier 204 to a speaker unit 205. The speaker unit transduces the audio signals into acoustic signals.

The controller 200 is fed with subcode data $C_{SUB}$ and clock error signals $E_{SP}$ from the decoder 202. The sub-code data $C_{SUB}$ is a signal taken out from the RF signal by the decoder 202. The clock error signal $E_{SP}$ is a signal taken out from the RF signal by the decoder 202, and is used as control reference for the spindle motor.

Figure 57:
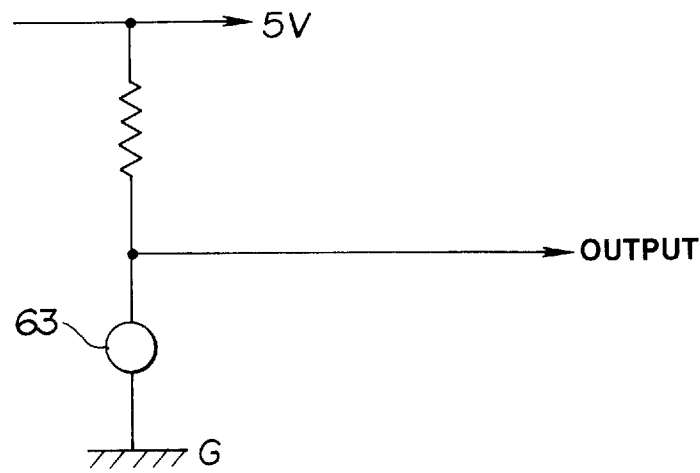
FIG. 57 is a circuit diagram showing a circuit arrangement for taking out a detection output from a light receiving device in the disc recording and/or reproducing apparatus.

The detection signal of the light receiving element 63 of the disc presence/absence sensor 262 is fed to the controller 200 by directly transmitting the detection signal output by the light receiving element 63 fed with the reference voltage to an analog input port of the controller 200, as shown in FIG. 57.

Figure 58:
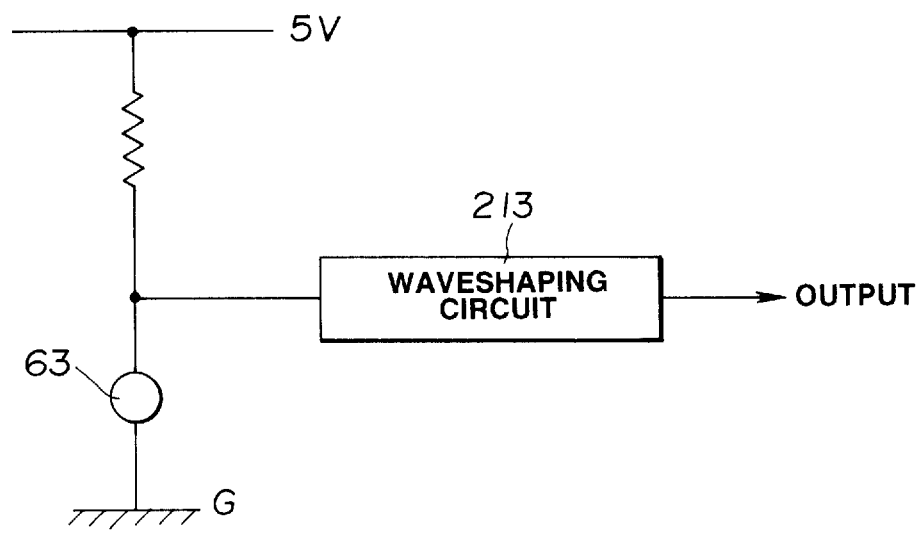
FIG. 58 is a circuit diagram showing a circuit arrangement for taking out the detection output from a conventional light receiving element.

An output of the light receiving element 63 is first fed to a waveshaping circuit 213, as shown in FIG. 58. The waveshaping circuit 213 outputs the reference potential (5V) or the ground potential (0V) depending on whether the potential of an input signal entered at the light receiving element 63 is above or below a predetermined constant potential. With such waveshaping circuit 213, there is a risk that, if the potential of the output signal of the light receiving element 63 is fluctuated due to, e.g., the difference in reflectance of the optical disc, a mistaken decision is given as to the presence or absence of the disc.

If an output of the light receiving element 63 is directly fed to an analog input port of the controller 200, as in the case of the disc recording and/or reproducing apparatus according to the present invention, the input potential of the analog input port is fluctuated due to a difference in the reflectance of the optical disc. However, an accurate decision may be given as to the presence or absence of the disc since it is possible with the controller 200 to change the boundary value of the potential at the analog input port.

With the above-described disc recording/reproducing apparatus, the controller 200 decides, by the first sensor 59, whether the slider 88 has shifted the sub-tray 14 to the recording/reproducing position associated with the recording/reproducing unit 5 when the power source is turned on. If the slider 88 has shifted the sub-tray 14 to the recording/reproducing position, the controller 200 does not cause the driving motor 51 to be run in rotation. If the slider 88 has not shifted the sub-tray 14 to the recording/reproducing position, the controller 200 causes the driving motor 51 to be run in rotation, depending on the results of detection of the second sensor 103, in order to shift the sub-tray 14 engaged with the slider 88 to the recording/reproducing position or to the position within the housing unit 8. Whether the sub-tray 14 should be moved to the recording/reproducing position or to the housed position in the housing unit 8 is predetermined as the operating program of the controller 200.

The controller 200 causes the lift driving motor 116 of the lift driving mechanism to be run in rotation for shifting the lift block 25 to the lowermost position on the bottom plate 2 of the chassis 1. At this time, the first switch 117 on the chassis 1 is thrust for detecting that the lift block 25 has been at the lowermost position. The count value of the second detection switch 118 for detecting that the supporting pins 47, 48 provided on the lift base plate 44 are not supported by any of the abutment supporting pieces 31a, 31b of the second cam plate 23 (non-supporting position) in order to enable the lift movement of the lift block 25 is reset to zero. The lift position of the lift block 25 is detected by integrating or decrementing the number of times of thrusting of the second detection switch 118 depending on the direction of rotation of the lift driving motor 116.

A plurality of sub-trays 14 housed within the housing unit 8 are selectively housed within the main tray 75. With the slider 88 being shifted to the position of housing the sub-tray 14 in the housing unit 8, the lift block 25 is uplifted or lowered within the range of disc selecting positions represented by the range of the opening 8b by means of which the lift block 25 faces the sub-trays 14 housed within the housing unit 8, as shown in FIG. 32. With the slider 88 being moved to the forward side towards the sub-tray 75 as indicated by arrow G in FIG. 11, the selected tray 14 is transported to the recording/reproducing position, as it is held in the main tray 75. At this time, the optical disc 301 set on the sub-tray 14 held on the main tray 75 is loaded on the recording/reproducing unit 5, or is moved along with the main tray 75 to the first position outwardly of the main member of the apparatus where it is taken out of the sub-tray 14. If the optical disc 301 is not set on the sub-tray 14 held on the main tray 75, the sub-tray 14 is moved along with the main tray 75 to the first position outwardly of the main member of the apparatus for loading a new optical disc 301 on the sub-tray 14.

For loading the optical disc 301 set on the sub-tray 14 on the recording/reproducing unit, the lift block 25 is set to the loading position proximate to the recording/reproducing unit 5, as shown in FIG. 34. The optical disc 301 set on the sub-tray 14 held on the main tray 75 is set on the disc table 6 and clamped by the chuck plate 68 so as to be loaded on the recording/reproducing unit 5.

For protruding the sub-tray 14 outwardly of the main member of the apparatus, the lift block 25 is uplifted to an unloading position away from the recording/reproducing unit 5, as shown in FIG. 33. The main tray 75, holding the sub-tray 14, may be moved to the first position outside of the main member of the apparatus by means of the disc insertion/exit opening 154 formed in the front surface of the outer casing 155, as shown in FIG. 53. When the main tray 75 is moved to the first position outside of the main member of the apparatus, it becomes possible to exchange the optical disc 301 set on the sub-tray 14 held on the main tray 75.

After shifting the main tray 75 holding the sub-tray 14 to the recording/reproducing position, the lift block 25 may be lowered towards the recording/reproducing unit 5 for loading the optical disc 301 set on the sub-tray 14 on the recording/reproducing unit 5. On the other hand, after shifting the main tray 75 holding the sub-tray 14 to the recording/reproducing position, the lift block 25 may be uplifted towards the recording/reproducing unit 5 for returning the optical disc 301 set on the sub-tray 14 into a predetermined housing position within the housing unit 8.

With the present embodiment of the disc recording/reproducing apparatus, there is no particular limitation to the position of the lift block 25 setting the sub-tray 14 along with the main tray 75 at the unloading position of being protruded outwardly of the main member of the apparatus, provided that such position is different from the loading position of loading the optical disc on the recording/reproducing unit. Thus it may be overlapped with the disc selecting position of housing or discharging the sub-tray 14 in or out of the housing unit 8. That is, the disc insertion/exit aperture 154 may be formed at an upper portion of the outer casing 155, as shown in FIG. 54. The degree of freedom in designing the front surface of the outer casing 155 may be increased since it becomes possible to freely set the position of protrusion of the main tray 75 out of the outer casing 155 enabling the optical disc to be taken out of the main member of the apparatus.

On the front surface of the outer casing 155 are mounted the display unit 165 and the display and operating buttons 166, 167 constituting an operating unit 209, in addition to the disc insertion/exit aperture 154, as shown in FIGS. 53 and 54. The operating buttons 166, 167 are used for entering instructions to the controller 200 for controlling the operation of the driving motors and the optical pickup unit 7. The display unit 165 displays the information such as the operating state of the disc recording/reproducing apparatus, that is, the identification number of the sub-tray 14 associated with the optical disc 301 being recorded or reproduced, the recording track number on the optical disc 301 or the play time.

Figure 56:
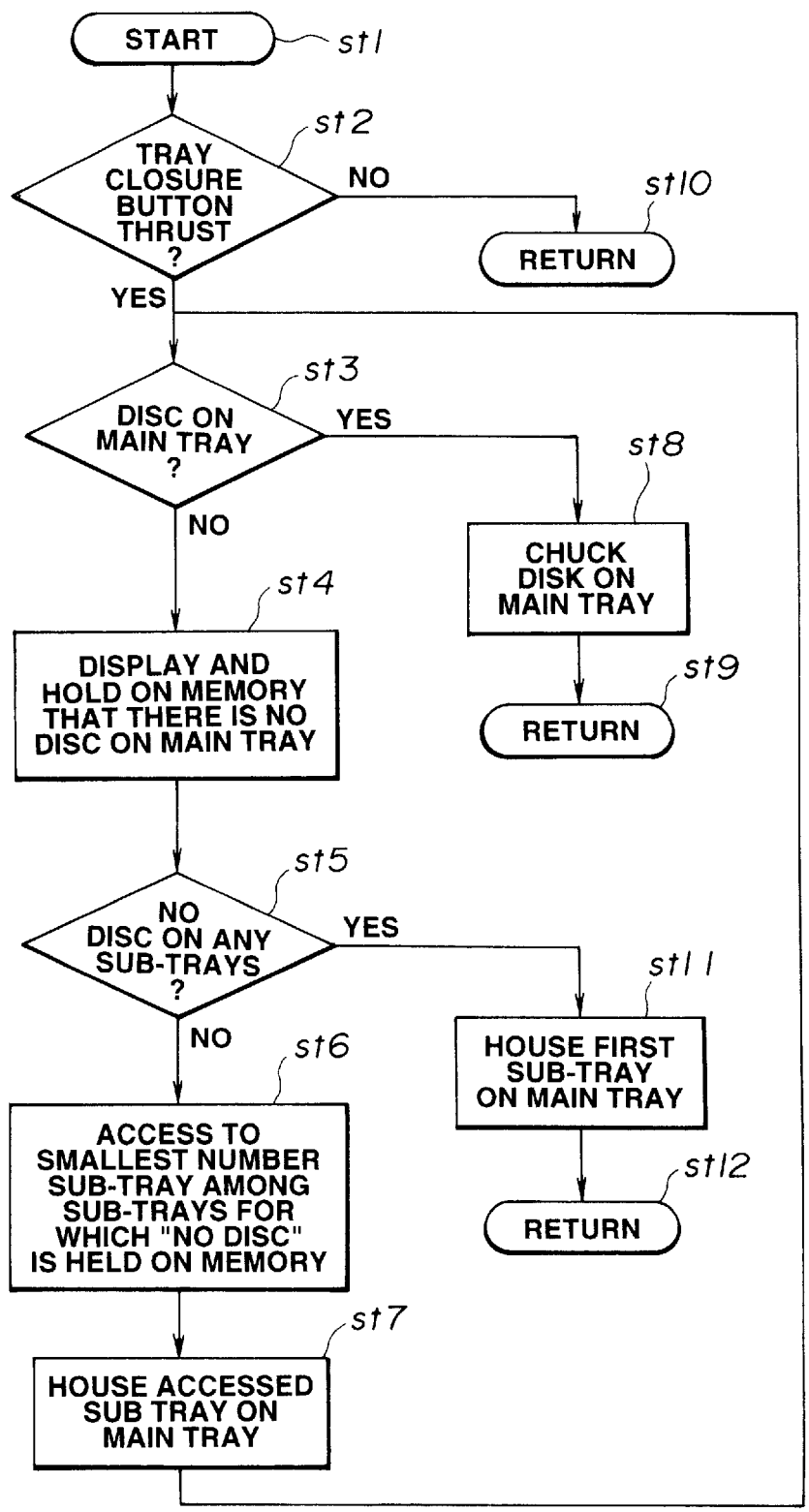
FIG. 56 is a flow chart for explaining the operation of the disc recording and/or reproducing apparatus according to the present invention.

With the present disc recording/reproducing apparatus, if a tray housing button provided on the operating unit 209, that is, a button instructing the sub-tray 14 protruded from the outer casing 155 to be returned along with the main tray 75 to the recording/reproducing position within the main member of the apparatus, is actuated, the controller 200 is operated in accordance with a flow chart shown in FIG. 56.

If the present sub-routine is started at step st1, the controller 200 transfers to step st2 in order to determine whether the tray housing button is pushed. If the tray housing button is not pushed, the controller 200 transfers to step st10 to return. If the tray housing button is pushed, the controller 200 transfers to step st3.

At step st3, the controller 200 determines, based on an output signal of the light receiving element 63 of the disc presence/absence detection sensor 262, whether an optical disc 301 is set on the sub-tray 14 held on the main tray 75. If the optical disc 301 is set on the sub-tray 14, the controller 200 transfers to step st8 and, if the optical disc 301 is not set on the sub-tray 14, the controller 200 transfers to step st4. At this time, the controller 200 stores in memory which one of the first to fifth sub-trays housed in the housing unit 8 is the sub-tray 14 held on the main tray 75.

At step st10, the controller 200 loads the optical disc 301 set on the sub-tray 14 held by the main tray 75 on the recording/reproducing unit 5 before return.

At step st4, the controller 200 causes the display unit 165 to display that no optical disc 301 is set on the sub-tray 14 held by the main tray 75, and stores in memory that no optical disc 301 is set on the correspondingly numbered sub-tray 14. The controller 200 then transfers to step st5.

At step st5, the controller 200 determines whether it is held on memory that no optical disc 301 is set on any of the sub-trays 14. If it is stored in memory that no optical disc 301 is set on any of the sub-trays 14, the controller 200 transfers to step st11 and, if otherwise, to step st6.

At step st11, the controller 200 causes the first sub-tray 14 to be held by the main tray 75 before return. This operation is in preparation for the main tray 75 being subsequently set to the position of being protruded outside of the main member of the apparatus.

At step st6, the controller 200 causes the main tray 75 to face the sub-tray 14 having the smallest number among the sub-trays 14 for which it is not stored in memory that the optical disc is not set thereon, that is, the sub-trays 14 for which it is stored in memory that the optical disc is set and the sub-trays 14 for which it is not stored in memory that the optical disc is set or is not set, that is, the sub-trays 14 on which the optical discs 301 are possibly set. The controller 20 then transfers to step st7.

At step st7, the controller 200 causes the sub-tray 14 faced by the main tray 75 to be held on the main tray 75, before transferring to step st3.

By repeating the above sequence of operations, it is possible for the controller 200 to discriminate the presence or absence of the optical disc 301 on all of the sub-trays 14, while storing the result of the determination in memory.

What is claimed is:

1. A disc recording/reproducing apparatus comprising:
    a housing unit affixed in stationary fashion to a main member of the apparatus for housing a plurality of sub-trays each configured for respectively supporting one of a plurality of discs thereon in a direction parallel to a plane of the respective disc so that the discs lie parallel to each other;
    a disc recording/reproducing unit mounted in stationary fashion within said main member of the apparatus;
    transfer means for selectively taking a selected one of said plurality of sub-trays out of said housing unit and/or housing the selected sub-tray thus taken out in said housing unit;
    a main tray for holding said selected sub-tray selected by said transfer means and adapted for being horizontally shifted between a first position protruding from said main member of the apparatus and a second position located within said main member of the apparatus; and
    lift means for moving said transfer means and said main tray to said second position relative to said housing unit, and said transfer means and said main tray being shifted together to said second position, wherein said disc recording/reproducing unit is arranged at a lower portion of the main member of the apparatus on a straight line passing through said second position substantially normal to the plane of the disc, said housing unit being arranged at an upper portion of the main member of the apparatus spaced apart from the substantially straight line passing through said second position, said transfer means and the main tray being uplifted and lowered by said lift means on a substantially straight line normal to the plane of the disc, wherein
    said lift means includes supporting means for supporting said main tray between said first position and said second position, and
    lift driving means for uplifting and lowering said supporting means along a substantially straight line normal to the plane of the disc and comprising a first cam plate having a first cam portion engaged with said supporting means, a second cam plate having a second cam portion engaged with said supporting means, and a driving mechanism for producing relative horizontal movement between said first cam plate and said second cam plate for uplifting and lowering said supporting means along said first and second cam portions.

2. The disc recording and/or reproducing apparatus as claimed in claim 1, wherein the lift means shifts said transfer means and the main tray shifted to said second position together between said disc recording/reproducing unit and said housing unit.

3. The disc recording and/or reproducing apparatus as claimed in claim 1, wherein said main tray is supported by said lift means at a third position between said housing unit and the disc recording/reproducing unit along a substantially straight line normal to the plane of the disc.

4. The disc recording and/or reproducing apparatus as claimed in claim 1, further comprising:
    driving means for selectively driving said transfer means and said main tray.

5. The disc recording and/or reproducing apparatus as claimed in claim 4, wherein said driving means comprises:
    a first driving unit engaged with a first rack of said main tray for shifting said main tray; and
    a second driving unit engaged with a second rack of said transfer means for shifting said transfer means between said housing unit and said second position in a direction normal to the substantially straight line normal to the plane of the disc.

6. The disc recording and/or reproducing apparatus as claimed in claim 1, wherein said transfer means is movable relative to said main tray.

7. The disc recording and/or reproducing apparatus as claimed in claim 6, wherein said transfer means comprises a slider having an engagement portion engaged with a mating engagement portion provided on said sub-tray, and is movable relative to said main tray.

8. The disc recording and/or reproducing apparatus as claimed in claim 1, wherein said main tray has a recess for holding said sub-tray taken out from said housing unit by said transfer means and a holding mechanism for holding said sub-tray housed within said recess.

9. The disc recording and/or reproducing apparatus as claimed in claim 8, wherein said transfer means comprises a slider having an engagement portion engaged with a mating engagement portion provided on said sub-tray, and is movable relative to said main tray.

10. The disc recording and/or reproducing apparatus as claimed in claim 1, further comprising:
    lock means for inhibiting movement of said main tray between said first position and said second position during transfer of said sub-tray by said transfer means.

11. The disc recording and/or reproducing apparatus as claimed in claim 10, wherein said lift means comprises driving means for selectively driving said transfer means and said main tray, and supports said main tray between said first position and said second position.

12. The disc recording and/or reproducing apparatus as claimed in claim 11, wherein said transfer means comprises a slider having an engagement portion engaged with a mating engagement portion provided on said sub-tray, and is movable relative to said main tray and wherein
    said lock means is formed in a first cam groove formed in said lift means and a second cam groove formed in said slider and includes a lock member rotated by movement of said slider.

13. A disc recording/reproducing apparatus comprising:
    a main member including a base plate;
    a plurality of sub-trays each configured for setting a disc thereon;
    a housing unit affixed in stationary fashion to said base plate within said main member of the apparatus for housing said sub-trays so that said sub-trays are arranged in a direction normal to the disc surface direction so that the discs lie parallel to one another;
    a disc recording/reproducing unit secured to said base plate provided within said main member of the apparatus;

transfer means for selectively taking one of the sub-trays out of said housing unit and/or housing the sub-tray thus taken out in said housing unit;

a main tray for holding the sub-tray selected by said transfer means;

said transfer means being arranged for movement horizontally between a first position protruded out of said main member of the apparatus and a second position within said main member of the apparatus, said transfer means being supported for movement between a position of taking out and/or housing the sub-tray in or from said housing unit and said second position;

lift means for shifting said transfer means and said main tray shifted to said second position between the disc recording/reproducing unit and said housing unit in a direction normal to the disc surface; and driving means for selectively driving said main tray and the transfer member, said driving means shifting said main tray between the first position and the second position and also shifting said transfer member between said second position and an intermediate position whereat said one of said sub-trays is taken out of the housing unit, wherein said lift means includes supporting means for supporting said main tray between said first position and said second position, and lift driving means for uplifting and lowering said supporting means along a substantially straight line normal to the plane of the disc and comprising a first cam plate having a first cam portion engaged with said supporting means, a second cam plate having a second cam portion engaged with said supporting means, and a driving mechanism for producing relative horizontal movement between said first cam plate and said second cam plate for uplifting and lowering said supporting means along said first and second cam portions.

14. The disc recording and/or reproducing apparatus as claimed in claim 13 wherein a mating engagement portion is formed in each sub-tray and wherein said transfer means is horizontally movable between said second position and the position of taking out the sub-tray housed within the housing unit or housing the sub-tray thus taken out in said housing unit, said transfer means having an engagement portion engaged with the mating engagement portion of the sub-tray.

15. The disc recording and/or reproducing apparatus as claimed in claim 14 wherein said driving means has a first driving portion engaged with a first driven portion provided on the main tray for shifting said main tray between the first position and the second position and a second driving portion engaged with a second driven portion of said transfer member for shifting said transfer member between said second position and the intermediate position, and wherein said second driving portion is disengaged form said second driven portion when the main tray is transported with the first driving portion is engaged with the second driven portion.

16. The disc recording and/or reproducing apparatus as claimed in claim 14 wherein said transfer member is mounted on the main tray for movement horizontally between said second position and the intermediate position and wherein said main tray has holding means for holding the transfer member moved to said second position.

17. The disc recording and/or reproducing apparatus as claimed in claim 14 wherein said transfer member has lock means inhibiting movement of the main tray between the first and second positions during the transfer movement of the sub-tray by said transfer member.

18. The disc recording and/or reproducing apparatus as claimed in claim 14 further comprising at least one lever engaged with a groove formed in the housing section, said lever being rotated so as to follow the lift movement of said transfer means and the main tray by said lift means.

19. The disc recording and/or reproducing apparatus as claimed in claim 13 wherein said lift means has supporting means for supporting said transfer means moved to said second position and the main tray at said second position for movement in a direction normal to the disc surface direction and lift driving means for driving said supporting means in a direction normal to the disc surface direction.

20. The disc recording and/or reproducing apparatus as claimed in claim 19 wherein said support means has a first member for supporting said main tray for movement between the first position and the second position and a second supporting member arranged facing said first supporting member for holding the disc positioned on said disc recording/reproducing unit.

21. The disc recording and/or reproducing apparatus as claimed in claim 13 further comprising an opening formed in said front surface of the main member of the apparatus for protruding said main tray to said first position, said main tray being moved in a direction parallel to the disc surface direction between the first position and the second position via said opening, said transfer means being moved in a direction parallel to the disc surface direction between the second position and the position of taking out the sub-tray housed in the housing unit and/or housing the sub-tray, said housing unit being arranged forwardly in the proceeding direction when the main tray in the main member of the apparatus is moved from the first position to the second position, said disc recording/reproducing unit being arranged on a straight line normal to the disc surface direction.

22. The disc recording and/or reproducing apparatus as claimed in claim 13 wherein each sub-tray has discrimination means for enabling discrimination from other sub-trays and wherein the main tray has a window enabling the discrimination means of the sub-tray selected by said transfer means to be viewed from outside when said main tray is moved to said first position.

* * * * *